LOGICAL PRODUCT A·B·C·D

LOGICAL SUM A+B+C+D

LOGICAL RELATIONSHIP
$[(A \cdot B) + C][E \cdot D]$

LOGICAL DIFFERENCE A-B

INVENTOR.
JAMES W. PERRY
BY

Nov. 27, 1962  J. W. PERRY  3,066,280
SEARCHING SELECTOR
Filed Jan. 16, 1958  30 Sheets-Sheet 2

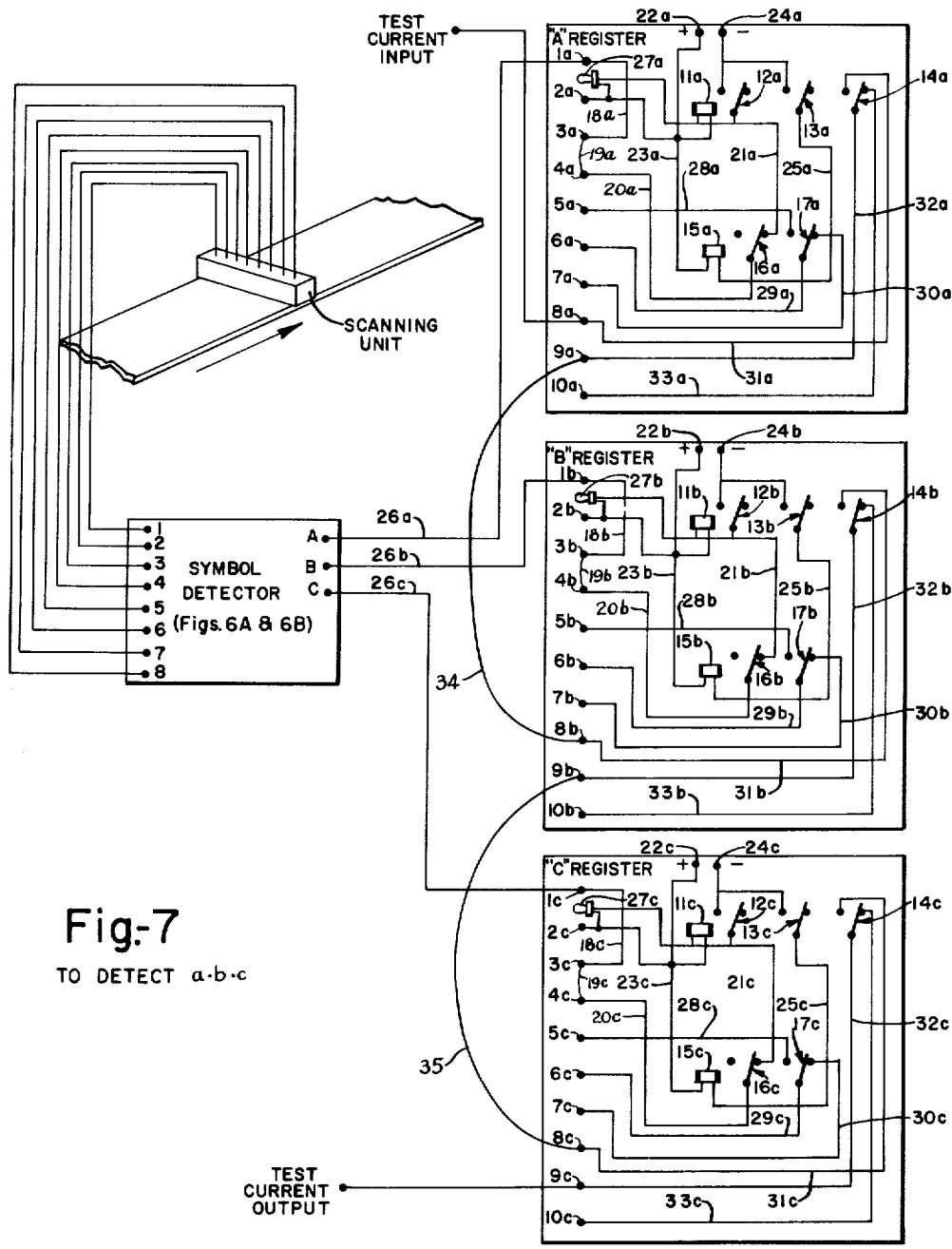

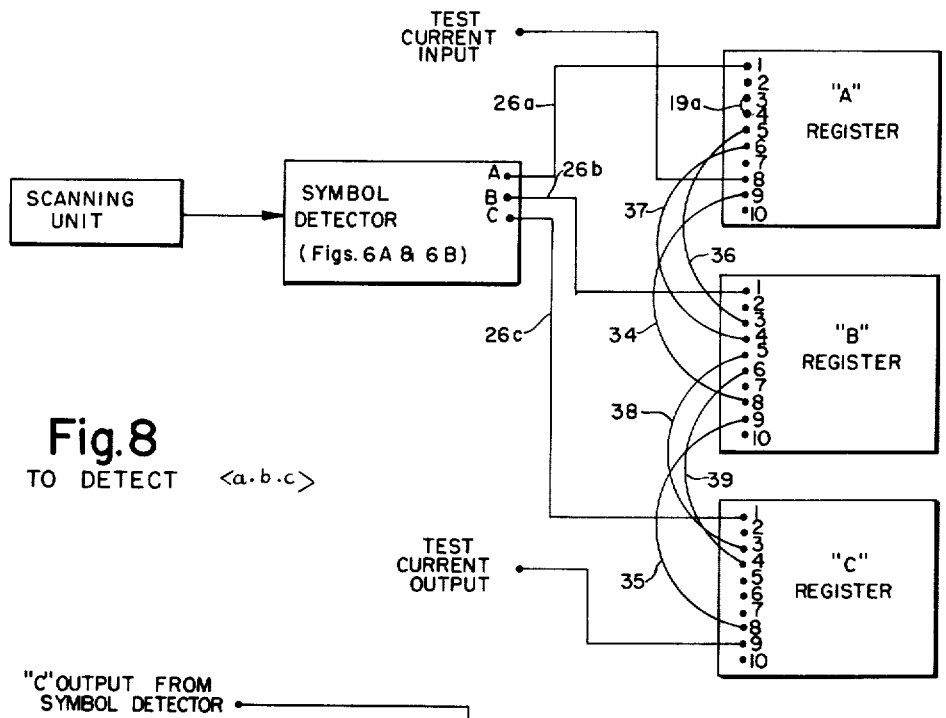
Fig. 8  TO DETECT ⟨a·b·c⟩
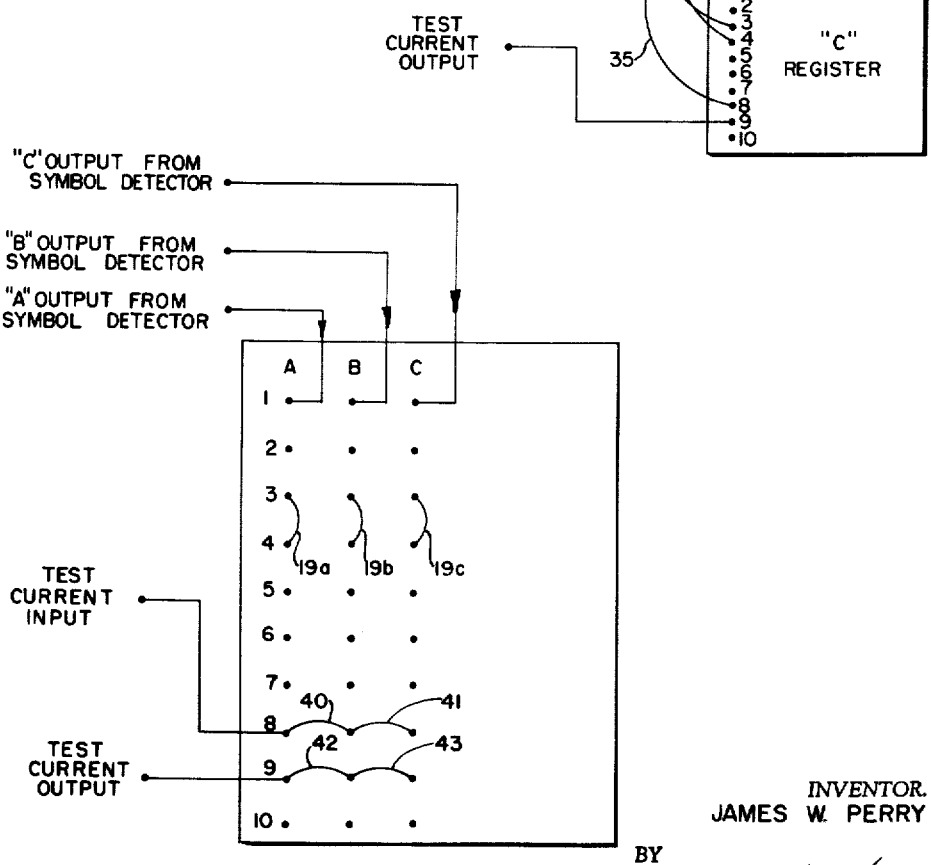
Fig. 9  TO DETECT  a + b + c

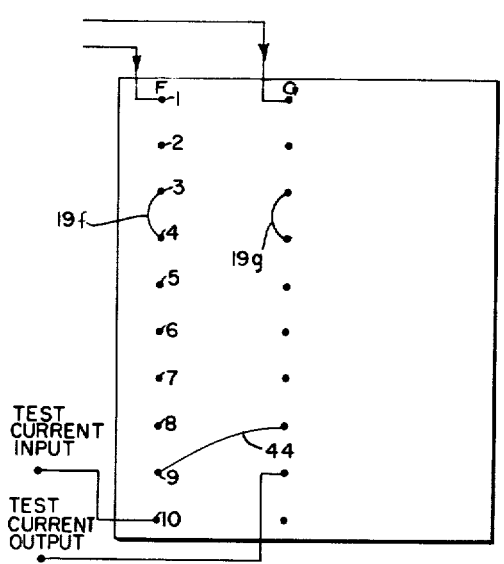
Fig.10 TO DETECT g·f
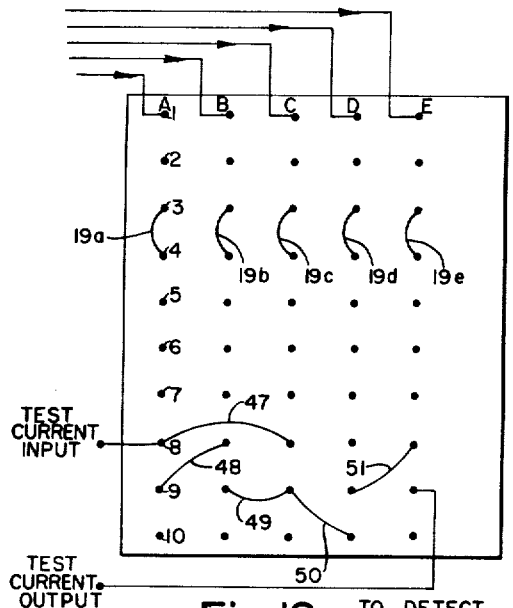
Fig.12 TO DETECT (a·b+c)(e-d)
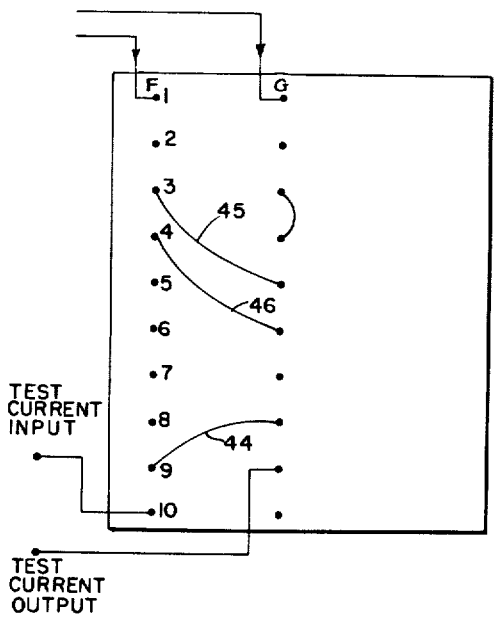
Fig.11 TO DETECT ⟨g-f⟩
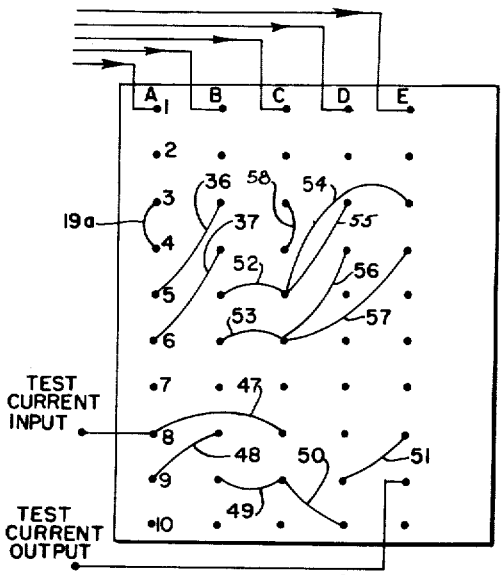
Fig.13 TO DETECT ⟨(⟨a·b⟩+c)(e-d)⟩
INVENTOR.
JAMES W. PERRY

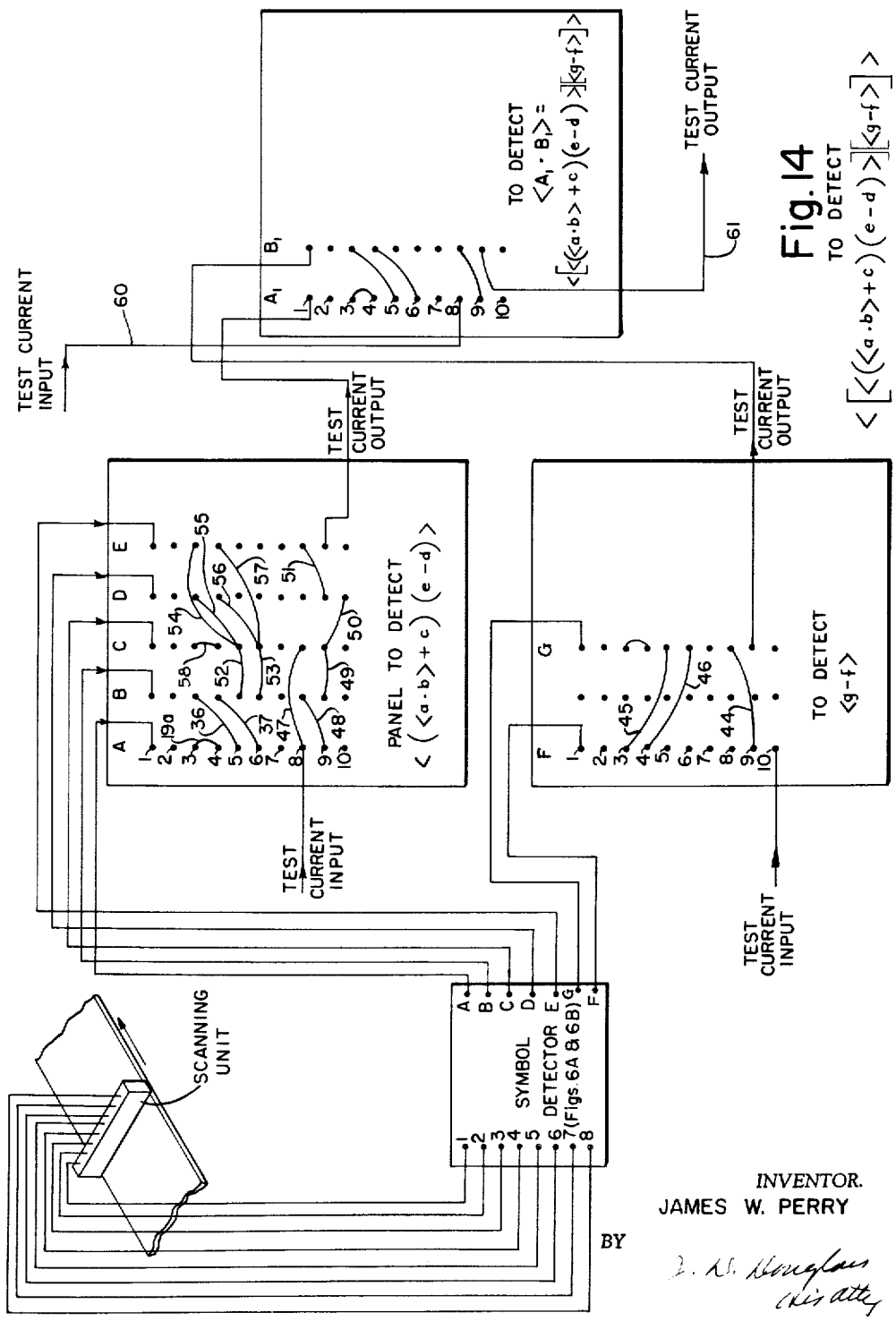

Nov. 27, 1962 J. W. PERRY 3,066,280
SEARCHING SELECTOR
Filed Jan. 16, 1958 30 Sheets-Sheet 8

Fig. 15

INVENTOR.
JAMES W. PERRY

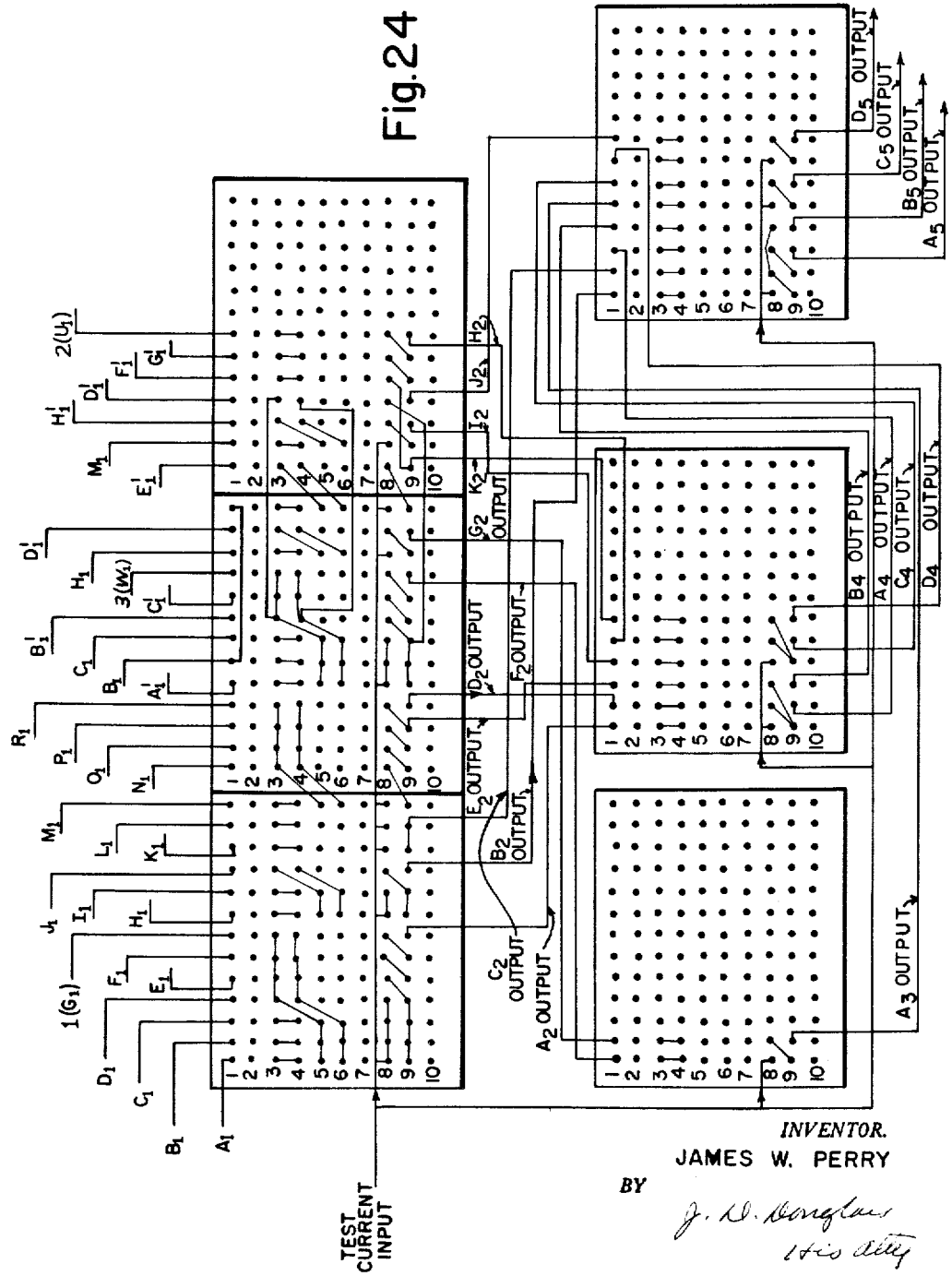

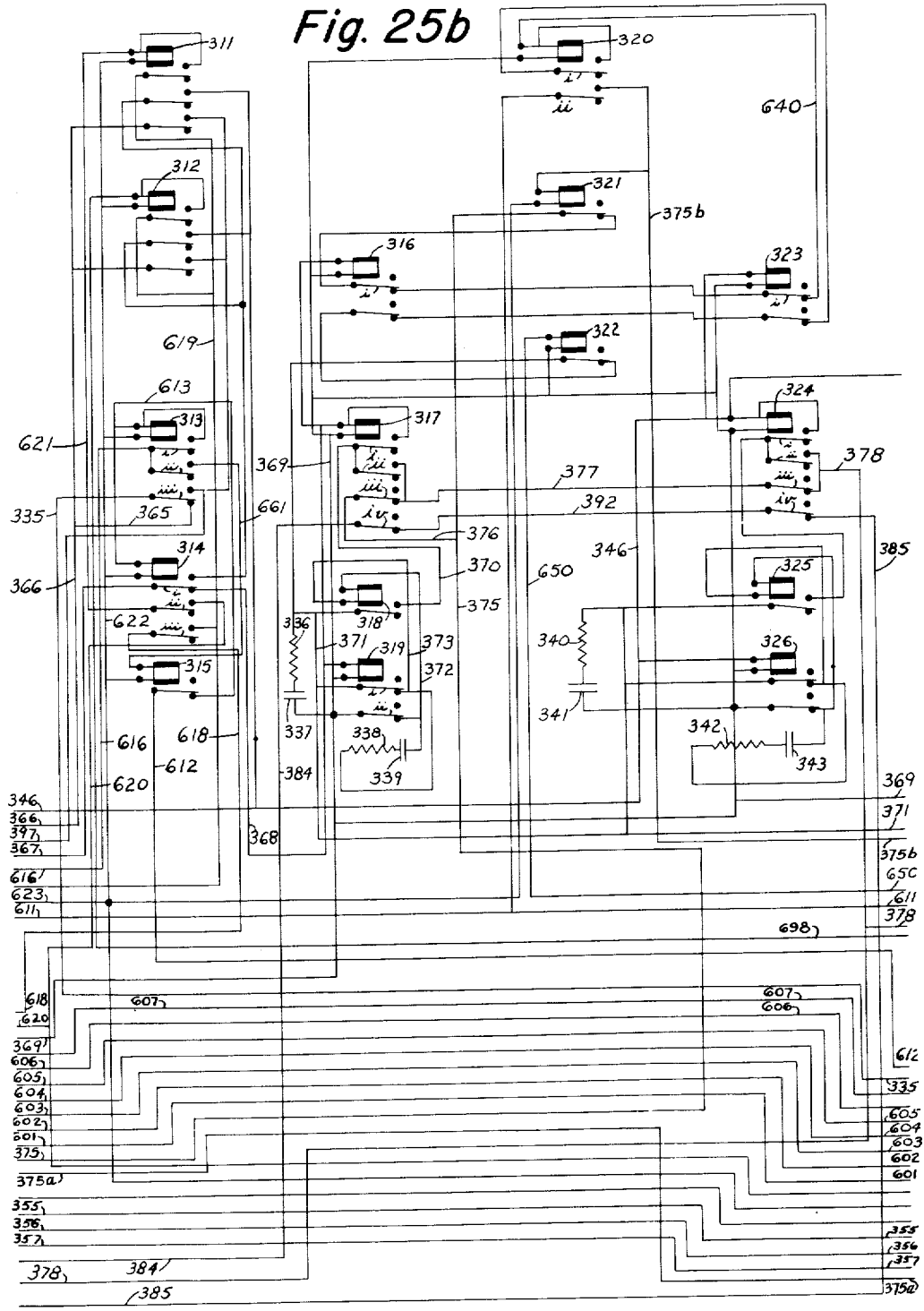

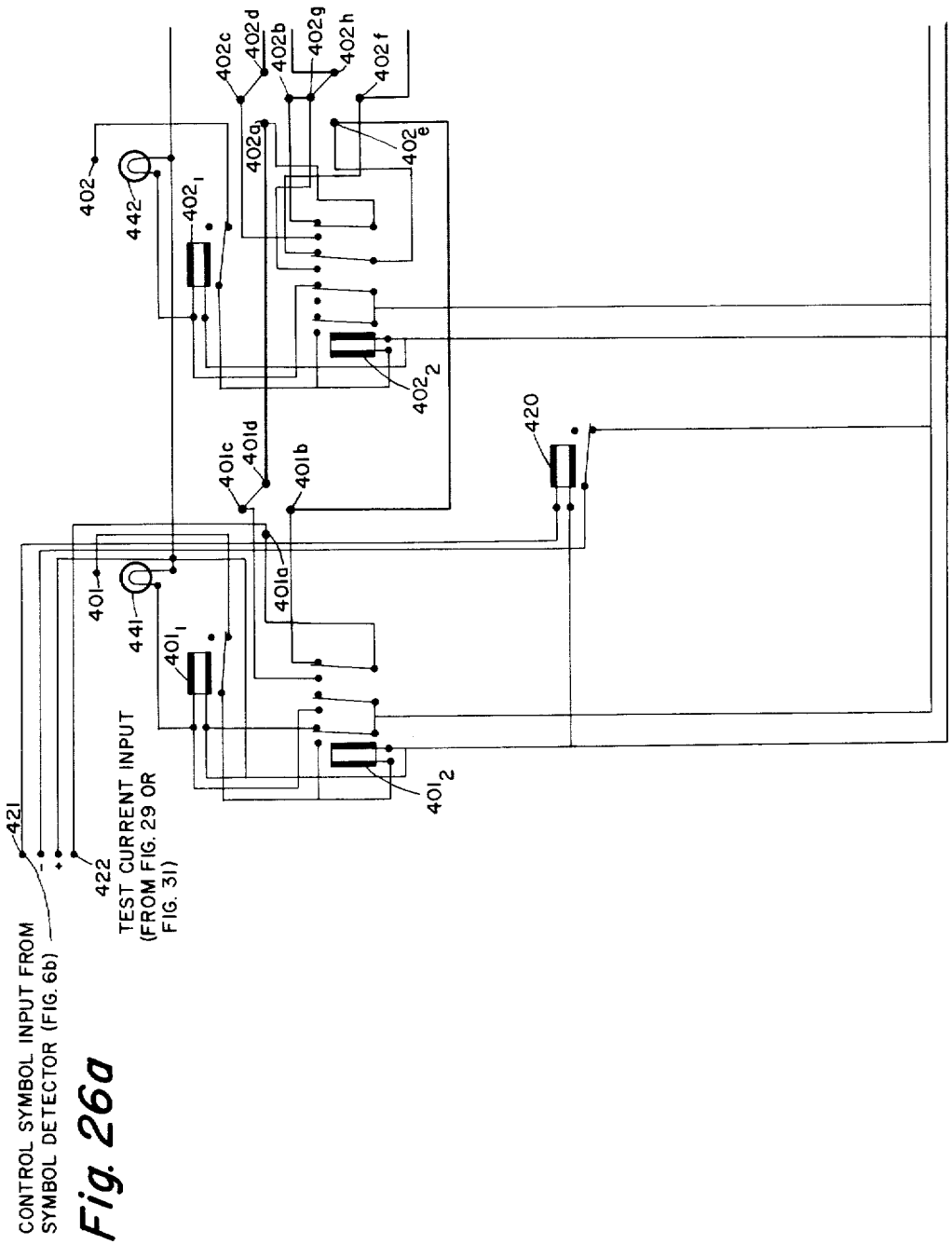

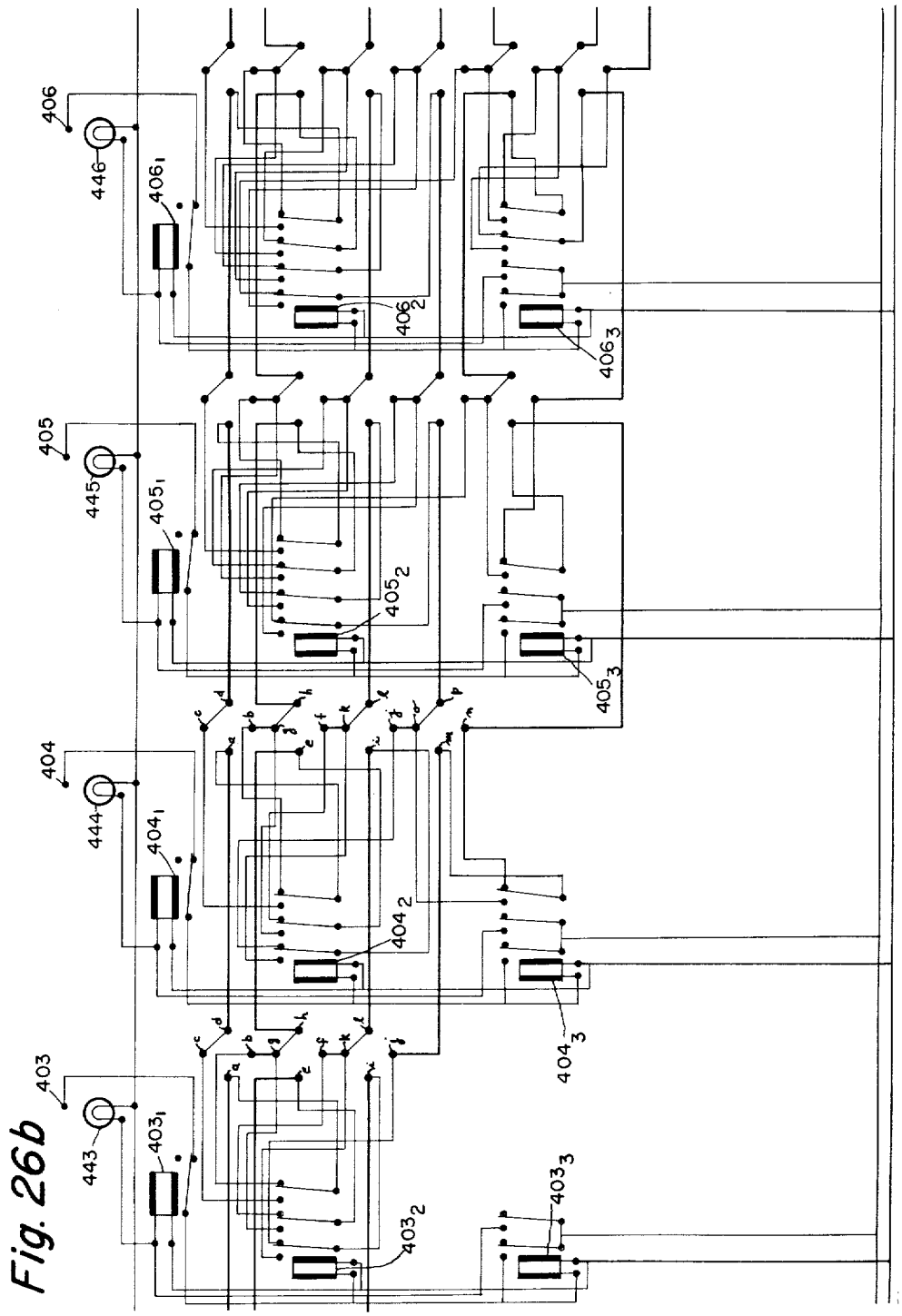

Nov. 27, 1962  J. W. PERRY  3,066,280
SEARCHING SELECTOR
Filed Jan. 16, 1958  30 Sheets-Sheet 28

INVENTOR.
JAMES W. PERRY

United States Patent Office 3,066,280
Patented Nov. 27, 1962

3,066,280
SEARCHING SELECTOR
James W. Perry, Cleveland Heights, Ohio, assignor to
Western Reserve University, Cleveland, Ohio
Filed Jan. 16, 1958, Ser. No. 709,340
12 Claims. (Cl. 340—172.5)

This invention relates to apparatus for searching or scanning messages recorded in the form of sequences of symbols and to identify those messages that are characterized by certain combinations of symbols. The mechanisms with which this invention is concerned are designed not only to recognize combinations of such symbols but also to recognize higher level combinations each of which is built up of combinations of symbols. Successively higher level combinations may continue to be built up to as many levels as may be desired, in accordance with the teachings of this invention.

Consequently, it is an object of this invention to provide novel equipment for scanning a recorded sequence of symbols in order to detect individual symbols and successively higher levels of combinations of symbols, as desired.

A further object of this invention is to provide such equipment which will provide an appropriate signal when a prespecified combination of symbols or a prespecified higher level combination is detected as occurring in the successive recorded messages that are being scanned by the equipment.

A further object of this invention is to provide such equipment able to perform simultaneously a multiplicity of such searching and identifying operations.

Considered from a somewhat different point of view, this invention pertains to automatic electronic equipment for performing certain sequences and combinations of logically defined operations. More specifically, this invention pertains to automatic electronic equipment for accomplishing identifying operations which may involve the detection of a multiplicity of characteristics. Still more specifically, this invention pertains to automatic electronic equipment which is able to accomplish simultaneously a multiplicity of identifying operations each of which may be based on predetermined, yet variable, combinations of pluralities of characteristics.

A further object of this invention is to provide such equipment which permits the widest possible range of combinations of characteristics to be preestablished in defining the classes of items to be searched for and identified prior to operating the automatic electronic equipment.

A further object of this invention is to provide such equipment which permits a wide range of complex logical relationships between characteristics to be specified when defining selecting operations in terms of combinations of characteristics.

A further object of this invention is to provide such equipment which may be readily conditioned or programmed prior to accomplishing the identification of members of classes as indicated below.

An object of this invention is to provide automatic electronic equipment that will scan the recorded characteristics of items and identify which items are members of certain classes, of which the said members of a given class are characterized as possessing either (1) all of a certain set of characteristics or (2) a lesser number of chacteristics among those that constitute the aforesaid set.

A further object of this invention is to provide automatic electronic equipment that will accomplish simultaneously a plurality of such identifications, each of which involves determining those items that are members of various classes that are defined in terms of combinations of characteristics as indicated under (1) and (2) above.

It is a further object of this invention to provide an automatic listing of the serial numbers, names, or other identifying designations of the members of each of the classes to which searching and identifying operations are directed.

It is a further object of this invention to append to each of the listed serial numbers, names or other identifying designations a further symbol, especially a numeral, to indicate which of a given set of characteristics or which partial set of characteristics were detected as pertaining to each item designated by a listed serial number, name or other identifying designation.

It is a further object of this invention to provide searching and selecting equipment of simplified design and consequently of much lower cost than general purpose computers.

More specifically, it is an object of this invention to accomplish simultaneously a plurality of complex identifying operations without the use of a unit to perform arithmetic operations and without the use of storage registers or "memories" as used in prior art computers to record, on an interim basis, the results of partial accomplishment of a computational routine.

Further, it is an object of this invention to provide electrical mechanisms which accomplish identification operations by sequential processing of signals without feedback operations that require the results of partial accomplishment of a given routine to be stored on an interim basis in an internal memory device and recalled from memory at a later stage in the routine for further processing.

It is a further object of the present invention to provide electronic equipment which may be programmed to conduct searching and selecting operations by completing certain circuits by external means, e.g., by the wiring of plugboards.

To illustrate further the general objects of the present invention, the following practical types of identifying operations are mentioned: (1) the identification of persons whose recorded characteristics indicate that they possess all of a certain set of characteristics or certain characteristic combinations, each consisting of a certain minimum number of characteristics within the set; (2) the identification of substances or material objects whose recorded characteristics indicate that they possess all of a set of characteristics or certain characteristic combinations, each consisting of a certain minimum number of characteristics within the set; (3) the identification of reports, scientific, technical or similar factual papers, patents, published articles, and graphic records in general (including maps, photographs and machine drawings), whose recorded characteristics in the form of index entries or encoded abstracts indicate that they possess all of a certain set of characteristics or certain characteristic combinations, each consisting of a certain minimum number of characteristics within the said set. As to each of these three general examples of identifying operations, it is a principal object of the present invention to identify simultaneously the members of each of several classes, each of which correspond (1) to a full set of characteristics, and (2) to characteristic combinations, each consisting of various minimum number of characteristics within a given set.

To make use of the present equipment, it is necessary to employ some system for characterizing the recorded items so that the equipment of this invention may be used to perform searching and selecting operations. It is an advantage of this invention that it permits such characteristics to be recorded in such a fashion that alternate combinations of characteristics may be used in defining and in programming the searching and selecting operations. Also such characterization may be accomplished with minimum effort on the part of skilled personnel and consequently at minimum cost. When dealing with documentary material, such characterization may be analogized both to indexing (in that individual characteristics of subject matter are discerned and recorded) and also to classification (in that performance of searching and selecting operations results in selection of a class of items logically defined in terms of certain characteristics or combinations of characteristics).

A principal field for application of the equipment to which this invention pertains is identifying which documents in an extensive file are of probable pertinent interest to a given problem or situation. The problem of searching large files of documents provides a convenient general example for considering the design and operation of the equipment to which this invention pertains.

Other objects and advantages of the present invention will be apparent from the following detailed description of one embodiment thereof, which is illustrated in the accompanying drawings.

Figure 6A:
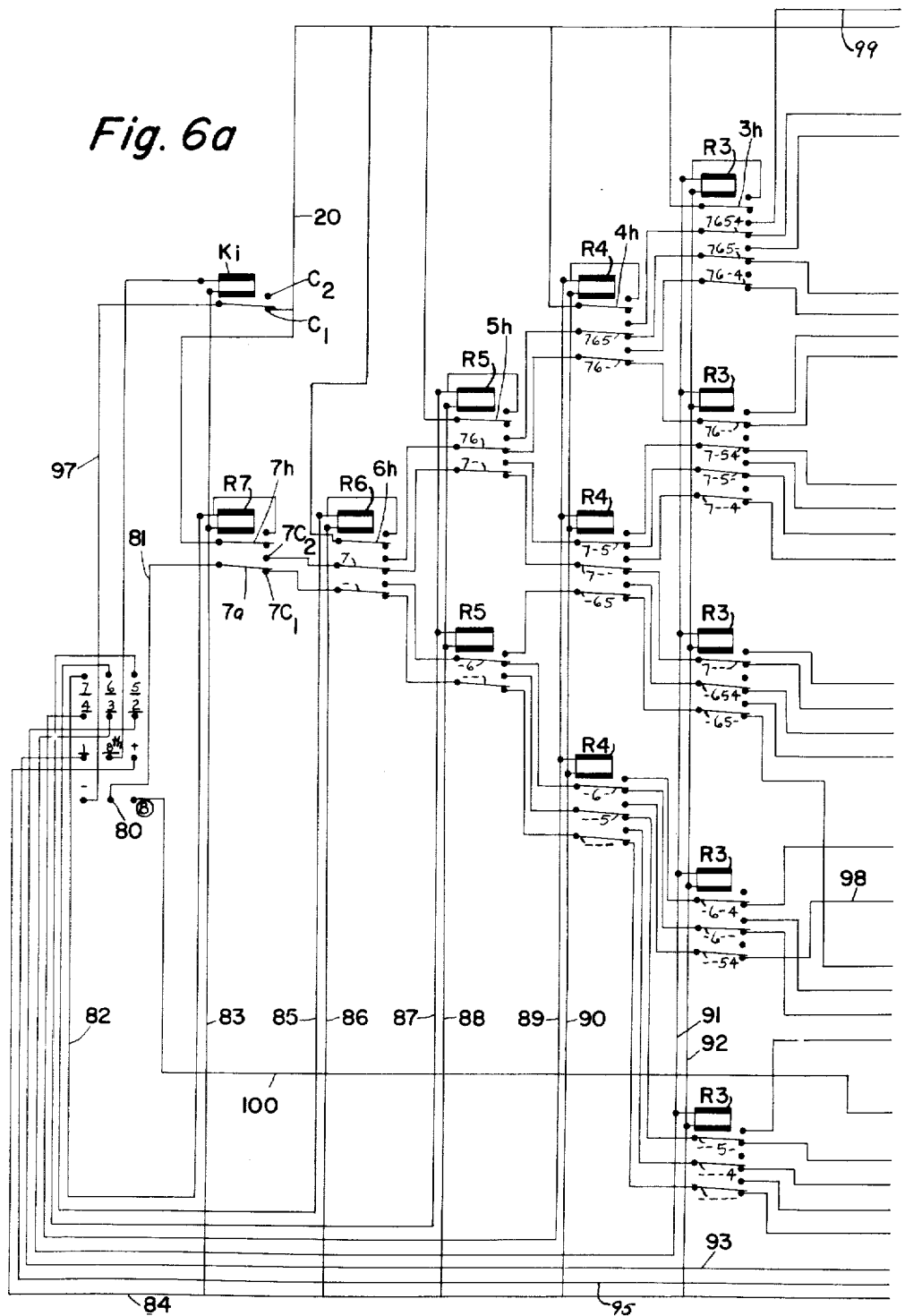
Figure 6B:
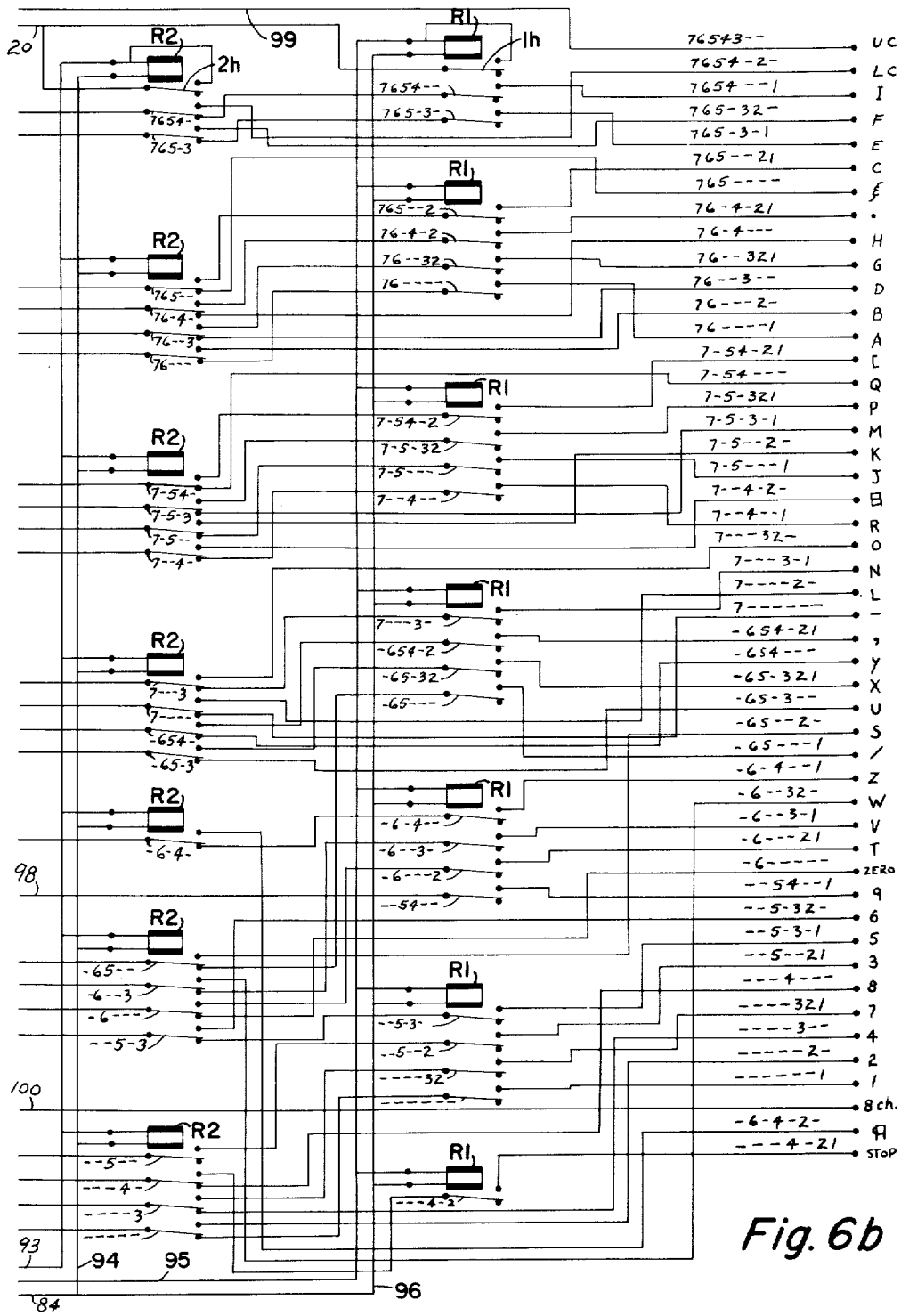

FIGURES 6A and 6B show a symbol detector composed of a multiplicity of relays interconnected to detect individually each of a multiplicity of symbols constituted by holes punched in the first seven channels of the record tape. FIGURES 6A and 6B together make up the complete symbol detector, with the lines at the right edge of FIG. 6A continuing as the correspondingly positioned lines at the left edge of FIG. 6B.

FIGURE 7 shows schematically an arrangement for registering the logical product $a \cdot b \cdot c$, using the symbol detector of FIGS. 6A and 6B to detect the individual symbols and also having register circuits interconnected to require that the logical relationship $a \cdot b \cdot c$ be satisfied in order to produce an output signal.

FIGURE 8 is a schematic diagram of a similar arrangement for detecting the order-specified logical product $<a \cdot b \cdot c>$ with the internal wiring of the registers being the same as in FIG. 7 and omitted in this figure for simplicity.

FIGURE 9 shows an arrangement of these symbol registers having external connections such that it detects the logical sum $a+b+c$.

FIGURES 10-13 are similar views showing registers connected to detect various logical relationships.

FIGURE 14 is a schematic diagram of an arrangement for detecting individual symbols from the record tape, registering the symbols and detecting a specified complex relationship of the symbols.

FIGURE 15 is a circuit diagram of the panel which serves in the present equipment as a central supplying power and for routing various pulses to other panels and their circuits.

Figure 16:
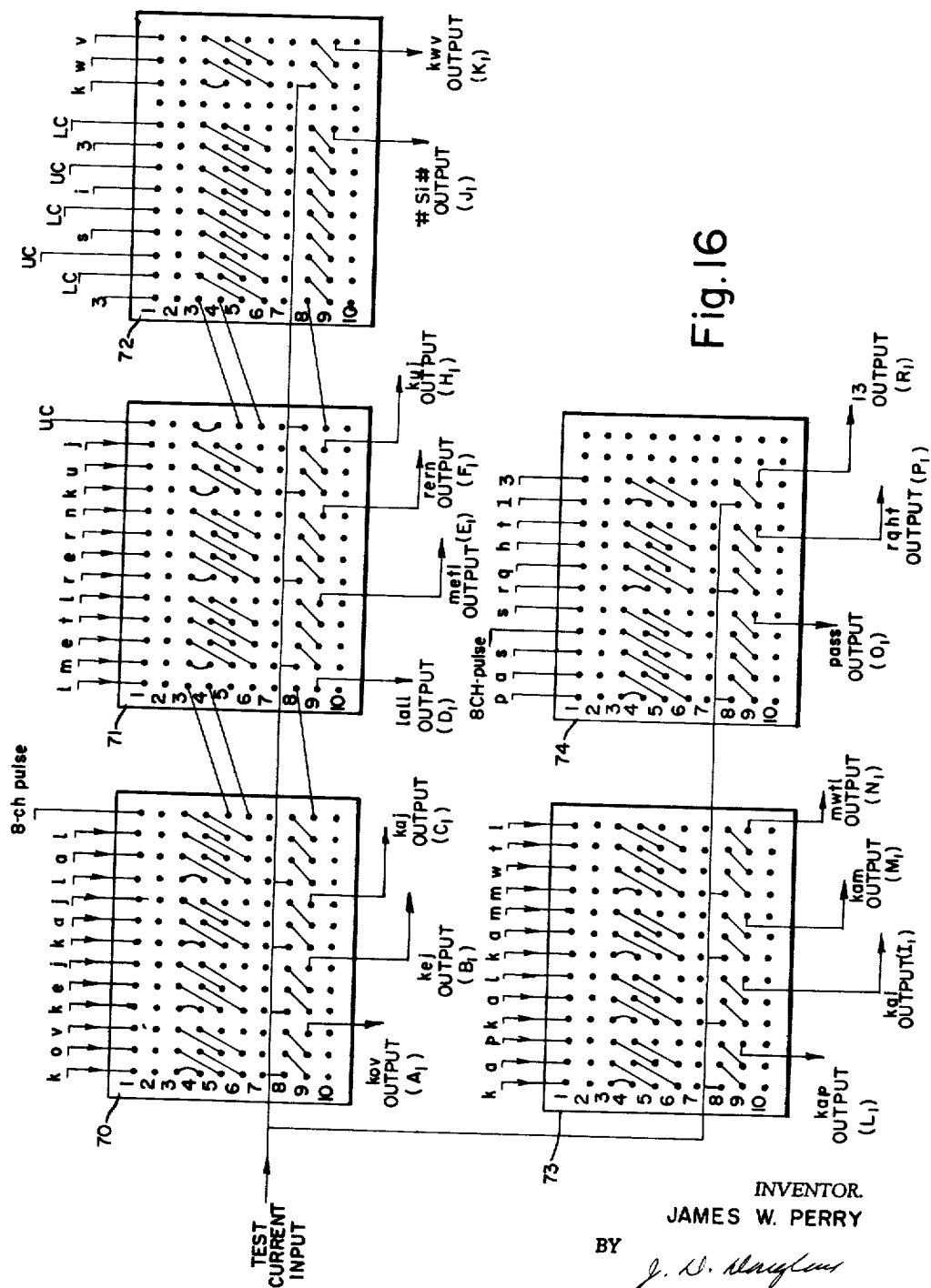
Figure 17:
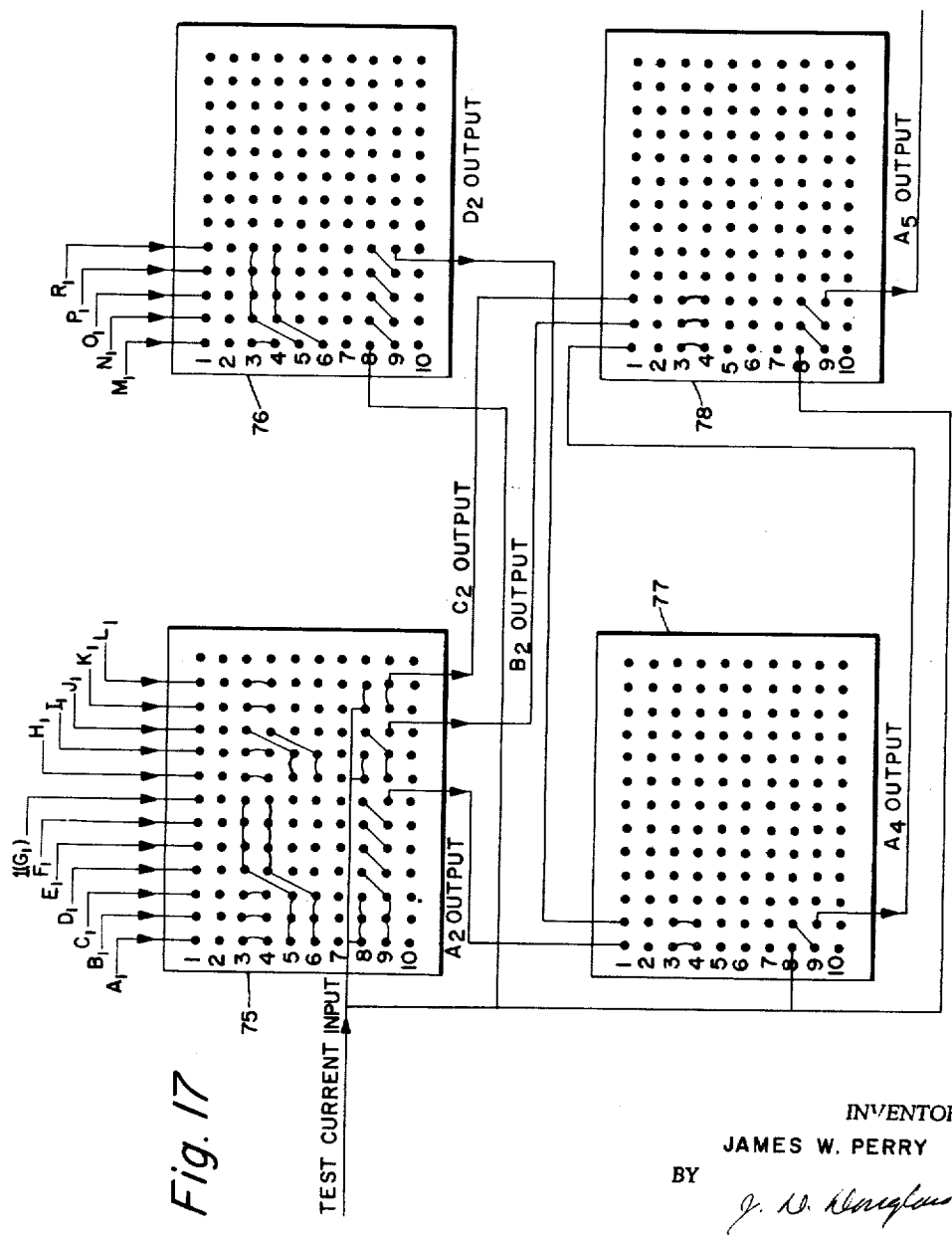

FIGURES 16 and 17 show relay panels wired to conduct a first specified search in accordance with the present invention, the output lines from the FIG. 16 panels being connected to the input terminals of certain of the FIG. 17 panels.

Figure 18:
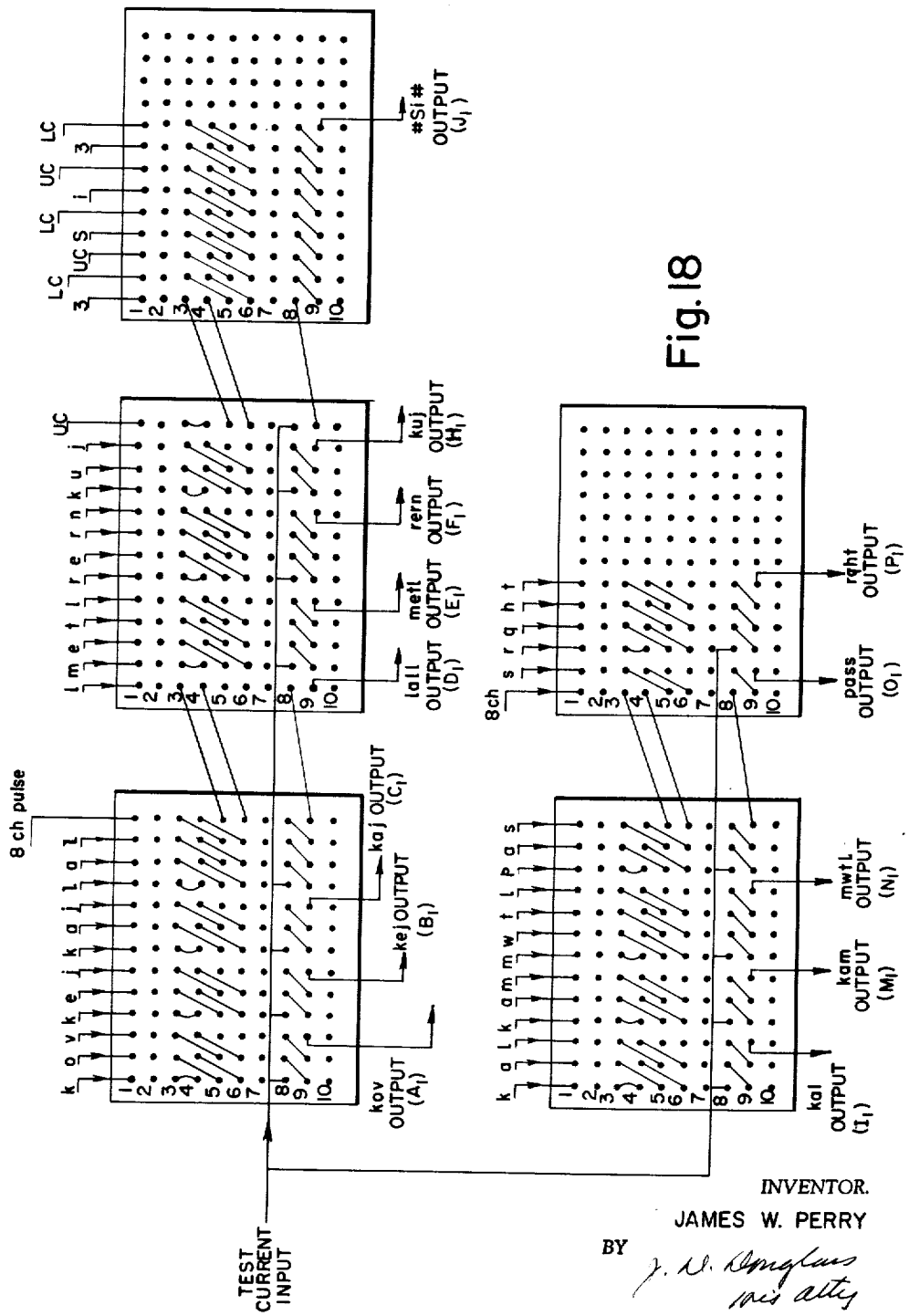
Figure 19:
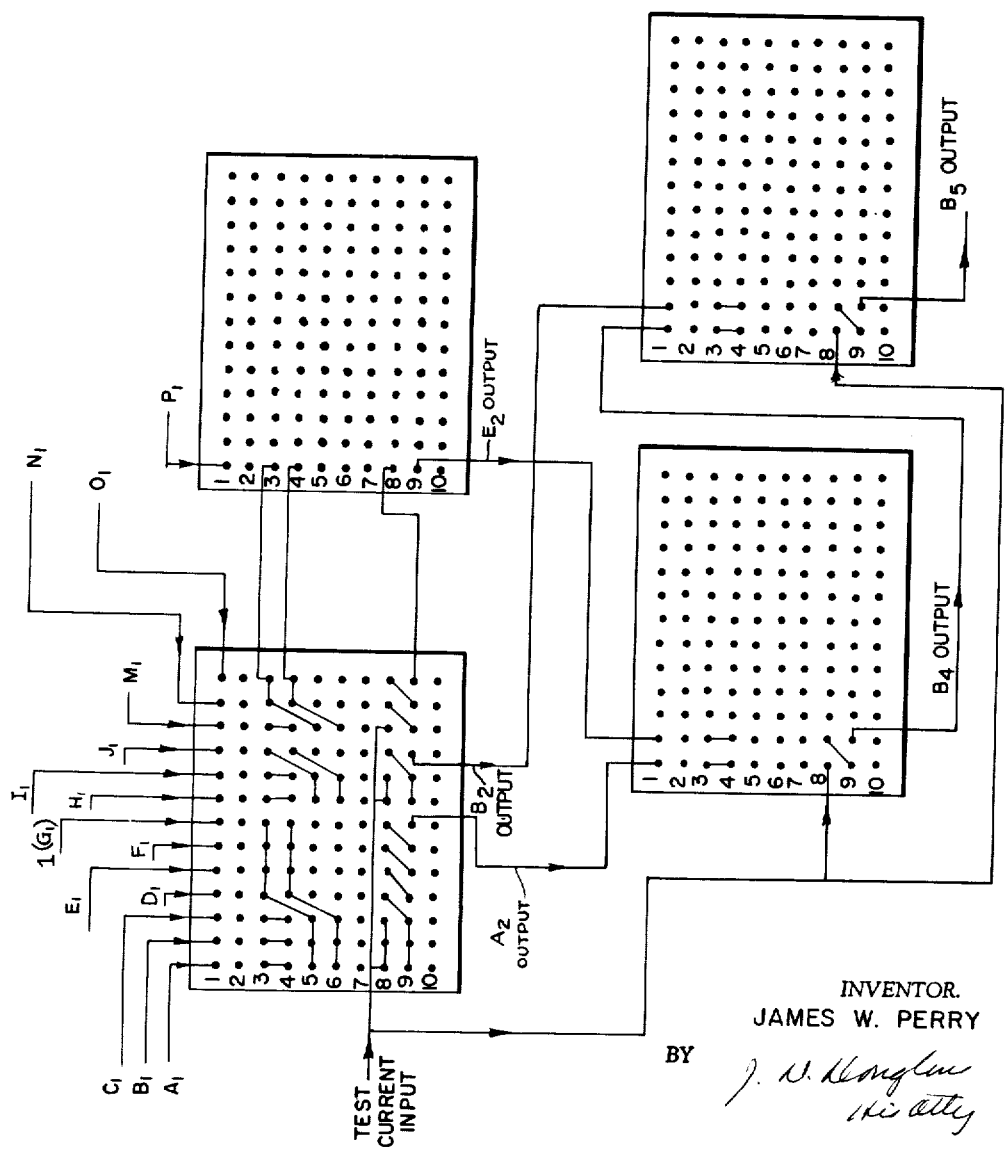

FIGURES 18 and 19 show relay panels wired to conduct a second search different from the first.

Figure 20:
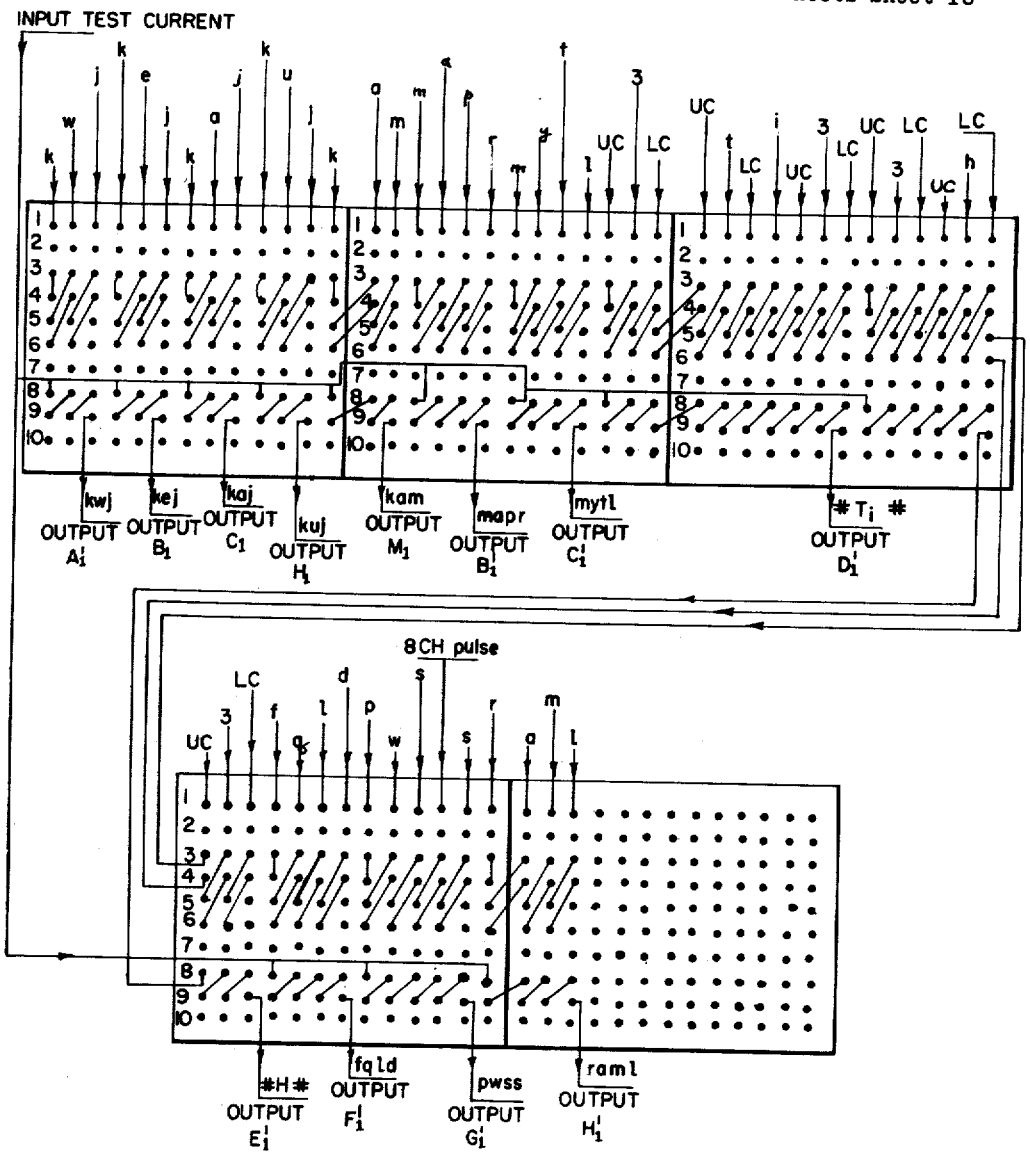
Figure 21:
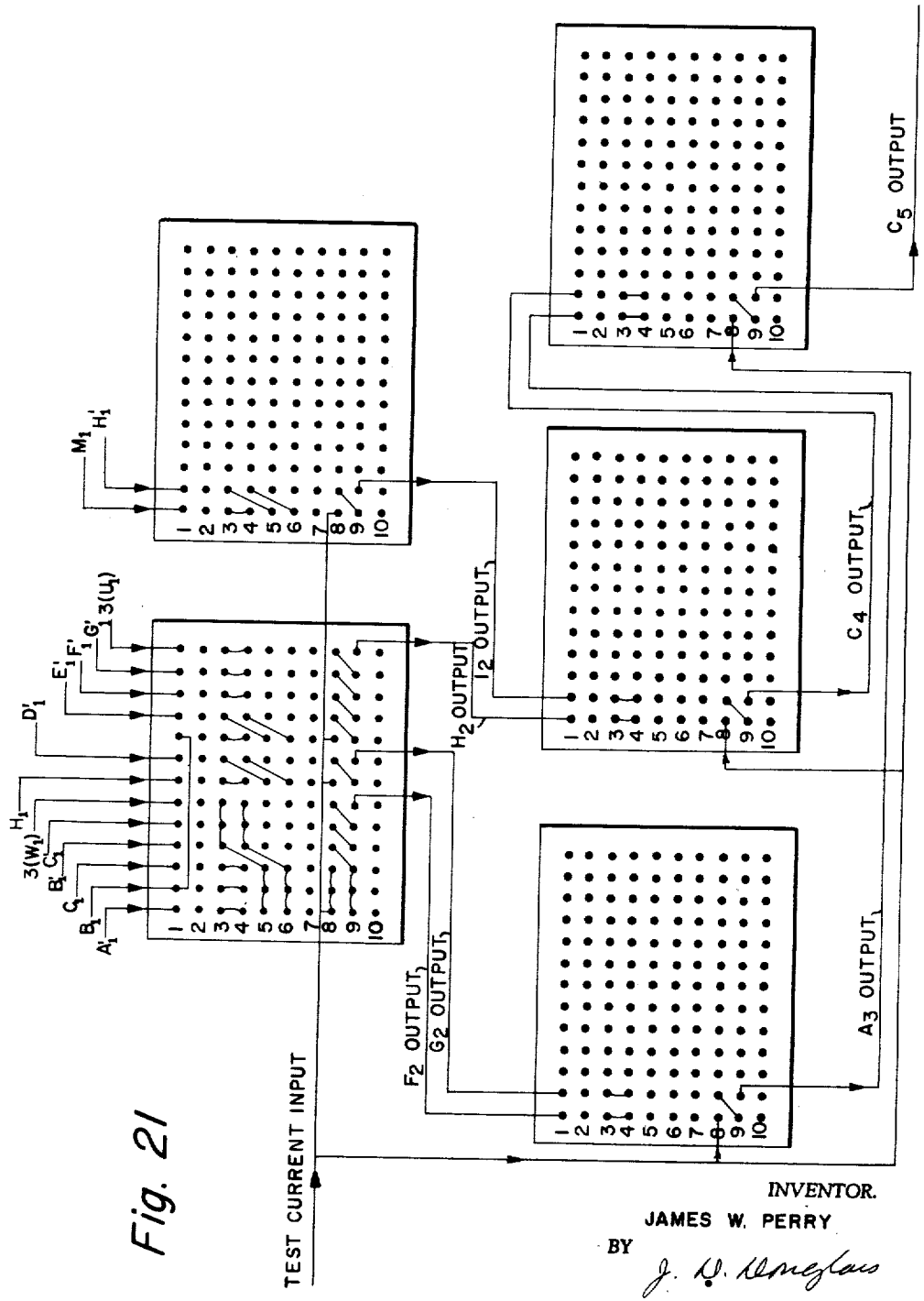

FIGURES 20 and 21 show relay panels wired to conduct a third search.

Figure 22:
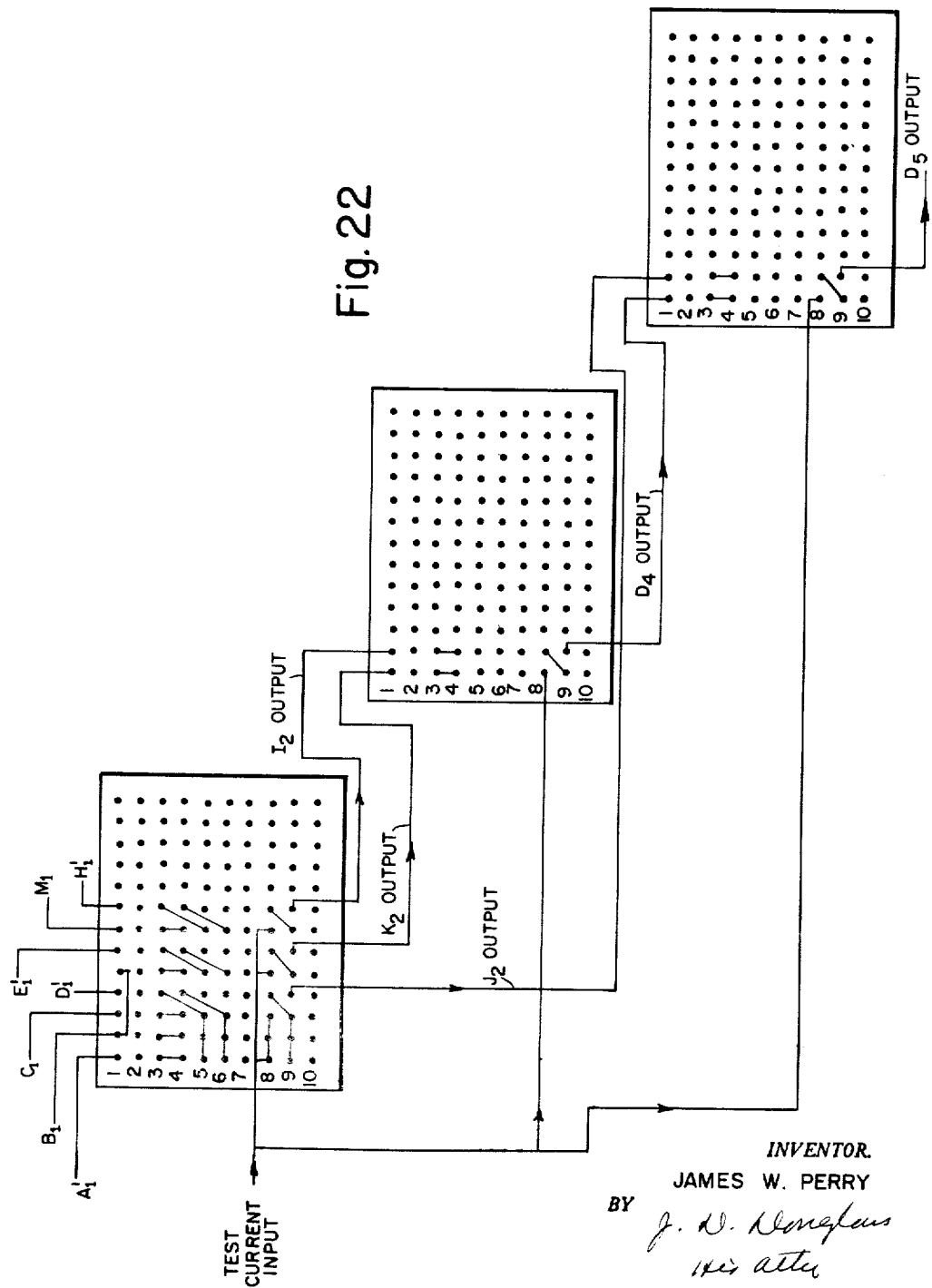

FIGURE 22 shows relay panels, the first of which receives its input from certain of the output lines from the FIG. 20 panels, for conducting a fourth search.

Figure 23:
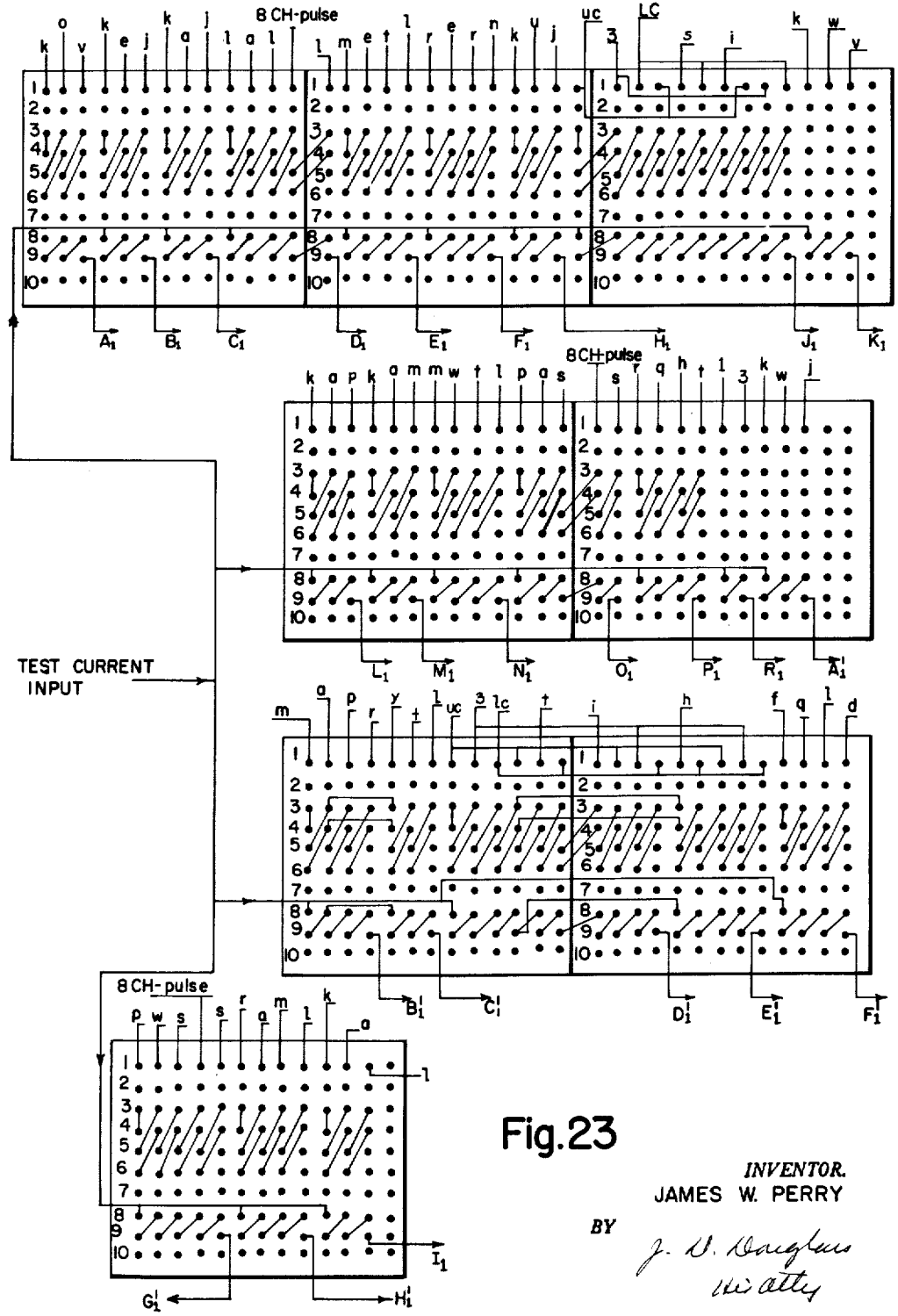

FIGURES 23 and 24 show relay panels wired to conduct simultaneously the four preceding searches.

Figure 25A:
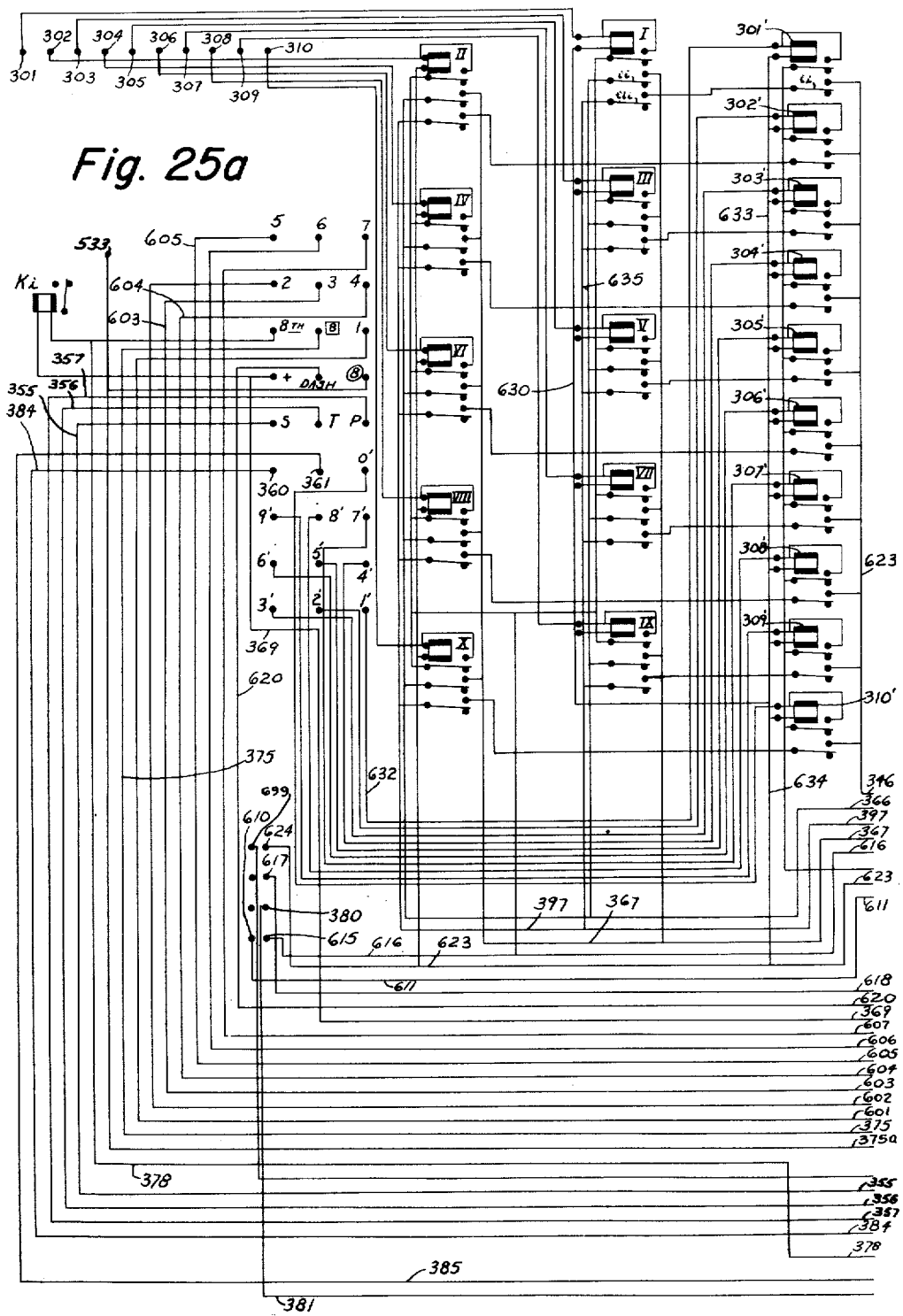
Figure 25C:
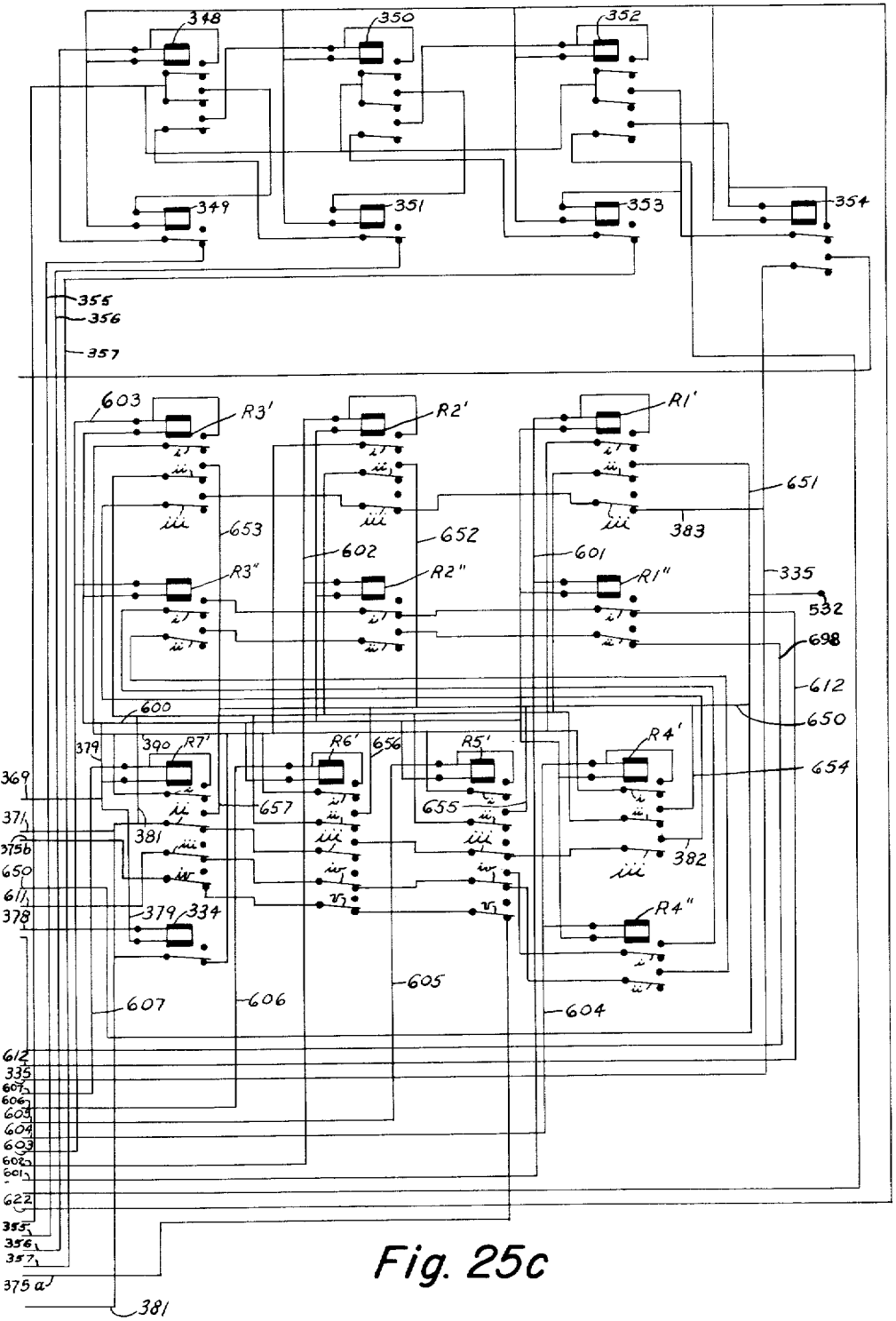

FIGURES 25A, 25B and 25C show the readout panel in the present invention, the lines which terminate at the left edge of FIG. 25A continuing as the lines which begin at the right edge of FIG. 25B, and the lines which terminate at the right edge of FIG. 25B continuing as the lines which begin at the left edge of FIG. 25C.

Figure 26C:
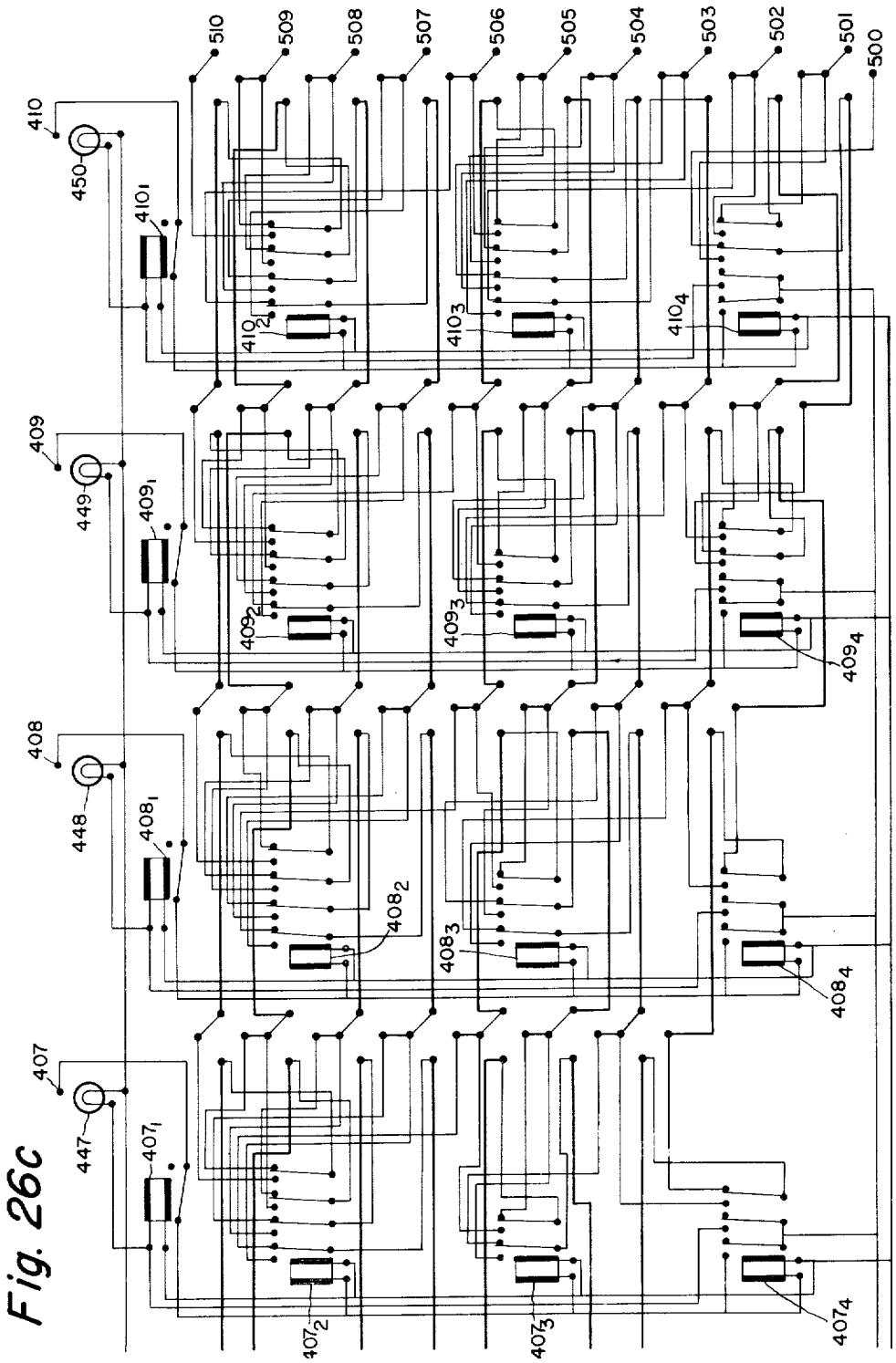

FIGURES 26A, 26B and 26C show a relay panel wired to detect one or more partial logical products, as well as a 10-term logical product which completely satisfies a search requirement. The lines which terminate at the left edge of FIG. 26A continue as the lines which begin at the right edge of FIG. 26B and the lines which terminate at the right edge of FIG. 26B continue as the lines which begin at the left edge of FIG. 26C.

Figure 27:
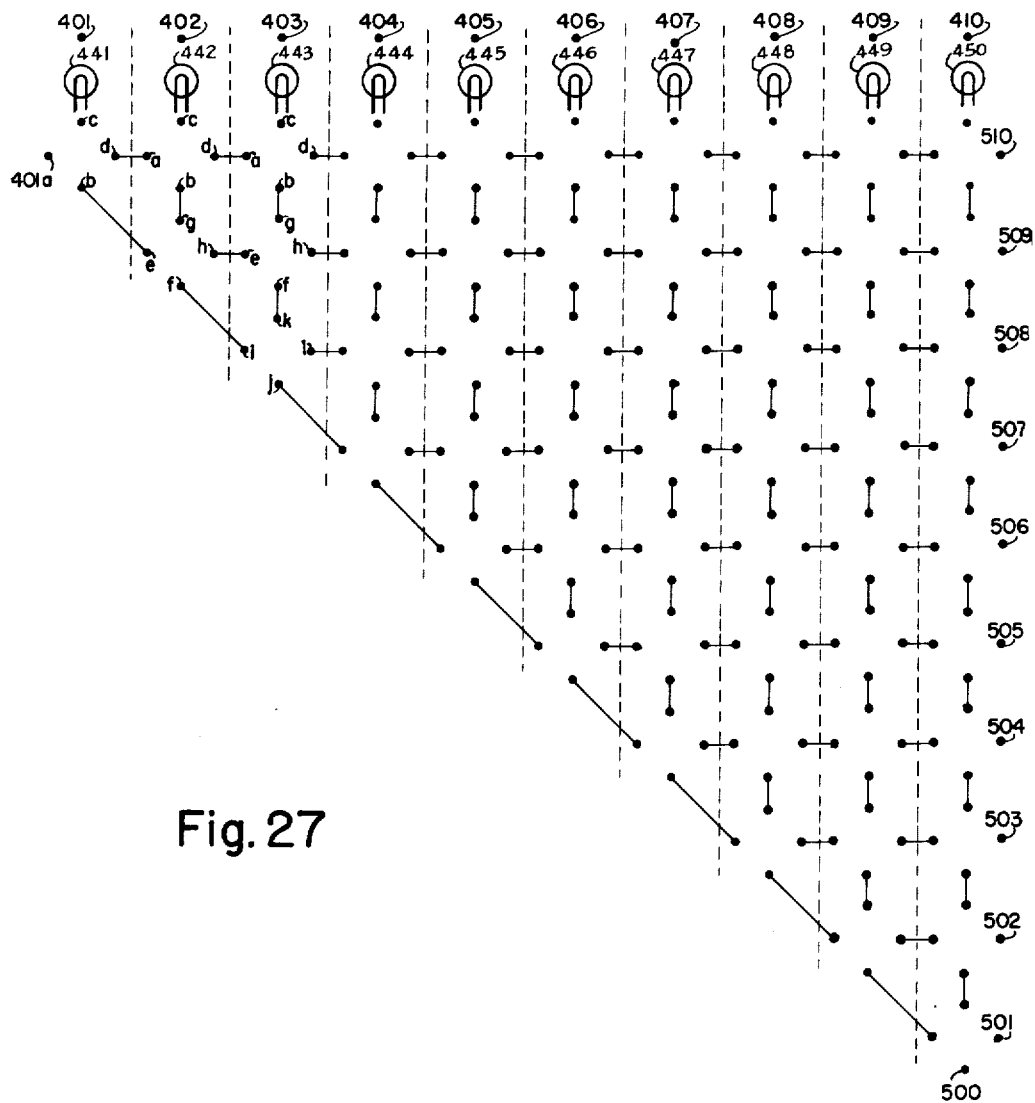

FIGURE 27 shows the external wiring of the panel of FIGS. 26A–C.

Figure 28:
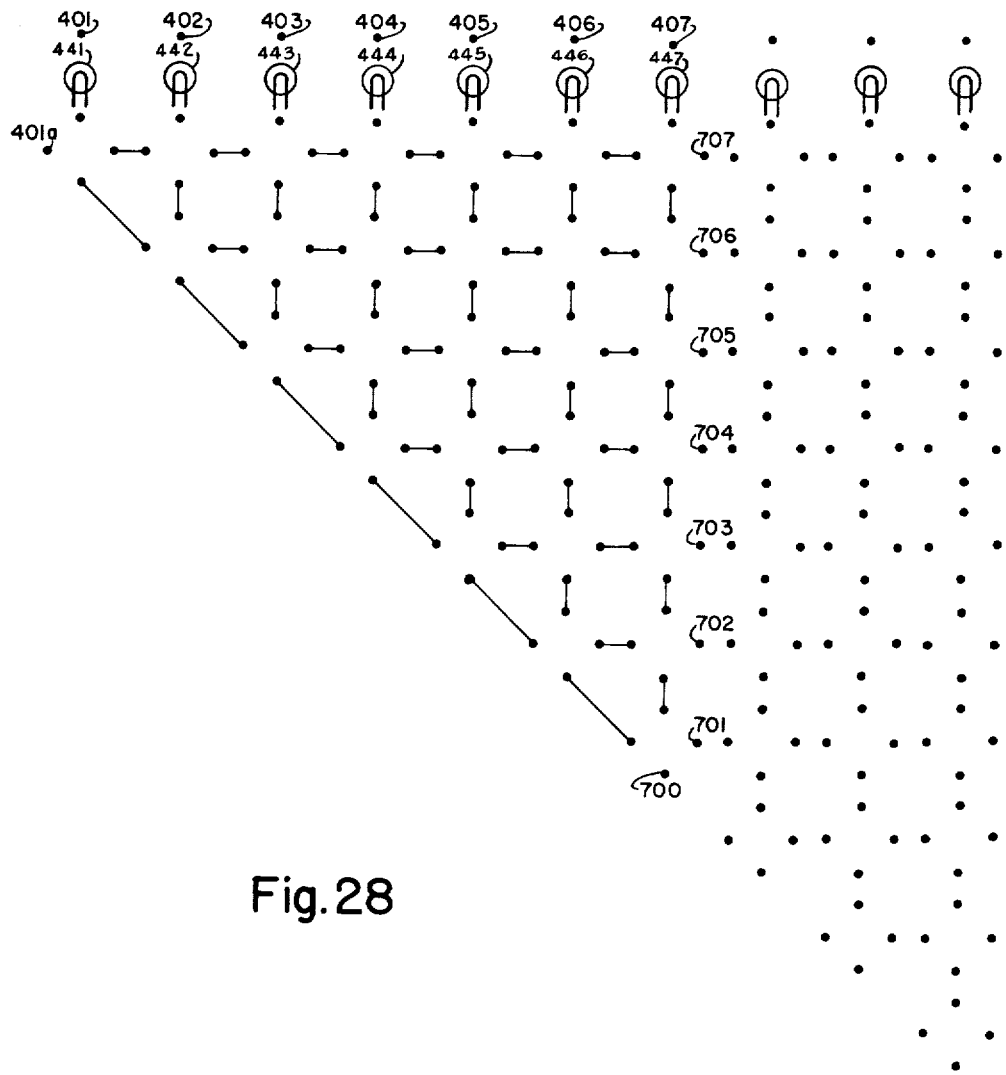

FIGURE 28 shows the external wiring of a relay panel (which has internal wiring corresponding to FIGS. 26A–C) for detecting a 7-term logical product or one or more partial logical products consisting of a lesser number of terms.

Figures 29, 31:
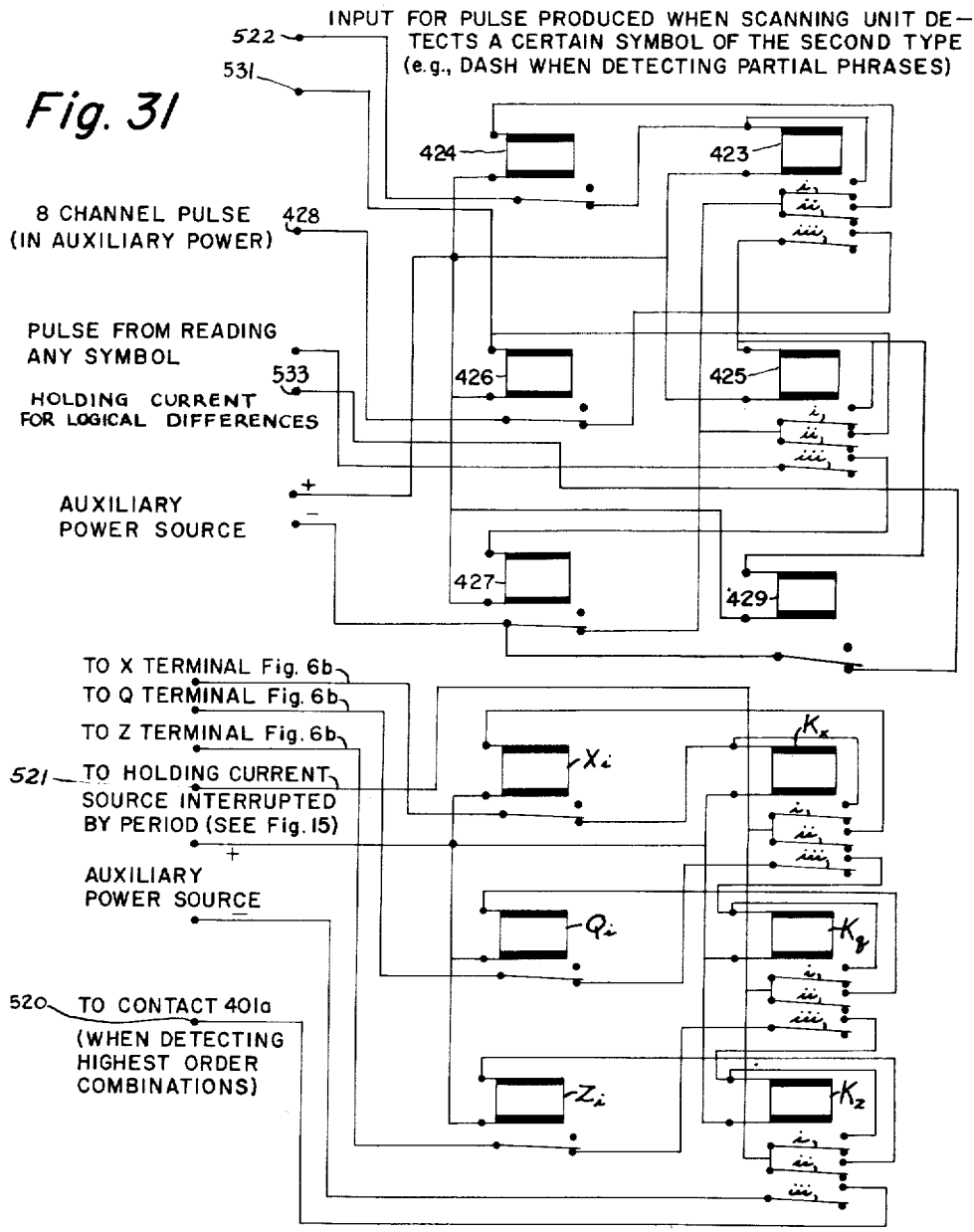

FIGURE 29 shows a relay circuit which is acted upon by the concluding symbols of an encoded abstract on the record tape to apply a test current to a panel of the type shown in FIGS. 27 and 28.

Figure 30:
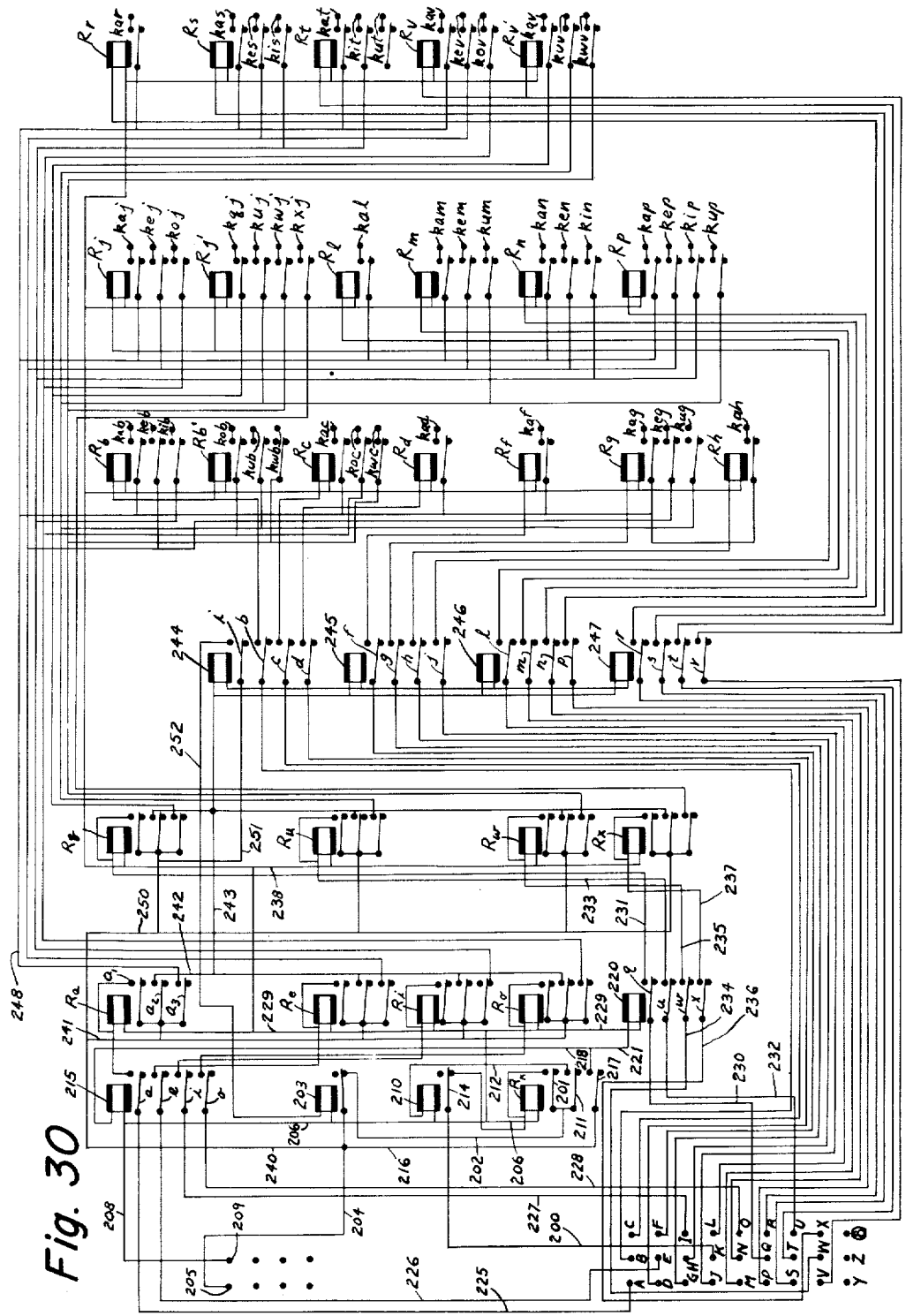

FIGURE 30 shows the special relay panel for detecting three-letter codes which are used to designate role indicators in the encoded abstracts searched by the present equipment.

FIGURE 31 shows a relay panel which responds to the detection of a control symbol from the record tape to control the operation of a panel as shown in FIGS. 26A, B, C, FIGS. 27 and 28 for detecting partial or complete satisfaction of a search requirement at a lower combinational level. The relay circuit of FIG. 31 is also used in the detection of a logical difference or of a complex logical relationship comprising a logical difference.

Figure 32:
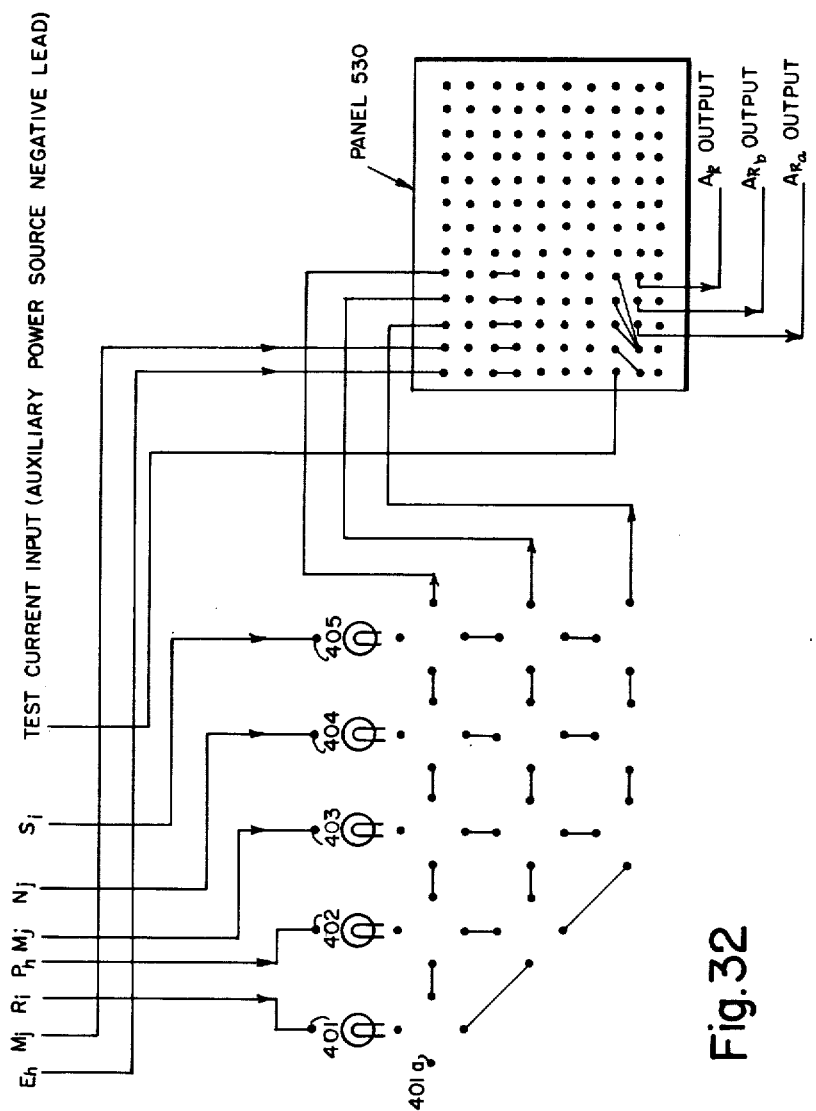

FIGURE 32 shows schematically a circuit arrangement of panels wired to detect logical products, certain terms of which may consist of a more-or-less incomplete logical product.

Figure 33:
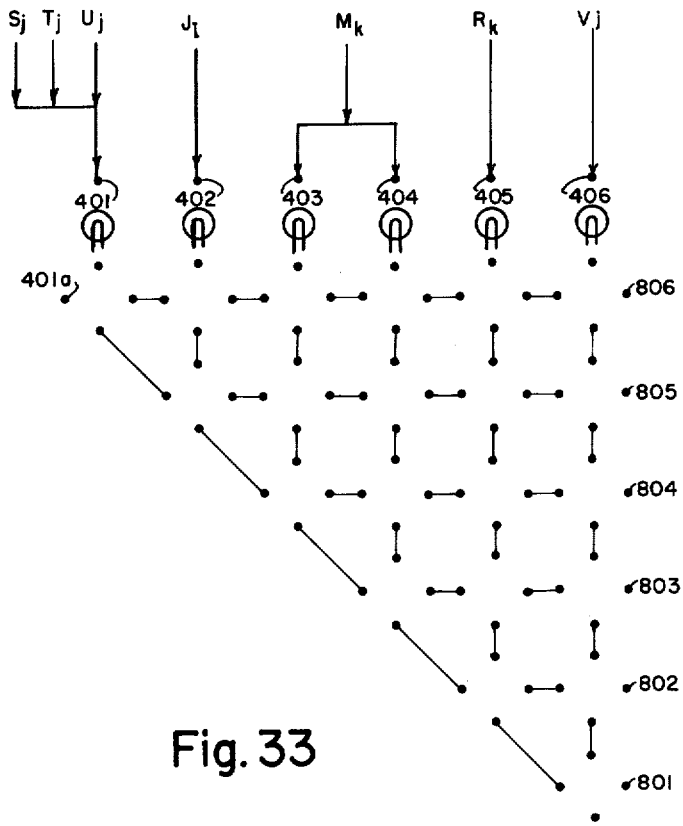

FIGURE 33 shows the external wiring of a panel capable of detecting one or more incomplete logical products, one of whose terms may be one of several elements, and having another term which carries greater weight than the other terms of the complete product.

Figure 34:
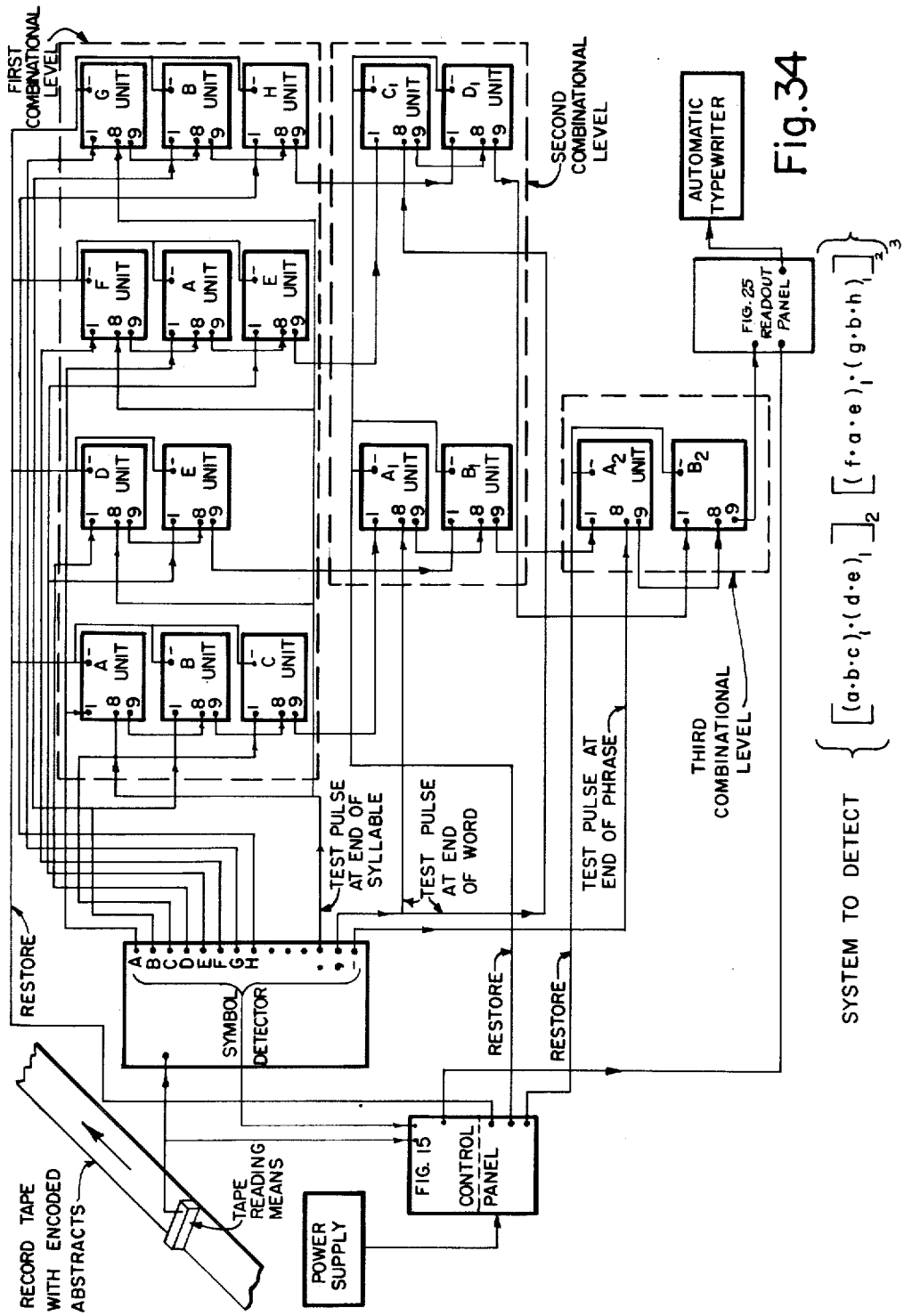

FIGURE 34 is a simplified schematic diagram showing a complete system, in accordance with the present invention, for detecting a particular search question.

THE BASIS FOR EQUIPMENT DESIGN

The design of automatic equipment must be based on a clear formulation of the purpose to be served and a detailed analysis of the operation to be performed.

As a first step in such formulation, the purpose of the present invention may be exemplified by the identification, within a collection of documents, of those documents that are of interest to a given problem or situation. As conducted with the aid of equipment to which this invention pertains, this type of identification operation involves the following general steps:

(1) Characterization of the subject contents of documents and recording of the results of such characterization in an appropriate record medium, e.g. punched paper tape or magnetic tape, which is scanned by the electronic equipment when performing searching and identifying operations.

(2) Analysis of the information requirement in terms of the same characteristics as were used for characterizing, in the record medium, the subject contents of documents.

(3) Identification of documents of interest by determining which of the documents were found on preliminary analysis of their subject contents to be characterized in the same way as the information requirement to be service. (This identification step consists, therefore, of a matching operation performed automatically and directed to the characteristics of documents, on the one hand, and the characteristics of an information requirement, on the other hand.)

CIRCUITS FOR DETECTING LOGICAL RELATIONSHIPS AMONG CHARACTERISTICS

The selection of documents on the basis of characteristics may be formulated on the basis of the theory of class definition. Thus one may specify that he wishes to select only those documents, each of which is characterized by all of several characteristics. Such a search requirement would correspond to a logical product, which may be symbolically exemplified by:

$$A \cdot B \cdot C \cdot D \cdot E$$

Another possibility is that one may wish to select all documents that are characterized by any one of several characteristics. Such a search requirement would correspond to a logical sum, which may be symbolically exemplified by:

$$A+B+C+D+E$$

Another possibility is that one may wish to select all documents that are characterized by the presence of some specified characteristic and by the absence of another. Such a search requirement would correspond to a logical difference, which may be symbolically exemplified by:

$$A-B$$

Finally one may wish to select all documents that are characterized by a set of characteristics interrelated in such a fashion that two or more of the above mentioned basic relationships (product, sum and difference) are involved. Such complex logical relationships may be symbolically exemplified by:

$$(A+B)(C+D)$$
$$A \cdot B + C \cdot D$$
$$A - B \cdot C$$
$$(A \cdot B + C)(E - D)$$

The three basic logical relationships and their complex combinations, as exemplified above, are of fundamental importance in designing the automatic searching and selecting equipment of this invention. To understand why this is true, it is necessary to consider how the above mentioned logical relationships may be detected with the aid of very simple electrical switching circuits.

FIGURES 1, 2, 3, 4, illustrate how combinations of relays may be wired so that above mentioned types of logical relationships may be detected by the closing of a single test relay. The circuits shown in FIGURE 1 through 4 are of basic importance in the design of the searching and selecting equipment of this invention. In all of these figures the relays are shown in their normal (de-energized) conditions.

Figure 1:
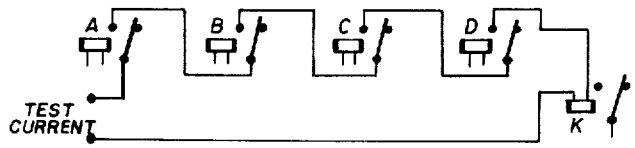
FIGURE 1 shows a relay circuit for detecting a logical product.

In FIGURE 1, if all of the relays A, B, C and D are energized simultaneously (and only if this is so) the test current relay K is energized to indicate that the conditions required by the logical product relationship $$A \cdot B \cdot C \cdot D$$

have occurred.

Figure 2:
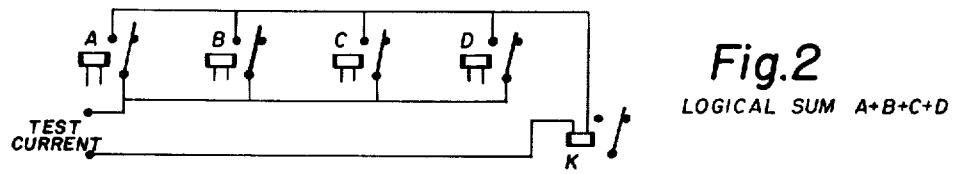
FIGURE 2 shows a relay circuit for detecting a logical sum.

In FIGURE 2, if any one, or several, or all of the relays A, B, C and D are energized the test current relay K is energized to indicate that a condition required by the logical sum relationship $A+B+C+D$ has occurred.

Figure 3:
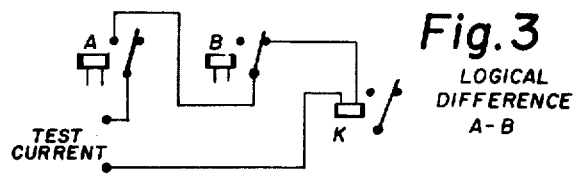
FIGURE 3 shows a relay circuit for detecting a logical difference.

In FIGURE 3, the test current relay K is energized only if relay A is energized at the same time that relay B is not energized. Such energization of relay K indicates that the conditions required by the logical difference relationship $A-B$ have taken place.

Figure 4:
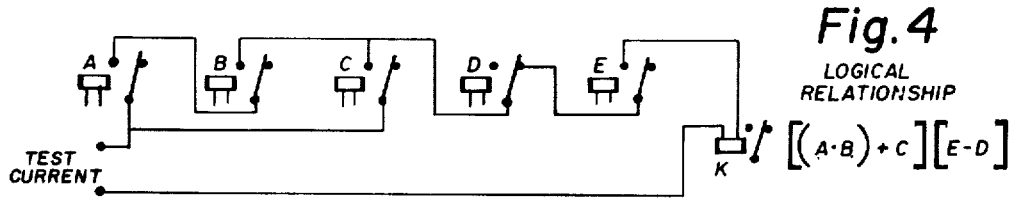
FIGURE 4 shows a relay circuit for detecting a complex logical relationship.

In FIGURE 4, the test current relay K is energized only if:

(1) Either relay C is energized or both relays A and B are energized together; and (2) Relay E is energized and relay D is de-energized at the same time that either of the conditions specified in (1) obtains. Such energization of relay K indicated that conditions required by the logical relationship $$[(A \cdot B) + C][E - D]$$

have occurred.

The principles of the circuits shown in FIGURES 1–4 may be extended to cover any desired logical relationship among a number of characteristics, as will be exemplified subsequently.

ENCODING OF RECORDED INFORMATION

To provide background for detailed discussion of how these basic circuits are worked out and applied in this invention, attention is next directed to certain structural features of the recorded information, or messages which the equipment is designed to search.

The basic units in these messages are individual symbols, namely letters, numbers and special symbols such as punctuation marks. Significance of one type or another is attached not only to certain individual symbols but also to combinations of symbols, as typified by a symbol sequence, such as *kej*, which may be used to designate "material processed," or by a symbol sequence such as *m—ch*, which may be used to designate the generic concept of "machine, device, tool." Here the dash may indicate any one of a group of letters used to denote certain relationships between the generic concept and an encoded term. Thus *mach* may be used as part of the code for a term which designates a machine or a kind of machine.

By combining code elements, such as *mach*, together with arbitrarily assigned numerals, codes for specific terms may be constructed. Thus the code *mach, musr. twmm.* 1 for "clock" may be established to indicate a device for measuring time.

In the encoded messages, the codes for individual terms may be combined with special codes that indicate relationships or roles as exemplified by *kej* to indicate "material processed". In this way code combinations analogous to inflected "words" are formed from which "phrases" may be constructed.

In recording the characteristics of the subject contents of documents preparatory to conducting searching and selecting operations, it may be appropriate to organize a multiplicity of "phrases" into units of higher order analogous to "sentences" and a multiplicity of "sentences" may be organized into "paragraphs". Further higher orders of organization may, if advantageous, be provided and used in constructing the messages to be searched by the equipment of this invention.

For illustrative purposes, attention is directed to a situation in which each "message" recorded on the medium to be scanned may consist of one or more "paragraphs" or in exceptional cases, of a single "sentence" or still more exceptionally, of a single "phrase".

To formulate this situation more concisely, the capital letters $A_0$, $B_0$, $C_0$, $D_0$, etc. may be regarded as designating individual symbols for purposes of abstract discussion.

Letters with the following subscripts will be used to designate various levels of combinations as follows:

- $A_1, B_1, C_1, D_1$, etc. for the "syllables"
- $A_2, B_2, C_2, D_2$, etc. for "words"
- $A_3, B_3, C_3, D_3$, etc. for "phrases"
- $A_4, B_4, C_4, D_4$, etc. for "sentences"
- $A_5, B_5, C_5, D_5$, etc. for "paragraphs"
- $A_6, B_6, C_6, D_6$, etc. for "messages"

This ability to organize characteristics into successive levels of higher order analogous to "words", "phrases", "sentences", etc., is important in preventing false association of characteristics when searching. For example, by proper "phrasing" it is possible to prevent the properties of one chemical compound being incorrectly attributed to some other compound. The use of "phrases", "sentences", "paragraphs", etc., in analyzing and recording the characteristics of scientific and technical subject matter is discussed in greater detail in the book "Machine Literature Searching" by J. W. Perry, et al., Interscience Publishers, New York, 1956.

At any level, which we may term the "$n$-th" level, a combination as specified to define the scope of a search will consist, in general, of a number of component combinations at the "$n-1$" level. Each of several "$n$-th" level combinations, denoted by $A_n, B_n, C_n, D_n$, etc. may be specified in terms of component units designated by $A_{n-1}, B_{n-1}, D_{n-1}$, etc. Thus, in conducting a search, it may be specified, as a condition that a document will be identified as being of pertinent interest, that at least one "$n$-th" level combination shall be characterized by certain component units. Specification of the component units may be set up on the basis of the following relationships. It may be specified that—

(1) *All of several component units must be present.*— This requirement constitutes a logical product that may be symbolized, for example, by:

$$A_{n-1} \cdot B_{n-1} \cdot C_{n-1}, \text{ etc.}$$

In specifying logical products, further requirements as to order may be imposed. Thus, for example, it may be required that all components specified by a logical product shall occur in sequence. For example, it may be required that $A_{n-1}$ shall be followed by $B_{n-1}$ and it in turn by $C_{n-1}$. This requirement may be symbolized by:

$$<A_{n-1} \cdot B_{n-1} \cdot C_{n-1}>$$

The reverse order of these three components might also be specified as denoted by:

$$<C_{n-1} \cdot B_{n-1} \cdot A_{n-1}>$$

(2) *Any one of several component units or, alternately, one or more of several component units must be present.*— This requirement constitutes a logical sum that may be symbolized, for example by:

$$A_{n-1} + B_{n-1} + C_{n-1}, \text{ etc.}$$

(3) *At least one component unit must be present but at least one other component unit must be absent.*—This requirement constitutes a logical difference that may be symbolized, for example, by $$A_{n-1} - B_{n-1}$$

Here, also, order may be designated. Thus it may be specified that $B_{n-1}$ may not follow $A_{n-1}$. This requirement would be symbolized by:

$$<A_{n-1} - B_{n-1}>$$

Alternately, it might be specified that $B_{n-1}$ may not precede $A_{n-1}$ and this would be symbolized by:

$$<-B_{n-1} \cdot A_{n-1}>$$

(4) *Combinations of component units expressed by complex logical relationships must be present.*—Such logical relationships as the following may be specified:

$$[(A_{n-1} \cdot B_{n-1}) - C_{n-1}] [D_{n-1} + E_{n-1}]$$
$$(A_{n-1} + B_{n-1})(C_{n-1} - D_{n-1})E_{n-1}$$
$$[A_{n-1} - B_{n-1}][(C_{n-1} \cdot D_{n-1}) - E_n]$$

Any such complex logical relationship may be set up as required at any level. Such complex logical relationships may also involve specification of sequential order. Using the symbols $<\ >$ to denote order as before, we might specify such search requirements as:

$$[<(A_{n-1} \cdot B_{n-1}) - C_{n-1}>][D_{n-1} + E_{n-1}]$$
$$[(A_{n-1} + B_{n-1})][<(<C_{n-1} - D_{n-1}>)E_{n-1}>]$$
$$<[<A_{n-1} - B_{n-1}>][(C_{n-1} \cdot D_{n-1}) - E_{n-1}]>$$

By designing the equipment so as to provide these capabilities, it is possible to specify "syllables" in terms of component symbols, e.g. letters, to specify "words" in terms of "syllables", "phrases" in terms of "words", "sentences" in terms of "phrases", "paragraphs" in terms of "sentences" and "messages" in terms of "paragraphs." As noted above, the equipment is also designed to detect and to respond to sequences either of individual symbols or of combinations of symbols insofar as sequential order is of meaningful significance in the encoded messages or in the codes for individual terms.

As already noted, the abstract formulation of higher order characteristics in terms of their lower order components has been restricted to the special case that the "$n$-th" order characteristic, e.g. a "sentence" shall be specified in terms of its components at the next lower "$n-1$" level, e.g. at the "phrase" level. The equipment of this invention permits a higher order combination to be specified in terms of any desired combination of lower order characteristics provided only that their order is less than "$n$." Thus, for example, "sentences" may be specified not only in terms of logically defined combinations whose component elements are "phrases" but whose elements are also "words," "syllables" and individual symbols. In abstract formulation, a characteristic of "$n$-th" order may be specified:

(1) As a logical product e.g. $A_j \cdot B_k \cdot C_l$
(2) As a logical sum e.g. $A_j + B_k + C_l$
(3) As a logical difference e.g. $A_j - B_k$
(4) As complex logical combinations e.g.

$$[(A_k \cdot B_g) - C_h][D_f + E_l]$$
$$(A_k \cdot B_g)(C_f - D_e)E_h$$
$$[A_g - B_f][(C_h \cdot D_k) - E_l]$$

where "$f, g, h, j, k, l$" are each less than "$n$."

In such combinations, two or more component elements of lower order than "$n$" may be of the same lesser order, as will be illustrated by subsequent examples.

When defining a "$n$-th" order characteristic as a logical combination built up of component elements all of which are not of the same lesser order, the sequential order of component elements may be specified subject to certain limitations whose formulation leads into rather complex symbolic logic and which, consequently will not be discussed further in this application.

MULTIPLE SEARCHING

Before discussing the design of the searching and selecting equipment in detail, its ability to perform a multiplicity of searches, e.g., ten searches, simultaneously will be reviewed briefly.

Simultaneously conducted searches may involve completely unrelated information requirements. For example, one search might be directed to documents on production of lithium ore in Canada during the year 1955 and a simultaneously conducted search might be directed to the use of manganese containing alloys for treating molten cast iron to improve its properties. Simultaneously conducted searches may also be directed to interrelated search requirements. For example, the following interrelated searches could be conducted simultaneously and documents pertinent to each could be identified.

(1) Application of the Photovolt Multiplier Photometer to absorption spectrophotometry.

(2) Application of electronic light measuring devices to absorption spectrophotometry.

(3) Use of electronic devices in absorption spectrophotometry.

(4) Use of electronic devices in spectrophotometry.

(5) Instrumentation in spectrophotometry.

Such possibilities of conducting interrelated searches are particularly important in correlating information scattered among different documents.

In summarizing the capabilities of the equipment of this invention, reference has been made to its application in searching encoded abstracts as described in the previously published book, "Machine Literature Searching," already referred to. It is perhaps obvious from the abstract statement of the equipments capabilities, as formulated with the aid of Boolean notation, that the equipment is not limited in its application to scanning encoded abstracts. Rather the equipment may be used to perform a very broad range of logically defined identifying operations directed to characteristics expressed by any symbolism that may be recorded in the searching medium.

The preceding discussion of searching and selecting capabilities has been directed to defining a set of characteristics in terms of logical product, logical sum and logical difference at varying combinational levels, as exemplified by combinations of symbols to form "syllables," of "syllables" to form "words," or "words" to form "phrases," etc. Such specification of searches, in so far as logical sums are involved, provide for specifying that any one of a certain set of several symbolically expressed search requirements shall suffice as far as that set is concerned. For example, a search requirement $A_n$ may be defined by $$(A_{n-1} + B_{n-1} + C_{n-1})(D_{n-1} + E_{n-1})(F_{n-1} + G_{n-1} + H_{n-1}) \cdot J_{n-1}$$

Such a search requirement would be satisfied by any one of the characteristics denoted by $A_{n-1}$, $B_{n-1}$, $C_{n-1}$ in combination with either $D_{n-1}$ or $E_{n-1}$ and also in combination with any one of the characteristics $F_{n-1}$, $G_{n-1}$, $H_{n-1}$, with the further requirement that $J_{n-1}$ shall also be detected. In this example we may regard the search requirement as consisting of a logical product each member of which is in turn either a logical sum, viz.

$$A_{n-1} + B_{n-1} + C_{n-1} \quad (1)$$
$$D_{n-1} + E_{n-1} \quad (2)$$
$$F_{n-1} + G_{n-1} + H_{n-1} \quad (3)$$

or a single term, viz., $J_{n-1}$.

In general, when at least one characteristic each from $\Sigma$ sets is required the equipment may be conditioned, e.g., by wiring the plugboard, to identify those encoded messages whose recorded characteristics correspond to a logical product made up of $\Sigma$ members. The equipment to which this invention pertains also provides that those messages may be identified which correspond to detection of some lesser plurality-denoted by $\Gamma$—within the totality of $\Sigma$ specified characteristics. This alternate possibility of specifying searches may be abstractly symbolized at some one combination level, as follows.

$$(A_{n-1} \cdot B_{n-1} \cdot C_{n-1} \cdot D_{n-1} \dots )_{\Sigma}^{\Gamma}$$

where each of the $\Sigma$ members of the logical product (viz. $A_{n-1} \cdot B_{n-1}$, etc.) may be defined in terms of the next lower combination level (viz. $A_{n-2}$, $B_{n-2}$, etc.) as previously discussed. Furthermore in the general case, the detection of a set of $\Gamma$ members within a logical product consisting of a totality of $\Sigma$ members may involve terms of different combinational levels as symbolized by:

$$(A_i \cdot B_j \cdot C_k \cdot D_m \cdot E_p \dots )_{\Sigma}^{\Gamma}$$

where $i$, $j$, $k$, $m$, and $p$ may correspond in the general case to different values of $n$ in the previous discussion of possible specification possible in combinations of characteristics.

In a given searching and selecting operation, different values of $\Gamma$ may be established as characterizing different simultaneously performed searches. For example, when $\Sigma$ equals 10, different searches may be set up for $\Gamma$ equals 9, 8, 7, 6 (or additional lesser numbers as may be required) together with another search also performed simultaneously directed to the detection of all $\Sigma = 10$ numbers that constitute the logical product under consideration. Each serial number, name or similar designation of a given message or other item identified in this fashion will be automatically listed together with an additional symbol, e.g. a numeral, that indicates either the value of $\Gamma$ as detected during searching a given encoded message or the fact that the full $\Sigma$ set of characteristics had been detected during such searching.

This ability to detect and to record detection of an incomplete set of characteristics, for example within an encoded message, is particularly useful when dealing with documents that contain incomplete yet useful information with regard to a certain question or situation. By indicating, as noted above, in the automatically prepared listing the extent to which a given encoded message satisfies a set of characteristics specified by a logical product of $\Sigma$ terms, indices are provided which serve to indicate different degrees to which the various documents may be expected to be of pertinent interest to a given problem or situation. This not only can conserve much time by directing attention to documents of greater probable pertinent interest but also, by so doing, facilitates correlation of more highly fragmentary information on the basis of less fragmentary information.

MAJOR UNITS AND THEIR FUNCTIONS IN PRESENT EQUIPMENT

As an illustration of equipment for performing the previously discussed searching and selecting operations, a detailed description will be given of a prototype machine, hereafter referred to as the searching selector. In accord with previous discussions, the operation of this equipment involves the following:

(1) Provide a record of encoded messages in an appropriate medium. (The medium used by the prototype equipment is punched paper tape in which are recorded the characteristics of documents, one after another, for subsequent search by the selector. Individual symbols and combinations of symbols may be used to record the characteristics of documents in the same way that individual letters and combinations of letters are used to denote words in ordinary writing. It should also be noted that meaning may be assigned to any single symbols or to any combination of symbols as may be appropriate.)

(2) Read the punched paper tape and convert the pattern of holes used to record successive symbols into corresponding electronic pulses, which then activate the symbol detector and the discriminating unit.

(3) Detect those characteristics and combinations of characteristics which typify the subject contents of documents that are of pertinent interest. The discriminating unit is selectively connected to the symbol detector to accept the component symbols of those characteristics that are used to designate the scope of a question. The discriminating unit is conditioned to detect logically defined combinations of such characteristics by appropriate wiring of a plug board prior to initiating a given search.

(4) Type out automatically the serial numbers of those documents whose characteristics correspond to the requirements of a given search. The scope of a search will be expressed by specifying that the documents of pertinent interest shall have some one characteristic or some combination of characteristics as outlined above.

These four functions are preformed by four interacting major units.

The first of these is the record medium in the form of a paper tape which is punched to record sequences of symbols appropriately organized to express various characteristics of the subject.

The second unit is a device which scans the punched paper tape and converts each recorded symbol, i.e., each corresponding combination of punched holes, into a characteristic combination of electrical pulses.

The third unit receives these combinations of pulses and conducts various detecting and discriminating operations to identify those encoded abstracts that are of pertinent interest in connection with a search directed to a given information requirement. This symbol detector and discriminator unit is conditioned with regard to the information requirement by appropriate wiring of its plugboard as subsequently described. When an abstract of pertinent interest has been identified, the discriminator provides certain signals as its output.

The fourth unit is an automatic typewriter which is activated by the output signals originating in the other units. This fourth unit produces a listing of those abstracts or documents that have been identified as pertinent. Such listing is accomplished by causing the automatic typewriter to print out a list of serial number of the identified abstracts or documents. In addition to the serial number, the bibliographic reference may also be typed, as will be discussed in detail subsequently.

When conducting simultaneous searches, each of them is assigned a different number which is automatically typed immediately following the serial number of each abstract or document whose characteristics are found to correspond to the search requirement in question. If a given document fulfills the requirements of several simultaneously conducted searches, all of the latters' identifying numbers are typed immediately following the serial number of the abstract or document in question.

Each of these four major units will now be considered individually.

(i) *The Recording Medium*

The recording medium is a conventional punched paper tape known as a "Flexowriter" tape, in which each character is recorded in sequence by a combination of holes arranged in a transverse line across the tape. In each successive line, holes may be punched in one or more of seven information columns or channels running lengthwise of the tape.

The tape is scanned by a conventional tape scanning unit which is coupled to an automatic typewriter to control certain operations of the latter.

Figure 5:
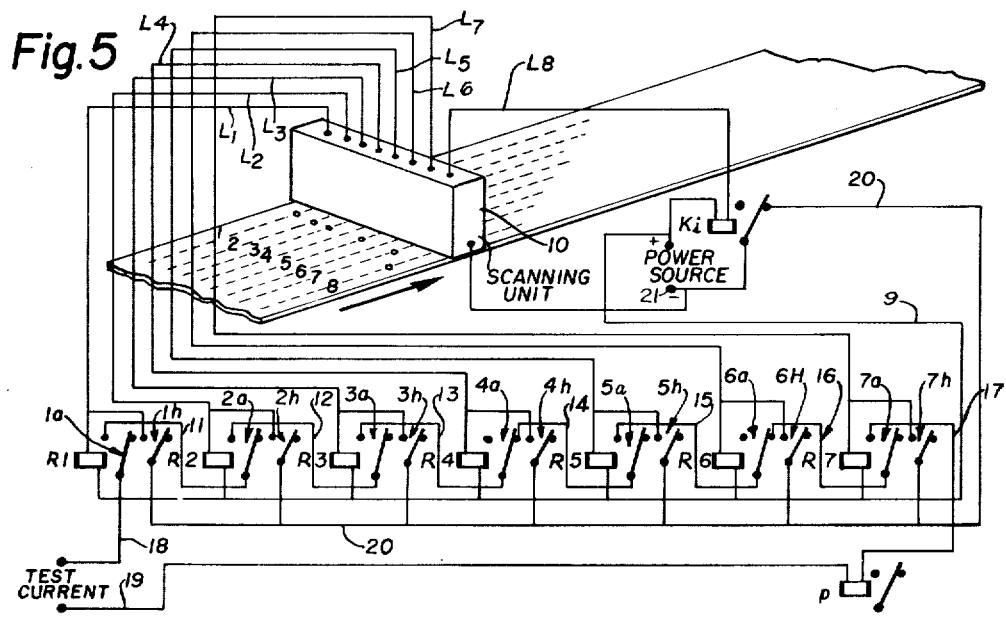
FIGURE 5 shows schematically an arrangement for detecting the letter "p" from a punched paper tape, using a relay circuit connected to detect the logical relationship which corresponds to the combination of holes punched in the first seven channels on the tape to represent and to record the letter "p."

In addition to the seven information channels, the tape has an eighth channel which is suitably punched to provide certain machine control operations as discussed subsequently. After each symbol recorded by one or more holes, punched in one or more of the channels 1–7, inclusive, a lone hole is punched in the eighth channel of the next line. In FIGURE 5, a portion of the tape is shown. Here the dotted lines numbered 1–8 inclusive indicate the eight channels. In FIGURE 5, the letter "*p*" is shown as recorded by a combination of holes in channels 1, 2, 3, 5 and 7 punched in a single transverse line across the tape. FIGURE 5 also indicates the direction of movement of the tape through the scanning unit. FIGURE 5 shows, further, the single punch in channel 8 that immediately follows the punching for the example letter "*p*." In operational tapes, this punch in channel 8 would be followed by punching, in another transverse line, one or more holes to record the next symbol in the same way as indicated for the letter "*p*." Next would come another punch in channel 8 and so on, with the punching of one or a combination of holes in channels 1–7 to record individual symbols (namely, letters, numerals, punctuation and special signals, such as (SP), (PR), (NP), (CR), and (ST)) alternating with a single punch in channel 8.

In addition to the encoded abstract, certain symbol sequences as follows are also punched in the tape. (Note that in each of these symbol sequences, the tape punching for each symbol is followed in the next line by a hole in the eighth channel.)

Read-out Symbol Sequence. At the end of each abstract, the following symbol sequence is punched

```
                                   Abstract
 .  ,  -  .&  xqz.  (PR) (PR)  /Serial Number  (SP) (SP) (NP) (NP) , 1 (PR) (PR) 1 (SP) (SP) (NP) (NP) ,  2 (PR) (PR) 2 (SP) (SP) (NP) (NP) , 3 (PR) (PR) 3 (SP) (SP) (NP) (NP) ,  4 (PR) (PR) 4 (SP) (SP) (NP) (NP) , 5 (PR) (PR) 5 (SP) (SP) (NP) (NP) ,  6 (PR) (PR) 6 (SP) (SP) (NP) (NP) , 7 (PR) (PR) 7 (SP) (SP) (NP) (NP) ,  8 (PR) (PR) 8 (SP) (SP) (NP) (NP) , 9 (PR) (PR) 9 (SP) (SP) (NP) (NP) ,  0 (PR) (PR) 10 (SP) (SP) (NP) (NP) , (CR) (PR) (PR) (CR) (NP) (NP) ,  -  (PR) (PR) (SP) (SP)   Bibliographic citation (CR) (NP) (NP) . , - &  ⌐
```

In this symbol sequence, the symbol (PR) is a "print restore" signal which, subsequent to detection of the pertinency of the preceding abstract to a given search, as discussed subsequently in detail, causes the circuits of FIGURES 25A, 25B, 25C to function in a selective fashion so as to route the electrical pulses generated by reading the tape from the discriminating unit described below to the automatic typewriter which is then caused to type by the said electrical pulses, until a (NP) symbol is read by the tape scanning unit. (SP) is a space signal which can cause the typewriter carriage to move one space, (NP) is a "non-print" signal which performs several functions as described subsequently in detail. One essential function is to shift the routing of electrical pulses, generated by reading subsequent symbols punched in the tape, away from the automatic typewriter to the discriminating unit. The (NP) signal thus countermands and reverses the action of the (PR) signal. Thus, after reading the (NP) signal, the electrical pulses generated by reading subsequent symbols in the tape will be routed to the discriminating unit and the automatic typewriter will not be activated until a (PR) symbol becomes functional as described in detail subsequently in explaining the circuits shown in FIGURES 25A, 25B and 25C, and (CR) is a "carriage return" signal which can cause the typewriter carriage to be positioned for typing the next line of print. The foregoing sequence of symbols is provided to activate and control the automatic typewriter when listing those abstracts or documents whose recorded characteristics have been found to correspond to the requirements of a search. A detailed account of the functions performed by these various symbols will be given subsequently in connection with the description of the circuits of the readout panel.

Reel Start Symbol Sequence. At the start of each reel of paper tape the following sequence of symbols is punched: (NP) ⊟ . , - & ⊟. This set of symbols is provided (i) to activate the tape scanning unit as discussed under that heading and (ii) to ensure that the searching unit is cleared and ready to function.

Reel End Symbol Sequence. At the end of each reel of tape, a special symbol sequence, namely . stp — . (PR) (PR) (ST) is recorded. This symbol sequence has the function of halting the operation of the tape reading unit and thus shutting down the equipment. (The symbol (ST), like (PR), (CR), (NP), (SP), denotes a special punched hole combination, not a combination of letters.)

Summarizing, therefore, each reel of punched paper tape as prepared for scanning and selection by the apparatus being described contains the following sequences of symbols:

Reel start symbol sequence
Various symbols and symbol sequences for recording the first encoded abstract
Read-out symbol sequence
Thereafter, alternately, (i) the various symbols and symbol sequences for recording the next encoded abstract, and (ii) the read-out symbol sequence. (As many encoded abstracts are so recorded as the length of the tape in a reel permits)
Reel end symbol sequence In searching a reel of tape on which may be recorded encoded abstracts of possible pertinent interest to a given information requirement, the reel of tape is passed through the tape scanning unit, starting with the "Reel start symbol sequence," thereafter the successive encoded abstracts each followed by an accompanying "Read-out symbol sequence," and concluding with the "Reel end symbol sequence." If among the recorded characteristics of a given encoded abstract the discriminating unit detects a set of characteristics that correspond to and satisfy an information requirement as specified by wiring the plugboard of the discriminating unit, then, for that encoded abstract, the immediately following "Read-out symbol sequence" causes such pertinency of the said encoded abstract to be recorded by causing the automatic typewriter to operate as set forth in detail in describing the functioning of the circuits shown in FIGURES 25A, 25B, 25C. For all other abstracts which are non-pertinent, the "Read-out symbol sequence" is passed over without the automatic typewriter becoming operative.

The punching of the tape to record successive symbols is accomplished by a punch mechanism having provision to be coupled to the keyboard of the typewriter. When the key for a given symbol is depressed, the punch mechanism is thereby actuated to punch the corresponding combination of holes on a line transversely across the tape. The tape is advanced one line after each depression of a key.

One machine suitable for operating the tape punching mechanism from its keyboard, at one time, and serving as an automatic typewriter, at another time, is the "Flexowriter," manufactured by Commercial Controls Corp., Rochester, New York.

(ii) *The Tape Scanning Unit*

The second of the four above mentioned major units is a conventional tape scanning unit, mounted overlying the punched paper tape. When conducting a search, the punched tape is passed through the tape scanning unit, which converts the various holes (either single holes or combinations) in each line into corresponding electrical pulses. The tape is moved through the scanning unit in an intermittent discontinuous fashion in such a way that current is provided in the output circuits corresponding to each line on the tape for a period of 40 milliseconds. At the end of this period, a 65 millicycle interval is devoted to (i) retracting the reading pins from the holes in the tape, (ii) moving the tape so that the next line is in reading position, and (iii) bringing the reading pins into position for providing current in those circuits for which holes are present at that line in the tape.

The electrical pulses that are so generated perform a number of functions, which, considered in time sequence during the scanning of a tape, may be summarized as follows:

(1) The symbol sequence already mentioned as being punched at the start of each reel of tape functions as follows: The (NP) symbol actuates relays built into the scanning unit to route to the searching and discriminating unit, which is the third of the four above-mentioned major units, the electrical pulses which the scanning unit generates by reading successive subsequent symbols. The symbols ⊟ . , - & ⊟, in that sequence, operate, as described subsequently, relays (shown in FIGURE 15) within the searching and discriminating unit to ensure the initial de-activated condition of all the relays used for detecting and registering, for such time periods as may be appropriate, those characteristics of encoded abstracts that are involved in specifying the various information requirements.

(2) As each encoded abstract, which is recorded as a succession of individual symbols in the tape, is scanned, the scanning unit sends to the discriminating unit pulse patterns corresponding to the holes at each line in the tape, e.g., a single hole in channel 3 to represent the numeral 4, or holes in channels 1, 2, 3, 5, 7 to represent the letter *p*. The discriminating unit detects the symbols that correspond to the successive pulse patterns and also detects those combinations of symbols that designate the characteristics of a search requirement. These characteristics are specified, as far as the operations of the discriminating unit are concerned, by wiring the unit's plugboard, as described in detail hereinafter.

(3) If the scanning of an abstract does not result in the discriminating unit detecting the combination of characteristics (or single characteristic in exceptional cases) that define the scope of the search, then the symbols of the "Read-out symbol sequence" at the end of each abstract are converted into electrical pulses and fed into the discriminating unit with the final effect of clearing that unit for responding to the next encoded abstract recorded on the tape. If, however, the scanning of an abstract results in the detection by the discriminating unit of those characteristics that correspond to the search requirement, then the symbols of the "Read-out symbol sequence" at the end of the abstract cause the read-out panel to route the electrical pulses generated by the tape reading unit to the automatic typewriter, which then proceeds to list (i) the serial number of the abstract (ii) the number (or numbers) of the search (or searches) that has (or have) been satisfied and (iii) the bibliographic reference of the paper in question. Further details as to machine operation when typing out such a listing, are provided hereinafter. After each such automatic typing of the listing of an abstract or document, the pulses generated by the scanning of the tape are automatically routed to the discriminating unit which is cleared for responding to the next encoded abstract recorded on the tape.

(4) The final symbol sequence on each reel, previously referred to as the "End of reel symbol sequence," includes a final special signal which stops the tape reading unit and thus shuts down the entire selector.

(iii) *The Symbol Detector and Discriminating Unit*

As previous discussion has pointed out, successive sequences of electrical pulses activate this unit to perform various functions as described below.

(a) *Detection of individual symbols.*—A basically important function is the detection of an incoming pulse pattern as corresponding to an individual symbol to which meaning is assigned, either individually or in combinations analogous to syllables and words.

ILLUSTRATIVE SYMBOL DETECTING CIRCUIT— FIGURE 5

Before presenting the overall wiring diagram for the symbol detecting subassembly, the principle of its operation will be briefly considered. As shown in FIGURE 5, the letter, $p$ is recorded in the tape by punching holes 1, 2, 3, 5 and 7 on one line. Correspondingly, when this hole combination is read by the scanning unit 10, an electrical pulse lasting 40 milliseconds is supplied simultaneously to each of its output lines $L_1$, $L_2$, $L_3$, $L_5$ and $L_7$, which correspond to the correspondingly numbered tape channels. The relay circuitry shown in FIGURE 5 is capable of converting this combination of pulses into an indication of the corresponding symbol, $p$, which it represents. The circuit of FIGURE 5 is arranged to detect the logical relationship product $(1 \cdot 2 \cdot 3 \cdot 5 \cdot 7)$, combining the principles of the circuits of FIGURES 1 and 3.

Each of the relays $R_1$–$R_7$ in FIGURE 5 has one side of its coil connected through line 9 to the positive power supply terminal and the opposite side of its coil connected to the correspondingly numbered lines $L_1$–$L_7$. Each of the relays $R_1$–$R_7$ is provided with two sets of mobile contacts $1a$, $1h$, $2a$, $2h$, $3a$, $3h$, etc. In FIGURE 5 these contacts are shown in the de-energized position. When a given relay coil is energized, e.g. the coil of relay R1, both mobile contacts move toward the relay coil and, for relay R1, contact is established between mobile contact $1a$ and line 11 and also between mobile contact $1h$ and line L1. The wiring between the various open and closed position contacts for the mobile contacts $1a$, $2a$, $3a$, $4a$, $5a$, $6a$ and $7a$ permits automatic detection of the logical relationship $1 \cdot 2 \cdot 3 \cdot 5 \cdot 7$ which, as noted above corresponds to the letter $p$. Thus, the mobile contact $1a$ provides, when relay R1 is energized, a circuit between line 18 and line 11. The latter in turn is connected to mobile contact $2a$ which, when relay R2 is energized, provides a circuit between line 11 and line 12. The latter in turn is connected to mobile contact $5a$ which, when relay R5 is activated, provide a circuit between line 12 and line 13. The latter in turn is connected to mobile contact $4a$, which, when relay R4 is not energized, provides a circuit between line 13 and line 14. The latter in turn is connected to mobile contact $5a$ which, when relay R5 is activated, provides a circuit between line 14 and line 15. The latter, in turn, is connected to mobile contact $6a$ which, when relay R6 is not energized, provides a circuit between line 15 and line 16. The latter, in turn, is connected to mobile contact $7a$ which when relay R7 is energized, provides a circuit between line 16 and line 17. The latter is connected to the coil of the relay "$p$," and the coil of this relay is also connected to the return line 19. Relay "$p$" will be energized, therefore, whenever the relays R1, R2, R3, R5 and R7 are energized simultaneously and relays R4 and R6 are not energized. This will occur only when the scanning unit delivers output pulses to its lines $L_1$, $L_2$, $L_3$, $L_5$ and $L_7$ simultaneously and none to lines $L_4$ and $L_6$, which happens when the combination of holes in channels 1, 2, 3, 5 and 7 on one line of the tape is read by the scanning unit.

At this point, it is necessary to direct attention to timing requirements and to recall that a conventional tape scanning unit is used and that this unit operates so that the tape is moved through the scanning unit in an intermittent discontinuous fashion in such a way that current is provided in the output circuits corresponding to each line on the tape for a period of 40 milliseconds. At the end of this period, a 65 millicycle interval is devoted to (i) retracting the reading pins from the holes in the tape, (ii) moving the tape so that the next line is in reading position, and (iii) bringing the reading pins into position for providing current in those circuits for which holes are present in the said next line. Thus the conventional tape scanning unit provides current for a period of 40 milliseconds to those output circuits which correspond to the holes punched for the symbol being read by the tape. Next a further 65 millisecond interval follows in which the reading pins are not in position to provide current in any of the output circuits. During this period the pins are retracted, the tape is moved to the next reading position, and the pins actuated to read the punching in the next line, which punching consists of a single punch in the channel 8 of the next line on the tape (see FIGURE 5). This punching in channel 8 then causes current to be present in the line $L_8$ during 40 milliseconds. After a subsequent 65 millisecond period for retracting the pins, moving the tape and bringing the pins back into reading position, the next symbol recorded in the tape is read and current is supplied to circuits which correspond to holes in the tape which record the said next symbol. Thus there is an alternation of 40 millisecond periods when the pins are in reading position with 65 millisecond periods when the pins are not. Note also that the alternate pulses will occur in one or more of lines $L_1$–$L_7$ when reading a symbol and in line $L_8$ when reading the 8-channel punch which follows the punching for each symbol. The response time of the relays in the symbol detecting subassembly of the discriminating unit is about 15 to 20 milliseconds. Hence, the 40 milliseconds period is sufficiently long to activate the relays in the symbol detecting subassembly of the discriminating unit. However, as described subsequently, the detection of an individual symbol must often be followed by the operation of other relays to register the detection of meaningful combinations, such as those analogous to "syllables," "words," "phrases," etc. To allow ample time for such further operation of such higher level relays, the illustrative circuit shown in FIGURE 5 includes conventional holding circuits for the relays R1 and R7. The mobile "$h$" contacts of these relays are connected to a line 20, which is connected to the negative power source terminal through the mobile contact of an interrupter relay $K_1$ as long as it is de-energized. Each of the relays R1 and R7, when once activated by an incoming pulse, will remain energized through its mobile "$h$" contact from power supply terminal 21 until the holding circuit is broken by energization of the interrupter relay $K_1$. The coil of the interrupter relay is connected through line $L_8$ to the eighth channel output of the scanning unit 10. A hole is punched on channel 8 on the next line following each symbol punch combination, thereby energizing the interrupter relay $K_1$ to break the holding circuits for the relays corresponding to the other channels on the tape.

The cycle for detecting a given symbol may be summarized as follows: The pulses generated by the tape scanning unit when reading the holes used to record a given symbol activate one or more relays which are held closed by their holding circuits until a pulse in the eight channel interrupts the holding circuit. The relays then return to the de-energized or deactivated state and the cycle repeats when the scanning unit reads the next symbol punched in the tape. Detection of a given symbol may be registered either by a single relay or an appropriate combination of relays. Such registration of the detection of a given symbol is accomplished by the test current flowing through the symbol detecting relays when activated by the pulse pattern for a given symbol.

COMBINATION OF CIRCUITS FOR DETECTING INDIVIDUAL SYMBOLS—FIGURES 6A AND 6B

As indicated in FIGURE 5, it is necessary to provide for interaction between relays operated by each of the seven output circuits of the reading unit in order to detect any one symbol. This does not mean, however, that seven individual relays must be provided for each symbol that is to be detected. Rather the wiring of these relays can be set up in such a way that various individual relays are used in more than a single combination that corresponds to some one symbol. In establishing the necessary combinational circuits, it is also advantageous to use relays having more than one mobile contact. Depending on the number of mobile contacts such relays are termed "double pole," "triple pole," etc. Furthermore, for each group of relays activated by one of the output circuits from the reading unit, it is sufficient to provide a single auxiliary circuit to meet the timing requirements summarized in the discussion centering around FIGURE 5.

Taking these considerations into account, the wiring diagram for the complete symbol detecting subassembly is as shown in FIGURES 6A and 6B, which together make up a symbol detector circuit capable of detecting individually each of 47 individual symbols.

In one practical embodiment, the symbols recorded on the tape follow the code set forth below, where the numbers indicate the corresponding channels in the tape which have holes punched therein and the dash (—) indicates that no hole is punched in that tape channel for the symbol in question.

| Lower case symbols | Tape channels | Upper case symbols |
|---|---|---|
| Zero | - 6 - - - - - | Parenthesis ( |
| 1 | - - - - - - 1 | Single quote ' |
| 2 | - - - - - 2 - | @ (At) |
| 3 | - - 5 - - 2 1 | # |
| 4 | - - - - 3 - - | = |
| 5 | - - 5 - 3 - 1 | % |
| 6 | - - 5 - 3 2 - | Underline _ |
| 7 | - - - - 3 2 1 | ? |
| 8 | - - - 4 - - - | . |
| 9 | - - 5 4 - - 1 | Parenthesis ) |
| a | 7 6 - - - - 1 | A |
| b | 7 6 - - - 2 - | B |
| c | 7 6 5 - - 2 1 | C |
| d | 7 6 - - 3 - - | D |
| e | 7 6 5 - 3 - 1 | E |
| f | 7 6 5 - 3 2 - | F |
| g | 7 6 - - 3 2 1 | G |
| h | 7 6 - 4 - - - | H |
| i | 7 6 5 4 - - 1 | I |
| j | 7 - 5 - - - 1 | J |
| k | 7 - 5 - - 2 - | K |
| l | 7 - - - - 2 - | L |
| m | 7 - 5 - 3 - 1 | M |
| n | 7 - - - 3 - 1 | N |
| o | 7 - - - 3 2 - | O |
| p | 7 - 5 - 3 2 1 | P |
| q | 7 - 5 4 - - - | Q |
| r | 7 - - 4 - - 1 | R |
| s | - 6 5 - - 2 - | S |
| t | - 6 - - - 2 1 | T |
| u | - 6 5 - 3 - - | U |
| v | - 6 - - 3 - 1 | V |
| w | - 6 - - 3 2 - | W |
| x | - 6 5 - 3 2 1 | X |
| y | - 6 5 4 - - - | Y |
| z | - 6 - 4 - - 1 | Z |
| slant / | - 6 5 - - - 1 | colon : |

| Lower case symbols | Tape channels | Upper case symbols |
|---|---|---|
| stop (ST) | - - - 4 - 2 1 | stop (ST) |
| comma , | - 6 5 4 - 2 1 | > |
| period . | 7 6 - 4 - 2 1 | < |
| upper case (UC) | 7 6 5 4 3 - - | upper case (UC) |
| lower case (LC) | 7 6 5 4 - 2 - | lower case (LC) |
| ampersand & | 7 6 5 - - - - | semicolon ; |
| special symbol ⌐ | 7 - - - 4 - 2 - | special symbol ⌐ |
| paragraph ¶ | - 6 - - 4 - 2 - | paragraph ¶ |
| dash — | 7 - - - - - - | quotes " |
| bracket [ | 7 - 5 4 - 2 1 | bracket ] |

Referring now to FIGURES 6A and 6B, there is provided a single interrupter relay $K_i$, a single "channel seven" relay R7, a single "channel six" relay R6, a pair of parallel-connected "channel five" relays R5, three parallel-connected "channel four" relays R4, five parallel-connected "channel three" relays R3, seven parallel-connected "channel two" relays R2, and seven parallel-connected "channel one" relays R1. As far as their electrical function is concerned the two R5 relays constitute effectively a single relay. The number of movable contacts of this single effective relay requires, for their operation, but two relay coils. Since the coils are connected in parallel the electrical operation is the same as if there were only a single R5 relay coil operating all of the associated movable contacts. The same holds true for the relays R4, R3, R2 and R1.

The test current input is applied to terminal 80 of the input panel (left side of FIGURE 6A) and from this terminal it flows through line 81 to the mobile contact 7a of relay R7. From here, the test current flows through some or all of the other relays R6—R1 to one of the output terminals at the right side of FIGURE 6B, depending upon which of the relays R7—R1 may be energized, either singly or in combination.

The relays are connected respectively to the terminals labelled 7, 6, 5, 4, 3, 2 and 1 at the input panel at the left side of FIGURE 6A. These terminals are connected to the respective output lines $L_7$—$L_1$ leading from the tape scanning unit 10 in FIGURE 5. For convenience, these connections are made by cables, one of which connects the contacts of the tape scanning unit to those contacts in FIGURE 15 that are labelled "CONNECTED TO OUTPUT OF TAPE SCANNING UNIT" and another of which connects those contacts of FIGURE 15 labelled "TO INPUT OF SYMBOL DETECTOR" (FIG. 6A) to the set of contacts labelled 7, 6, 5, 4, 3, 2, 1, 8th, +, —, 80, ⓢ in FIGURE 6A.

Terminal 7 is connected through line 82 to one side of the coil of R7, the other side of this coil being connected through line 83 and a common power supply line 84 to the positive power terminal + at the input panel.

Terminal 6 is connected through line 85 to one side of the coil of R6, the other side of this relay coil being connected through lines 86 and 84 to the positive power supply terminal.

Terminal 5 is connected through line 87 to one side of both coils of relay R5. The other side of these coils is connected through lines 88 and 84 to the + terminal.

Terminal 4 is connected through line 89 to one side of each coil of relay R4, the other side of each of these relay coils being connected through lines 90 and 84 to the + terminal.

Terminal 3 is connected through line 91 to one side of each coil of relay R3, the other side of each of these relay coils being connected through lines 92 and 84 to the + terminal.

Terminal 2 is connected through line 93 to one side of each coil of relay R2. The other side of each of these relay coils being connected through lines 92 and 84 to the + terminal.

Terminal $\overline{1}$ is connected through line 95 to one side of each coil of relay R1. The other side of each of these relay coils is connected through lines 96 and 84 to the + terminal.

Obviously, the energization of each relay R7–R1 depends upon whether there is a hole at the corresponding channel in the record tape on the line being scanned.

Each of these relays has a holding circuit the same as in FIG. 5. The mobile contacts that establish these holding circuits are labelled $7h$–$1h$. The mobile contacts of these sets are all connected through line 20 to the normally-closed fixed contact, $C_1$, of interrupter relay $K_i$ and thence through the mobile contact of that relay and line 97 to the negative power supply terminal at the input panel. The purpose and operation of these holding circuits is the same as described in connection with FIG. 5. Relay R7, which is the first in the series in FIGS. 6A and 6B, has one set of active contacts whose mobile contact is labelled $7a$ in this figure. Depending on whether relay R7 is de-energized or energized, $7a$ is in contact with either contact $7c_1$, or $7c_2$. We shall use the term "normally-closed" in referring to contacts such as $7c_1$, and the term "normally-open" in referring to contacts such as $7c_2$. The normally-open fixed contact $7c_2$ of this set is connected to the movable contact of a first one of a pair of sets of active contacts at relay R6. The normally-closed contact $7c_1$ of the set $7a$ is connected to the movable contact at the other set of active contacts at relay R6.

In like manner, relay R6 has four output connections leading from its fixed contacts to the four active movable contacts at relay R5.

Relay R5 has eight output connections leading to the active movable contacts at relay R4.

Relay R4 has sixteen output connections leading to the active movable contacts at relay R3.

Relay R3 has 23 output connections leading to the active movable contacts at relay R2, one output connection leading through line 98 to one of the active mobile contacts at relay R1, one output connection leading through line 99 to the "UC" symbol output terminal, and seven output terminals which are open-circuited.

Relay R2 has 23 output connections leading to symbol output terminals, 22 output connections leading to active mobile contacts at relay R1, and one output terminal which is open-circuited.

Relay R1 has 23 output connections leading to the symbol output terminals and 23 output terminals which are open-circuited.

Thus, the symbol output terminal panel has 23 inputs from relay R1, 23 from relay R2 and one from relay R3. In addition, it has a connection through line 100 to the normally-open fixed contact of relay $K_i$, which is closed in response to the detection of a hole in channel eight on the tape.

In FIGS. 6A and 6B, each active movable contact of relays R6–R1 has been labelled with the numbers of the preceding relays which must be energized for that contact to receive the test current. For example, the uppermost active movable contact of relay R3 will receive current only if all of the relays R7, R6, R5 and R4 are energized at the same time. Likewise, the next lower movable contact of relay R3 will receive current only if relays R7, R6 and R5 are energized and relay R4 is de-energized.

The same principles apply throughout the successive relay stages in the detector circuit of FIGS. 6A and 6B.

The symbol output terminals themselves have been labelled in the same manner to indicate which relays must be energized to produce an output current at each terminal.

The situation with respect to the symbol detector shown in FIGURES 6A and 6B might be summarized as follows: The combinations used to register individual symbols are recorded in a suitable medium for machine scanning. In our example, symbols are donated by holes punched singly or in combination in seven channels. Alternating with the punching to denote symbols, a punch is provided in the eighth channel of the tape. When the tape scanning unit reads a combination of holes corresponding to a given symbol, current flows for 40 milliseconds in the reading unit's output circuits. At the end of 15 milliseconds, the corresponding relays in the symbol detecting subassembly shown in FIGURES 6A–6B will have closed and the holding current through the mobile "$h$" contacts will keep these relays closed during the following 65 millisecond period when the reading pins in the conventional tape scanner are being retracted, the tape being moved so that the next line of the tape is in reading position and the reading pins are moved to detect the punching in the following line on the tape. A single punch in channel 8 follows the punching for each symbol in channels 1–7. This single punch in channel 8, when read by the tape scanning unit, causes current to flow for 40 milliseconds in line $L_8$ and this activates relay $K_i$ in FIGURE 6A. Details as to how the connection is effected between line $L_8$ of the tape scanning unit and the 8th contact in FIGURE 6A are presented subsequently in connection with the detailed description of the functioning of the circuits of FIGURES 25A, 25B and 25C to effect the recording of the results of searching operations. Subsequent description of the circuits of FIGURES 25A, 25B and 25C also points out how the interrupter relay $K_i$ is activated in conjunction with the (PR) symbol to prevent the relays $R_1$–$R_7$ of FIGURES 6A and 6B from functioning in an undesirable fashion, when recording the results of searching operations. Its activation interrupts the holding circuit and any previously activated relays in the symbol detecting subassembly return to the inactivated condition. Thus, for each symbol that is detected, the test current is supplied for a period of 80–100 milliseconds to that symbol's output terminal as designated by the said symbol at the extreme right of FIGURE 6B.

The circuit of FIGURES 6A and 6B is drawn in such a way as to show a single output terminal for each symbol that is detected. In setting up the plugboard for this unit, it was known that individual symbols will be used more than once in wiring up plugboards to detect symbol combinations required to specify information requirements as shown, for example, in FIGURES 16, 18, 20, and 23. Wiring up panels to detect such combinations of symbols would be greatly simplified if more than one terminal output is provided for each symbol. This can readily be done, of course, as a whole row of output terminals can be very easily connected to the same wiring lead.

It will be noted in FIGURES 6A–6B that unambiguous and certain detection of various codes for symbols is achieved without the necessity of providing sets of relay contacts to detect the absence of certain pulses. For example, in the code combination 76– – –2– corresponding to the letter "$b$," a set of relay contacts was not provided to detect the absence of a pulse in channel 1. With the letter "$m$," whose code is 7–5–3–1, a set of relay points was not provided to detect the pulse in channel 1. These codes, and various others for which direct detection of presence or absence of certain pulses in all channels is not provided, are nevertheless uniquely and unambiguously detected by the relay circuits as shown in FIGURES 6A–6B. Many of the codes are, in fact, redundant from the point of view of information theory and such redundancy is needed when the codes for symbols are routed through a multiplicity of memory and recall operations as required by prior art electronic computers. In such complex operations, the redundancy of the codes makes it possible to conduct self-checking operations to guard against error due to a code becoming erroneous by introduction or omission of a pulse. Thanks to the simplicity of the circuits of FIGURES 6A–6B and the avoidance of the need for internal memory devices as used in prior art electronic computers it is possible by using reliable relays to dispense with the need to exploit the redundancy of the symbol codes.

DETECTION OF COMBINATIONS OF SYMBOLS

Having detected the recorded symbols by the use of the circuit of FIGURES 6A and 6B, it is possible to detect meaningful combinations of such symbols, which combinations may be assigned specific meanings and thus may be made to function as "code semantemes" or "syllables" as they may alternately be called. It should be kept in mind that the immediately following discussion pertains only to various ways of detecting combinations of those symbols which, when used singly or in combination, may be used to designate the basic units of meaning within the encoded abstract recorded on the tape. Those symbols which are used usually in combinations to designate "code semantemes" and similar basic units of meaning within an encoded abstract will be referred to hereafter as symbols of the first type.

A second type of symbols, discussed later, are analogous to punctuation marks and are used to designate the beginning and end of "syllables" and higher order combinations, which are analogous to "words," "phrases," "sentences," etc.

In order to register a single symbol of the first type, the circuit is provided which is shown in each of the boxes labeled "A" register, "B" register and "C" register in FIGURE 7, each of these registers having identical internal wiring and power supply connections.

Referring to the "A" register circuit, a series of terminals $1a-10a$ is provided, along with a triple pole relay, a double pole relay, and various connections among these terminals and relays. The terminals $1a-10a$ are sockets positioned in a vertical column at the front of a plug board, which also has columns of sockets for the "B" and "C" registers and as many other symbol registers as may be desired. The coil $11a$ of the triple pole relay operates three mobile contacts, designated $12a$, $13a$ and $14a$ and shown in their inactivated positions when the relay coil $11a$ is de-energized. The coil $15a$ of the double pole relay operates two mobile contacts $16a$ and $17a$, shown in their inactivated positions when the relay coil $15a$ is de-energized.

The terminals $1a$ and $3a$ are permanently connected together by a wire $18a$. The terminals $3a$ and $4a$ may be connected together by a jumper wire $19a$ inserted by the operator at the front of the plug board. Terminal $4a$ is connected through a wire $20a$ to the mobile contact $16a$. The corresponding normally-closed fixed contact is connected through a line $21a$ to the relay coil $11a$ and to the mobile contact $12a$. The positive terminal $22a$ of a power supply is connected through line $23a$ to one side of the double-pole relay coil $15a$. The negative terminal of this power supply is connected through a panel, shown in FIGURE 15 and to be described subsequently, to terminal $24a$. One function of this panel is to permit the detection of a symbol of the second type to interrupt the power supply circuit to terminal $24a$. As shown in FIGURE 7, terminal $24a$ is connected to the normally-open fixed contacts associated with mobile contacts $12a$ and $13a$. The mobile contact of the set $13a$ is connected through line $25a$ to the opposite side of the double-pole relay coil $15a$.

When the symbol detector of FIGURES 6A and 6B has detected the symbol "a" on the tape, it produces an output pulse as its "a" terminal lasting about 80 milliseconds, as already described. This output pulse is fed through line $26a$ to terminal $1a$ on the plug board, and thence through line $18a$, terminal $3a$, jumper wire $19a$, terminal $4a$, line $20a$, the normally closed contact of $16a$, line $21a$, through the triple-pole relay coil $11a$ to the positive terminal $22a$ which completes the circuit. A lamp $27a$, which is visible at the front of the plug board is connected in parallel with the relay coil $11a$ and is lighted to indicate that the "a" pulse has been received by the "A" register.

When relay coil $11a$ is energized, its mobile contact $13a$ is moved to complete an energization circuit for the double-pole relay coil $15a$, which becomes energized from the positive power supply terminal $22a$ through line $23a$, coil $15a$, line $25a$, and the now-closed contacts $13a$ to the negative power supply terminal $24a$.

The energization of the double-pole relay coil $15a$ operates its mobile contact $16a$ to open the original energization circuit for the triple-pole relay coil $11a$; however, the now-closed mobile contact $12a$ provides a holding circuit for coil $11a$ from the negative power supply terminal $24a$, so that relay coil $11a$ remains energized. The energization of relay coil $15a$ connects the plug board terminals $5a$ and $6a$ together through line $28a$, the now closed $17a$ contacts and line $29a$. This breaks the previous connection between the plug board terminals $6a$ and $7a$, which was by way of line $29a$, the normally-closed $17a$ contacts and line $30a$.

The energization of relay coil $11a$, as described, connects the plug board terminals $8a$ and $9a$ together by way of line $31a$, the now-closed $14a$ contacts and line $32a$. This breaks the previous connection between terminals $9a$ and $10a$, which was by way of line $32a$ the normally-closed $14a$ contacts and line $33a$. Accordingly, when a test current input pulse is applied to terminal $8a$ it will pass to the output terminal $9a$, provided the "a" symbol pulse has been applied to terminal $1a$ to initiate the energization of the relays in the "A" register, as just described.

The various steps in reading an "a" symbol in the tape and registering the said symbol in the relay circuits of Register A may be summarized as follows. First the tape scanning unit detects holes in tape channels 7, 6, 1 as indicated in FIGURE 5 and as a consequence lines $L_7$, $L_6$ and $L_1$ in FIGURE 5 and the respectively corresponding leads 82, 85 and 95 in FIGURES 6A are activated for 40 milliseconds. Relays R7, R6, and R1 in FIGURES 6A and 6B are activated during the next 15–20 milliseconds and remain activated by holding current through their mobile "$h$" contacts, until the tape scanning unit reads the next line in the tape in which a single hole is punched in the 8 channel. Reading this 8-channel punching causes current to flow in line $L_8$ of FIGURE 5 which is connected through intermediate wiring to the contact marked $\overline{8\text{th}}$ in FIGURE 6A. This current activates relay $K_1$ and thus causes interruption of the holding current to relays R7, R6 and R1. In this way the contact labelled A at the right margin of FIGURE 6B is energized for approximately 80–100 milliseconds as has been set forth in more detail when describing the circuits shown in FIGURES 6A and 6B. During this 80–100 millisecond period, the relays of register "A" in FIGURE 7 are activated by a current from the "A" terminal (of FIGURES 6A and 6B) which is connected by lead $26a$ to terminal $1a$ of register "A." The relays of register "A" remain activated until the holding current to terminal $24a$ in FIGURE 7 is interrupted. Such interruption does not occur when an 8-channel punch is detected by the tape scanning unit. Rather, as set forth in the detailed description of the circuits shown in FIGURE 15, interruption occurs when the tape scanning unit and the circuits of FIGURES 6A and 6B detect a period recorded in the tape by punches in channels 7, 6, 4, 2, and 1. In like fashion, interruption of the holding current to terminals $24b$ and $24c$ of registers "B" and "C" also occurs only when a period is detected in the tape. Registers "A," "B," and "C" are examples of the general class of registers for registering symbols of the first kind and holding current to all such registers is interrupted only when a period is detected in the tape at the beginning and end of each "syllable" or code semanteme. Note also in this connection that the period, when used as noted to interrupt the holding current to register A, B and C, is functioning as an example of the second type of symbols that are used in a fashion analogous to punctuation to designate the beginning and end of "syllables" and higher order combinations, which are analogous to "words," "phrases," "sentences," etc. In this manner the "A" register circuit operates (i) to register the "a" symbol pulse, and (ii) to enable detection of the "a" symbol in a specified symbol combination.

LOGICAL RELATIONSHIPS

FIGURE 7 shows a complete circuit for detecting within a given single code semanteme or "syllable" the presence of the combination of the three letters $a$, $b$, and $c$, that is the logical product $a \cdot b \cdot c$. The "B" and "C" registers are wired identical to the "A" register. The "$b$" symbol output terminal of the symbol detector (FIGURE 6) is connected to the terminal $1b$ of the "B" register, and the "$c$" symbol output terminal of the symbol detector is connected to the terminal $1c$ of the "C" register. The output terminal $9a$ of the "A" register is connected through a jumper wire 34 at the front of the plug board to the input terminal $8b$ of the "B" register, and output terminal $9b$ of the "B" register is connected through another jumper wire 35 to the input terminal $8c$ of the "C" register. Thus these three registers, when activated by detection of symbols "$a$," "$b$" or "$c$" within a given single code semanteme or "syllable" will enable the test current to flow through the three registers, with input at $8a$ and output at $9c$. The combination $a \cdot b \cdot c$ will be detected independently of the sequential order in which "$a$," "$b$" and "$c$" occur within a given single code semanteme or "syllable" and are recorded on the paper tape passed through the scanning unit. During the scanning of the successive symbols of the first kind that constitute a code semanteme or "syllable," the holding current the terminals $24a$, $24b$, $24c$ remains uninterrupted, thus permitting individual symbols to be registered as they are detected by the circuits of FIGURES 6A and 6B. At the beginning and end of each code semanteme or "syllable," a period is punched in the tape. When a period is read by the scanning unit and detected by the circuits of FIGURES 6A and 6B, relay 120 in FIGURE 15 is operated and this interrupts the holding current to terminals $24a$, $24b$ and $24c$ in FIGURE 7 as discussed further in connection with FIGURE 15. In this way, undesired interactions between the component symbols of different code semantemes (or "syllables") is avoided and only those combinations of symbols of the first class that actually occur within a single code semanteme or "syllable" will result in energizing the test current output terminal.

To detect the logical relationship $<a \cdot b \cdot c>$, where $<>$ indicates that the symbols $a$, $b$ and $c$ must occur in that order, the circuit of FIGURE 8 is used. It is identical to FIGURE 7, except for the interconnection of the "3," "4," "5" and "6" terminals of the registers. Here, the terminal $5a$ of the "A" register is connected by a jumper wire 36 at the front of the plug board to the terminal $3b$ of the "B" register, the terminal $6a$ of the "A" register is connected by a jumper wire 37 to the terminal $4b$ of the "B" register, the terminal $5b$ of the "B" register is connected by a jumper wire 38 to the terminal $3c$ of the "C" register, and the terminal $6b$ of the "B" register is connected by a jumper wire 39 to the terminal $4c$ of the "C" register. The holding current to terminals corresponding to $24a$, $24b$, $24c$ in FIGURE 7 is interrupted only when a period is read at the beginning and end of each code semanteme or "syllable." With these connections, the relays in the "B" register cannot be energized until after the relays in the "A" register have been energized to connect the "A" register terminals $5a$ and $6a$ together. Similarly, the relays in the "C" register cannot be energized until after the relays in both the "A" and "B" registers, so that the symbols $a$, $b$ and $c$ must be detected in that order within a single code semanteme or "syllable" if an output signal is to pass through the registers to the test current output terminal.

FIGURE 9 illustrates schematically the plug board wiring for detecting the logical sum $a+b+c$. In this figure only the terminals for the "A," "B" and "C" registers are shown, along with the external jumper wire connections. The internal wiring of the registers and their power supply connections are exactly as shown in FIGURE 7 and explained in detail in the description of FIGURE 7. In FIGURE 9, the register terminals "1" are connected to the corresponding symbol output terminals of the symbol detector of FIGURES 6A and 6B. The terminals "3" and "4" in each register are connected together by jumper wires $19a$, $19b$ and $19c$, respectively. The terminals $8a$, $8b$ and $8c$ are interconnected by jumper wires 40 and 41, and all are connected to the test current input terminal. The terminals $9a$, $9b$ and $9c$ are interconnected by jumper wires 42 and 43, and all are connected to the test current output terminal. Obviously, if any one of the registers "A," "B" or "C" is energized, a signal will be passed from the test current input terminal through that register to the test current output terminal.

FIGURE 10 illustrates the plug board wiring to detect the fact that a single code or semanteme or "syllable" is characterized by the logical difference $g-f$. Here, the "$f$" and "$g$" symbol output terminals of the symbol detector (FIGURES 6A and 6B) are connected to the register terminals $1f$ and $1g$, respectively. The internal wiring of the "F" and "G" registers are as shown in FIGURE 7. The test current pulse is provided by the period which is punched in the tape at the beginning and end of each code semanteme or "syllable." In this case, the test current input in FIGURE 10 is connected to the period output of FIGURE 6B. In this way a pulse of test current is applied at the conclusion of scanning each section of tape in which is recorded a code semanteme or "syllable." The holding current in this case is connected, as before, to terminals corresponding to $24a$, $24b$, $24c$ in FIG. 7. The holding current is connected to terminal 533 in FIG. 31 and this holding current is interrupted by activation of relay 429 by a pulse that is generated when the scanning unit detects a hole in the 8th channel immediately following the symbol, i.e. the period, that generates the test current pulse, as described in detail subsequently for FIG. 31. These special arrangements for the test pulse and control of the holding current are necessary to ensure that detection of $f$ subsequent to $g$ in $g-f$ will prevent test current appearing in the test current output line of FIG. 10. The positive terminal of the power supply in FIG. 7 was connected to terminals $22a$, $22b$, $22c$. Corresponding connections are made in FIG. 10. The "F" register terminals $3f$ and $4f$ are connected to each other by a jumper wire $19f$, and the "G" register terminals $3g$ and $4g$ are connected to each other by a jumper wire $19g$. The output terminal $9f$ of the "F" register is connected by a jumper wire 44 to the input terminal $8g$ of the "G" register. The test current input line is connected to terminal $10f$ in the "F" register, and the test current output line is connected to terminal $9g$ in the "G" register. With these connections, two conditions must be met for the test current pulse to pass through the registers "G" and "F" to the test current output terminal:

(1) Register "F" must remain de-energized so that its terminal $9f$ and $10f$ will remain connected together; and (2) Register "G" must be energized so as to connect its terminals $8g$ and $9g$ together.

Obviously, these conditions constitute the logical relationship $g-f$.

FIGURE 11 shows the plug board wiring to detect the fact that a single code or semanteme or "syllable" is characterized by the logical relationship $<g-f>$. The internal wiring of each register "F" and "G" are as shown in FIGURE 7. Their power supply connections are the same as for FIG. 10. The terminal 1 of register "F" is connected to the "f" symbol output terminal of the symbol detector (FIGURES 6A and 6B) and the terminal 1g of register "G" is connected to the "g" symbol output terminal of that symbol detector. Terminal 3f of the "F" register is connected by a jumper wire 45 to terminal 5g of the "G" register, and terminal 4f of the "F" register is connected by a jumper wire 46 to terminal 6g of the "G" register. Terminals 9f and 8g are connected by a jumper wire 44, as in FIGURE 10, and the test current input and output connections are the same as in FIGURE 10. With this arrangement, the "F" register cannot respond to a signal at its terminal 1f, due to the fact that its terminals 3f and 4f are disconnected, until the terminals 5g and 6g of the "G" register are interconnected in response to a "g" symbol input signal at terminal 1g. Therefore, the order specified in the logical relationship $<g-f>$ must be satisfied before the circuit operates to detect this logical difference.

FIGURE 12 shows a plug board wired to detect that a single code semanteme or "syllable" is characterized by the logical relationship $(a \cdot b + c)(e-d)$. The internal wiring of the "A," "B" and "C" registers is shown in FIGURE 7, and the internal wiring of the "D" and "E" registers is the same. The power supply connections are the same as in FIGURE 10. The "1" terminals of the registers are connected individually to the corresponding symbol output terminals of the symbol detector of FIGURE 6A and 6B. The "3" and "4" terminals of each register are interconnected by jumper wires 19a—19e, respectively. The "8" terminals of the "A" and "C" registers are interconnected by jumper wire 47, and the test current input pulse is connected to terminal 8a. This test current pulse is generated by reading a period, that is symbol of the second kind, as described for FIG. 10. Terminal 9a is connected by a jumper wire 48 to terminal 8b. Terminal 9b is connected by a jumper wire 49 to terminal 9c. These interconnections among the "A," "B" and "C" registers require that the logical relationship $a \cdot b + c$ be satisfied for the test current pulse to pass through them to the output terminal 9c of the "C" register. The terminal 9c is connected by a jumper wire 50 to terminal 10d in the "D" register, and terminal 9d is connected through a jumper wire 51 to terminal 8e in the "e" register. The test current output line is plugged into the output terminal 9e of the "E" register. With this arrangement, the test current pulse will appear at the output line only when the logical relationship $(a \cdot b + c)(e-d)$ is satisfied in the registers "A," "B," "C," "D" and "E."

FIGURE 13 shows the plug board wired to detect the fact that a single code semanteme or "syllable" is characterized by the logical relationship $$<(<a \cdot b> + c)(e-d)>$$

The internal connections in each register $a-e$ are the same as in FIGURE 12, as are the power supply connections and the test current input pulse, the symbol input connections to the "1" terminals, the connections of the jumper wires 47—51, and the connections of the test current and output lines. Terminal 5a is connected by a jumper wire 36 to terminal 3b and terminal 6a is connected by a jumper wire 37 to terminal 4b. These connections require that the symbols "a" and "b" be detected in that order, as in FIGURE 8. Jumper wire 58 connects terminal 3c and 4c. Terminal 5b is connected by a jumper wire 52 to terminal 5c and terminal 6b is connected by a jumper wire 53 to terminal 6c. Thus, if either the condition $<a \cdot b>$ is satisfied or a "c" symbol pulse has been received by the "c" register, or both these conditions have happened, the "5" and "6" terminals in the "b" and "c" registers are all interconnected. The connection of the jumper wire 49 between the output terminals 9b and 9c of the "b" and "c" registers is an essential link in the circuit for the test current when either $<a \cdot b>$ or $c$ has been detected.

The connections of the jumper wires 50 and 51 require that the condition $(e-d)$ be satisfied for the test current pulse to pass to the output terminal 9e of the "e" register, to which the test current output line is connected.

The connections of terminal 5c to terminals 3d and 3e through the jumper wires 54 and 55, and the connections of terminals 6c to terminals 4d and 4e through jumper wires 56 and 57 insure that the logical relationship $(<a \cdot b> + c)$ must occur before the logical relationship $(e-d)$ for the test current pulse to pass to the test current output line.

Obviously, the plug board can be selectively wired (by making the appropriate plug-in connections of the jumper wires) to detect any desired logical relationship among the symbols by following the foregoing principles.

FIGURE 7 shows the wiring of a pair of relays for registering a single symbol as a basic step in detecting combinations. The same internal wiring of pairs of relays may be used in detecting higher order combinations, provided that appropriate attention is directed (i) to timing the input test pulse when detecting logical relationships that involve a logical difference and (ii) to controlling, that is to say, to timing the interruption of the holding current applied to the terminals corresponding to 24a, 24b, 24c in FIGURE 7. Methods and means for such control of the holding current will be presented next. Before concluding discussion of FIGURE, 7 it should be pointed out that it is convenient in constructing operating equipment to arrange on a single panel, a multiplicity of rows of contacts numbered 1a to 10a, 1b to 10b, and 1c to 10c in FIGURE 7. Thus FIGURES 16–24 show such panels with 13 vertical columns each of contacts numbered 1–10. The wiring shown in FIGURES 16–24 is temporary plugging to conduct certain searching and selecting operations as discussed in detail subsequently. Each set of vertical contacts shown in FIGURES 16–24 is connected to a pair of relays by permanent wiring as is shown for each of the three registers in FIGURE 7. This permanent wiring is not shown for any of the panels in FIGURES 16–24. Each of the panels in FIGURES 16–24 has a single pair of power leads which correspond to 22a—24a, 22b—24b and 22c—24c in the three registers of FIGURE 7 and which are connected to all thirteen of the relay pairs in a single panel as shown in FIGURES 16–24. Before discussing the wiring of such panels in conducting searching and selecting operations, methods and means for controlling the holding voltage to such panels must be considered.

HIGHER ORDER COMBINATIONS

Previous discussions relating to FIGURES 7–13 has indicated how various combinations of symbols, which characterize or constitute various "code semantemes," may be automatically detected. Each "code semanteme" is a single unit of meaning. For example, the concept "belonging to the class of machine, tool device" may be encoded by "*mach*," the concept "starting material" by "*kaj*," etc. In conducting searching, identifying and selecting operations, it is usually necessary to detect a plurality of such "code semantemes" and also various combinations of the same analogous to "words," "phrases," "sentences," "paragraphs," etc., as formulated in discussing the general capabilities of the equipment to which this invention pertains. In this preceding discussion, "code semantemes" or "syllables" were designated by $A_1$, $B_1$, $C_1$, etc. The logically defined combinations of "syllables" are used to designate "words" and they are symbolized by $A_2$, $B_2$, $C_2$, etc. Similarly, "phrases" symbolized by $A_3$, $B_3$, $C_3$, etc. are designated in terms of logically defined combinations of component "words" and, furthermore, various units at successively higher levels, including "sentences," "paragraphs," etc., are designated in terms of logically defined combinations of their component units at the next lower level. In general, a unit at a higher level may be designated in terms of a logically defined relationship of componnet dements at one or more lower levels as may be desired or appropriate.

Accordingly, attention is now directed to additional circuits that are required to enable search requirements to be set up on the basis of combinations of "code semantemes", and further higher level combinations.

Mention has already been made of a second type of symbols, previously described as analogous to punctuation. From an abstractly formal point of view these symbols of the second type designate the end of an immediately preceding combinational unit i.e., "syllable", "word", "phrase" etc., and the start of an immediately subsequent combinational unit. Any single symbol or combination of symbols may be assigned to serve as a symbol of the second type. Due to the relative frequency of use of such symbols, recording space is conserved by using individual symbols as symbols of the second type. The following listing exemplifies assignment of certain symbols to serve as symbols of the second type.

| Symbol | Denotes beginning and end of |
|---|---|
| Period (.) | "Syllable" |
| Comma (,) | "Word" or "Sub-phrase" |
| Dash (—) | "Phrase" |
| Ampersand (&) | "Sentence" |
| Paragraph sign (¶) | "Paragraph" |
| Special symbol (⊟) | "Message" |

The use of these symbols in recording an encoded abstract or similar message is illustrated in a symbolic fashion as follows.. (For simplicity, the different symbols of the first type are represented, in this illustration by "x".)

other symbols. FIGURE 15 also shows auxiliary wiring that is provided to establish a central panel for the distribution of various pulses that correspond to reading individual holes punched in the paper tape and to the detection of symbols as illustrated in FIGURES 6A and 6B. FIGURE 15 also includes certain wiring that is involved in the operation of the automatic typewriter during the read out cycle as will be described when considering the read-out process. In FIGURE 15, lines $L_1-L_8$ are, respectively, output leads from the tape scanning unit. One or more of these leads will be energized when one or more holes are being read in the corresponding channels in the punched paper tape. The leads labelled +90 v. D.C. and —90 v. D.C. are connected to the power source that operates the tape scanning unit and the automatic typewriter. Other leads numbered 109 and 110 to the auxiliary electrical power source are also provided as shown in FIGURE 15. These power leads are energized without interruption during the entire time that the equipment is functioning. The input leads numbered 120, 121, 122, 123, 124, 125 in FIGURE 15 are energized, respectively as a consequence of detection of a period comma dash ampersand, paragraph sign (¶), or special theta symbol (⊟) by the circuits of FIGURES 6a and 6b. Other input leads to the panel whose circuits are shown in FIGURE 15 are numbered as listed below and energized as a cosequence of detection of the following symbols by the circuits of FIGURES 6a and 6b.

| Lead number: | Energized by detection of symbol |
|---|---|
| 151 | Numeral 1 |
| 152 | Numeral 2 |
| 153 | Numeral 3 |
| 154 | Numeral 4 |
| 155 | Numeral 5 |
| 156 | Numeral 6 |
| 157 | Numeral 7 |
| 158 | Numeral 8 |
| 159 | Numeral 9 |
| 160 | Numeral 0 (zero) |
| 161 | Letter p |
| 162 | Letter s |
| 163 | Letter t |

¶&—.,XXX.XXXX.X.XXXX.XX.,XXX.XXXX.XX.,XXX.XXX.XXXX.XX.XXXX.XX.XXXX.XX.,
XXX.XXX.XXX.XXXXXXXXX.,XXX.XXXX.XX.,XXX.XXX.XXXX.XXXX.X.,XXX.XXXXXXXXXXX.,—
XXX.XXXX.X.XXXX.XX.,—&XXX.XXXX.XX.,XXX.XXXX.X.XXXX.XX.XXXX.XX.,XXX.XXX.XX.,—
XXX.XXX.XXXXXXXXXXXX.,XXX.XXXX.X.,XXX.XXXX.XX.,—XXX.XXXX.XXXX.X.,—
XXX.XXXX.XXXX.X.,—&¶XXX.XXXXXXXXXXXXXXX.,XXX.XXXX.X.,XXX.XXXXXXXX.,
XXX.XXX.XXXX.XX.XXXX.X.XXXX.XX.,—XXX.XXX.XXXX.X.XXXX.X.XXXX.XX.,XXX.
XXXXXXXXX.,XXX.XXXX.X.XXXX.XX.XXXX.XX.,XXX.XXXXX.XX.XXXXXXXXXX.,—&XXX.
XXXXXXXXXXXXXX.,XXX.XXXX.XX.,—XXX.XXXX.X.XXXX.XX.XXXX.,XXX.XXXX.XX.,XXX.
XXXX.XX.,XXX.XXXX.XXXX.X.,—XXX.XXXXXXXXXX.,XXX.XXXX.X.XXXX.X.XXXX.XX.,—&
XX.XXXX.XX.,XXX.XXX.XXXXXXXXXXXX.,XXX.XXXX.XXX.XXXX.XX.,—XXX.XXXX.X.
XXXX.XX.,XXX.XXXX.XXX.XXX.,XXX.XXXX.X.XXXX.X.,—XXX.XXXX.X.,XXX.XXXX.XX.,XXX.
XXXX.XXXX.XX.,—XXX.XXXX.XX.,XXX.XXXX.X.,XXX.XXXXXXXXXXXXXXX.,—&¶

The various symbols of the first and second type are recorded in the same way in an appropriate medium, e.g., by punching paper tape, to be read by the scanning unit as shown in FIGURE 5. Both types of symbols are detected in the same way by a circuit as shown in FIGURES 6A and 6B. Thus reading a period, comma, dash or other symbol of either the first or second type will cause an output terminal in FIGURE 6B to be energized for approximately 80 milliseconds. As already noted, each output terminal in FIGURE 6B is connected to a series of plug-board contacts or hubs for wiring symbol combinations as already described in connection with FIGURES 7-13. The various output terminals of FIGure 6B are connected by a multiple wire cable to two sets of input contacts shown in FIGURE 15. These input contacts are labelled with corresponding letters or On reading one or more holes in a tape channel, the corresponding leads $L_1-L_7$, inclusive, are energized and remain energized for a short time interval thereafter until the operation of relay $K_1$ in FIGURE 6A interrupts the holding circuits to the other relays in FIGURES 6A and 6B.

Various output terminals shown in FIGURE 15 are coupled by cable to other units in the equipment. One such unit is the automatic read-out panel to be discussed subsequently and the discussion of various circuits in FIGURE 15 will be deferred correspondingly. Other units which are connected by cable to the output terminals of FIGURE 15 perform such functions as the automatic detection of frequently occurring symbol combinations, and the detection of partial sets of specified characteristics. The discussion of these units is also deferred to later paragraphs.

Attention is directed to the four sets of output terminals at the right of FIGURE 15. In operational equipment a larger number of sets of such output terminals would be provided so that each panel as shown in FIGURES 16–24 would have its own set of output terminals, which are eight in number. In these four sets of terminals, the terminals numbered $111_1$, $112_1$, $113_1$, and $114_1$, are positive power terminals as they are connected as shown in FIGURE 15 to the input lead 110 which is the positive side of the auxiliary power source. The terminals $111_8$, $112_8$, $113_8$, and $114_8$ are connected directly to the negative lead 109 of the auxiliary power source and these terminals may be used for certain special purpose panels as will be discussed subsequently. The remaining six terminals in each of the four sets under consideration are connected to the power lead 109 through the relays numbered 120–125 inclusive in such a way that these relays when operated by a predetermined symbol of the second type interrupt the current to one of the eight terminals within each of the four sets under consideration. More specifically, when one of the following various symbols of the second class is detected a corresponding relay as follows is operated and output terminals are accordingly deenergized:

| Symbol detected | Relay operated | Terminals deenergized |
|---|---|---|
| Period (.) | 120 | $111_2$, $112_2$, $113_2$, $114_2$ |
| Comma (,) | 121 | $111_3$, $112_3$, $113_3$, $114_3$ |
| Dash (—) | 122 | $111_4$, $112_4$, $113_4$, $114_4$ |
| Ampersand (&) | 123 | $111_5$, $112_5$, $113_5$, $114_5$ |
| Paragraph (¶) | 124 | $111_6$, $112_6$, $113_6$, $114_6$ |
| Theta ($\theta$) | 125 | $111_7$, $112_7$, $113_7$, $114_7$ |

Thus among the output terminals under consideration, those denoted by the subscripts 2, 3, 4, 5, 6, and 7 are deenergized respectively when the period, comma, dash, ampersand, paragraph and theta are detected. Panels as shown in FIGURES 16–24, are used to detect symbol combinations as well as higher order combinations analogous to "words," "phrases," "sentences," "paragraphs" and complete "messages" that may consist of one or more "paragraphs." The assignment of a given panel as shown in FIGURES 16–24 to detect a combination at a given level is acomplished by connecting the panel's holding voltage line (corresponding to terminals 24a, 24b, 24c in FIGURE 7) to an appropriate output terminal of a set as exemplified by $111_2$—$111_7$, $112_2$—$112_7$, $113_2$—$113_7$, and $114_2$—$114_7$. More specifically such assignment of a panel and coresponding connection of the holding voltage line is accomplished as follows:

| Panel assigned to register | Panel output detects | Holding voltage interrupted by detection of second type symbol | Holding voltage terminal denoted by subscript in Figure 15 |
|---|---|---|---|
| Symbols of first type | "Syllables" | Period (.) | 2 |
| "Syllables" | "Words" | Comma (,) | 3 |
| "Words" | "Phrases" | Dash (—) | 4 |
| "Phrases" | "Sentences" | Ampersand (&) | 5 |
| "Sentences" | "Paragraphs" | Paragraph (¶) | 6 |
| "Paragraphs" | "Messages" | Special symbol ($\theta$) | 7 |

FIGURE 34 shows schematically in block diagram form a complete system, in accordance with the present invention, for detecting a document satisfying the three-level search question $$\{[(a \cdot b \cdot c) \cdot (d \cdot e)][(f \cdot a \cdot e) \cdot (g \cdot b \cdot h)]\}$$

This proposed search question is purposely chosen for its simplicity, in order to facilitate in understanding of the present system.

At the lowest, or first, combinational level the syllables specified in the search questions are:

$(a \cdot b \cdot c)$, which is the syllable $A_1$;

$(d \cdot e \cdot)$, which is the syllable $B_1$;

$(f \cdot a \cdot e)$, which is the syllable $C_1$; and $(g \cdot b \cdot h)$, which is the syllable $D_1$.

At the second combinational level, the words specified in the search question are:

$(A_1 \cdot B_1)$, which is the word $A_2$; and $(C_1 \cdot D_1)$, which is the word $B_2$.

At the third and final combinational level, the phrase specified in the search question is:

$(A_2 \cdot B_2)$, which is the phrase $A_3$.

In the operation of this system, the tape reading means reads the symbols, one after another, from the record tape. After each symbol is read it produces a brief output signal at the corresponding output terminal of the symbol detector.

The symbol detector output terminals for information symbols which are included in the search question are connected to the No. 1 terminals of coresponding units in the lowest, or first, level of the discriminator. Therefore, when any such information symbol is read from the record tape it activates the coresponding first level unit in the discriminator, closing a circuit between the No. 8 and No. 9 terminals in that unit.

As shown in FIG. 34, the No. 9 terminal of one of the A units is connected to the No. 8 terminal of the B unit, and the No. 9 terminal of the B unit is connected to the No. 8 terminal of the C unit. Therefore, if, and only if, the symbols a, b, and c have been read from a single syllable on the record tape, a test pulse applied to the No. 8 terminal of the aforesaid A unit will pass through the interconnected Nos. 8 and 9 terminals of the A, B and C units to the No. 9 terminal of this C unit.

The same is true for the other groups of interconnected lowest level units in the discriminator.

This test pulse is produced in response to the reading of the period, which is the control symbol recorded on the record tape at the end of each syllable. This test pulse is applied simultaneously to all of the groups of lowest level units in the discriminator. However, it will pass through any particular group only if the latter have been interconnected to detect the syllable which has just been read from the recorded tape.

As shown in FIG. 34, if the first level test pulse passes through the A, B, C group of lowest level units, this test pulse will be applied as an activating pulse to the No. 1 terminal of the $A_1$ unit in the second level of the discriminator.

Similar connections are provided between the test pulse output terminals of each other group of interconnected lowest level units and the No. 1 terminal of a corresponding second level unit.

After each lowest level test pulse, the control panel of FIG. 15 (already described in detail) will interrupt briefly the power supply for each of the lowest level units. Any lowest level units which had been activated are now restored to their initial condition, in which the No. 8 and 9 terminals in each such unit are disconnected from each other. Any lowest level unit which had not been activated merely remains in its initial, unactivated condition.

With this arrangement, there is no possibility that the symbols in one syllable might become intermingled with the symbols in another succeeding symbol.

This interruption of the power supply lasts long enough only to restore all of the previously-activated units. The power supply is restored before the next information symbol is read.

The record tape continues to move uninterruptedly since the foregoing operations in the lowest level of the discriminator take place substantially instantaneously.

The various units in the second level of the discriminator have their No. 1 terminals connected to the test pulse output lines of corresponding groups of interconnected lowest level units. Therefore, if the $A_1$ syllable (which is $a \cdot b \cdot c$) is read, the second level $A_1$ unit will be activated by the period pulse at the end of that syllable, thereby interconnecting the No. 8 and 9 terminals of the $A_1$ unit. Likewise, if the $B_1$ syllable (which is $d \cdot e$) is read, the second level $B_1$ unit will be similarly activated.

On the record tape a second level control symbol (comma) appears at the end of each word. For example, if the word $A_2$, which is $[A_1 \cdot B_1]$, or $(a \cdot b \cdot c) \cdot (d \cdot e)$, is read from the record medium, a comma follows. The reading of this comma causes a second level test pulse to be applied to the No. 8 terminal of the $A_1$ unit. This test pulse is passed through the $A_1$ and $B_1$ units to the No. 9 terminal of the $B_1$ unit and appears as an activating pulse at the No. 1 terminal of the $A_2$ unit in the third level of the discriminator.

The same action takes place at the $C_1$ and $D_1$ units when the word $B_2$, which is $[C_1 \cdot D_1]$, or $((f \cdot a \cdot e) \cdot (c \cdot d)$, is read. If this happens, then the test pulse produced by the control symbol (comma) at the end of the word $B_2$ on the record tape will pass through the second level $C_1$ and $D_1$ units and will be applied as an activating pulse to the No. 1 terminal of the third level $B_2$ unit.

At the end of a phrase on the record tape which contained the words $A_2$ and $B_2$, the control symbol (dash) following such word will produce a test pulse which is applied to the No. 8 terminal of the $A_2$ unit and is passed through the $A_2$ and $B_2$ units (which have been activated) to the No. 9 terminal of the $B_2$ unit and thence to the automatic typewriter. This pulse conditions the automatic typewriter to type out the next symbols appearing on the record tape.

These last-mentioned symbols are detected by the symbol detector and produce pulses which pass through the FIG. 15 control panel to the automatic typewriter. These symbols identify the document, whose abstract has just been read from the record tape and which satisfies the search question.

FIGURES 16–24 illustrate the wiring of panels to conduct actual searches involving research questions in the field of metallurgy. Before discussing these figures in detail it should be pointed out that the holding current for circuits shown in FIGURES 7, 8 and 9 is interrupted on reading a period at the beginning and end of each "syllable" or code semanteme. This is accomplished by connecting the terminals 24a, 24b and 24c in FIGURE 7 and the corresponding holding current terminals in FIGURES 8 and 9 to terminals of FIGURE 15 such as $111_2$, $112_2$, $113_2$, $114_2$ or additional similar terminals which are de-energized when relay 120 in FIGURE 15 is activated on reading a period in the tape being scanned. As an introduction to FIGURES 16–24 reference is made to FIGURE 14 which exemplifies in a more general way the logical principles involved in detecting higher order combinations.

Let us assume that we wish to detect the fact that within a single "word" there will be found at least one "syllable" characterized by the logical relationship $<(<a \cdot b> + c)(e-d)>$, as well as at least one "syllable" characterized by the logical relationship $<g-f>$. Further, as previously discussed, the start and finish of each "syllable" will be indicated by a period and so recorded in the search medium, e.g., by punching of paper tape. The beginning and end of a "word" will be indicated correspondingly by a comma. It should be noted that the specified logical relationships, namely $<(<a \cdot b> + c)(e-d)>$ and $<g-f>$, are presented as examples of hypothetical nature for purposes of discussing the actions of the circuits. Realistic examples of actual searches are presented in discussing FIGURES 19–24, inclusive. In our hypothetical example, it is possible that both logical relationships might be satisfied by a single "syllable" such as ceg or by the presence, within a single "word," of two "syllables" such as habe and gom. Realistic codes are constructed so that an individual code semanteme or a closely related class of code semantemes may be detected both unambiguously and conveniently. Thus, for example, in a realistic search, a single code semanteme may be specified by $<k \cdot a \cdot j>$ or $<m \cdot a \cdot c \cdot h>$ while a closely related class of code semantemes all pertaining to the idea "machine, device, apparatus" may be specified by $<m \cdot c \cdot h>$ which relationship would be satisfied by code elements of the type $m$–$ch$ where the dash indicates any second letter, such as $a$, $e$, $w$, etc.

The first condition, $<(<a \cdot b> + c)(e-d)>$, may be detected by setting up a plug board as in FIGURE 13. When this condition is satisfied, during the reading of a single code semanteme or "syllable," a circuit is completed so that test current can flow in the output line of the plug board. For purpose of this discussion, this will be called the $A_1$ test current. Here the subscript denotes the detection of a code semanteme or "syllable" as being characterized by a certain logical relationship, namely, $<(a \cdot b> + c)(e-d)>$.

The second condition, $<g-f>$, is detected by other pairs of relays which may be in a second plug board wired as shown in FIGURE 11. When the second condition is satisfied, a circuit is completed so that the test current can flow in the output line of this plug board. This is the $B_1$ test current which denotes the detection of a code semanteme or "syllable" as being characterized by the logical relationship $<g-f>$.

The holding circuits for both of the plug boards in FIGURES 11 and 13—and in general for any plug boards used to register individual symbols for detecting their combination—are controlled by the period and the following 8-channel pulse as described for logical differences in conjunction with FIG. 10. In practice this means that the holding circuit terminals (corresponding to terminals 24a, 24b, and 24c in FIGURE 7) are connected by cable to terminal 533 in FIGURE 31. If no logical difference were involved in defining a "syllable," then the holding circuit terminals (corresponding to terminals 24a, 24b and 24c in FIGURE 7) would be connected by cable to output terminals in FIG. 15 exemplified by $111_2$, $112_2$, $113_2$, $114_2$. Thus at the end of each symbol combination or "syllable" punched in the tape, the reading of the period either alone (or together with the 8-channel pulse when using the circuits of FIG. 31 to detect logical relationships comprising a logical difference) releases all relays in the panels assigned to register symbols and to detect their logically defined combinations as specified in designating "syllables." This means in practice, that there is no danger that the symbols in one "syllable" may interact with the symbols in another "syllable" to generate a false "syllable" or a phantom result, as it is sometimes called.

As shown in FIGURE 14, an additional plug board is provided which has registers that are set up to register the fact that a "syllable" has been detected which is characterized by the logical relationship $$<(<a \cdot b> + c)(e-d)>$$

designated as $A_1$, and also the fact that a "syllable" has been detected which is characterized by the logical relationship $<g-f>$, designated as $B_1$. The internal wiring of such registers for registering logically defined combinations as exemplified by $A_1$ and $B_1$ is the same as the internal wiring as the "A", "B" and "C" registers in FIGURE 7. One of the power connections, namely the positive lead, is the same as for the "A," "B," and "C"

registers and for all other panels. The negative lead that provides holding current for the $A_1$ and $B_1$ registers corresponds, as far as the wiring of the relays is concerned to terminals 24a, 24b, and 24c in FIGURE 7. For the $A_1$ and $B_1$ registers, however, the negative holding lead is connected by cable to an output terminal in FIGURE 15 exemplified by $111_3$, $112_3$, $113_3$ and $114_3$. Thus detection of the period at the beginning and end of each "syllable" does not interrupt the holding current to the $A_1$ and $B_1$ registers. Thus, activation of either or both the $A_1$ and $B_1$ registers, by scanning of the "syllables" within a given word, persists when periods are read at the end of each of the said syllables. Note, however, that at the end of each "word" the reading of the comma releases all relays in panels assigned to register "syllables" and to detect their logical combinations as specified in designating "words". This means, in practice, that there is no danger that the "syllables" in one "word" may interact with the "syllables" in another "word" to generate a false or phantom "word."

The respective terminals of the $A_1$ and $B_1$ registers are interconnected by jumper wires to detect the logical product $<A_1 \cdot B_1>$ which in this case may be symbolized as $<[<(a \cdot b>+c)(e-d)>][<g-f>]>$. (Aside from the previously discussed difference in the interruption of the holding current to the registers for detecting the logical product $<A_1 \cdot B_1>$, the circuitry for these registers is the same as is discussed in detail in the preceding description of FIGURE 7.) The $A_1$ test current is supplied from the FIGURE 13 plug board panel to terminal 1 of the $A_1$ register of the additional plug board panel, while the $B_1$ test current is supplied from the FIGURE 11 plug board panel to terminal 1 of the $B_1$ register. Test current is applied through input line 60 to terminal 8 of the $A_1$ register. If the condition $<A_1 \cdot B_1>$ is satisfied, this test current is passed to the output line 61, which in turn may actuate a further relay pair whose internal wiring is the same as that of the registers shown in FIGURE 7, but, whose holding current is interrupted when the scanning units detects in the tape a dash which, as previously noted, is used to designate the beginning and end of phrases. Additional registers, whose holding current is interrupted on reading a dash (or the next following 8 pulse) may be provided and these registers may be used to register the detection of additional "words" characterized by the their containing "syllables" similar to, but in part at least, different from the "syllables" $A_1$ and $B_1$. Accordingly, during the scanning of any one "phrase," the holding current is not interrupted to the registers used to register "words" and thus a logically defined combination of specified "words" within a "phrase" can be readily detected. (As previously stated, "phrases" are denoted by $A_3$, $B_3$, $C_3$, etc.) The holding current to the "word registers" is interrupted by the dash when the logically defined combination of "words" to be detected does not include a logical difference. If the said combination involves a logical difference, then the test current pulse is provided by reading the dash and the holding current terminals for the "word" registers are connected to terminal 533 of a circuit as shown in FIGURE 31 and the holding current to the said "word" registers is interrupted by activation of relay 429 by a pulse that is generated when the scanning unit detects a hole in the 8th channel immediately following the dash that generates the test current pulse, as described in detail subsequently for FIGURE 31. Note also that the interruption of the holding current on reading the dash (or the next following 8-channel punch) will cause registers used to register "words" to be deactivated and thus the possibility of undesired interactions between the "words" or one "phrase" with the "words" of another "phrase" may be avoided and false combinations of "words" to simulate spurious "phrases" may be excluded.

In similar fashion, additional registers whose holding current is interrupted on reading an ampersand (or the next following 8-channel pulse) may be provided and these registers may be used to register the detection of "phrases" characterized by their containing logically defined combinations of "words." Accordingly, during the scanning of any one "sentence," the holding current is not interrupted to the registers used to register "phrases" and thus a logically defined combination of specified "phrases" within a "sentence" can be readily detected. (As previously stated, "sentences" are denoted by $A_4$, $B_4$, $C_4$, etc.). The holding current to the "phrase" registers is interrupted by the ampersand when the logically defined combination of "phrases" to be detected does not include a logical difference. If the said combination involves a logical difference, then the test current pulse is provided by reading the ampersand and the holding current terminals for the "phrase" registers are connected to terminal 533 of a circuit, as shown in FIGURE 31, and this holding current to the said "phrase" registers is interrupted by activation of relay 429 by a pulse that is generated when the scanning unit detects a hole in the 8th channel immediately following the ampersand that generates the test current pulse, as described in detail subsequently for FIGURE 31. Note also that the interruption of the holding current on reading the ampersand (or the next following 8-channel pulse) will cause registers used to register "phrases" to be deactivated and thus the possibility of undesired interactions between the "phrases" of one "sentence" and the "phrases" of another "sentence" may be avoided and false combinations of "phrases" to simulate spurious "sentences" may be excluded.

In similar fashion, additional registers whose holding current is interrupted on reading a paragraph symbol, ¶, may be provided and these registers may be used to register the detection of "sentences" characterized by their containing logically defined combinations of "phrases." Accordingly, during the scanning of any one "paragraph," the holding current is not interrupted to the registers used to register "sentences" and thus a logically defined combination of specified "sentences" within a "paragraph" can be readily detected. (As previously stated "paragraphs" are denoted by $A_5$, $B_5$, $C_5$, etc.) The holding current to the "sentence" registers is interrupted by the paragraph sign, ¶, when the logically defined combination of "sentences" to be detected does not include a logical difference. If the said combination involves a logical difference, then the test current pulse is provided by reading the paragraph sign, ¶, and the holding current terminals for the "sentence" registers are connected to terminal 533 of a circuit, as shown in FIGURE 31, and this holding current to the "sentence" registers is interrupted by activation of relay 429 by a pulse that is generated when the scanning unit detects a hole in the 8th channel immediately following the paragraph sign, ¶, that generates the test current pulse, as described in detail subsequently for FIGURE 31. Note also that the interruption of the holding current on reading the paragraph sign, ¶, (or the next following 8-channel pulse) will cause registers used to register "sentence" to be deactivated and thus the possibility of undesired interactions between the "sentences" of one "paragraph" and the "sentences" of another "paragraph" may be avoided and false combinations of "sentences" to simulate spurious "paragraphs" may be excluded.

In similar fashion, additional registers whose holding current is interrupted on reading the theta symbol ϴ may be provided, and these registers may be used to register the detection of "paragraphs" characterized by their containing logically defined combinations of "sentences." Accordingly, during the scanning of any one "message," the holding current is not interrupted to the registers used to register "paragraphs" and thus a logically defined combination of specified "paragraphs" within a "message" can be readily detected. (As previously stated "messages"

are denoted by $A_6$, $B_6$, $C_6$, etc.) The holding current to the "paragraph" registers is interrupted at the end of the read-out cycle by the theta symbol, $\theta$, when the logically defined combination of "paragraphs" to be detected does not include a logical difference. If the said combination involves a logical difference, then the test current pulse is provided by reading the $xqz$ symbol sequence prior to the read-out cycle and holding current terminals for the "paragraph" registers are connected to terminal 533 of a circuit, as shown in FIGURE 31, and this holding current to the "paragraph" registers is interrupted by activation of relay 429 by a pulse that is generated when the scanning unit detects a hole in the 8th channel immediately following the final letter in the $xqz$ symbol sequence that generates the test current pulse, as described in detail subsequently for FIGURE 31. Note also that the interruption of the holding by reading the theta sign, $\theta$, (or by the 8-channel pulse after the $xqz$ symbol sequence) will cause registers used to register "paragraphs" to be deactivated and thus the possibility of undesired interactions between the "paragraphs" of one "message" and the "paragraphs" of another "message" may be avoided and false combinations of "paragraphs" to simulate spurious "messages" may be excluded.

By way of summary it may be said that FIGURE 14 exemplifies a general mode of operation whereby a desired higher order combination or a multiplicity thereof can be detected by test current applied to a plurality of relays that register the lower level components of the said combination or combinations. The first step in detecting one or more higher combinations is the scanning of the tape by the tape scanning unit. Thus the holes, or combination of holes, used to record individual symbols are converted into electrical pulses which activate the circuits of FIGURES 6a and 6b to provide sequences of output electrical pulses that correspond to the sequences of individual symbols recorded as punched holes in the tape. Thus as a result of the combined action of the tape scanning unit and the circuits of FIGURES 6A and 6B, those symbols that are used in pre-established combinations or sequences to record code semantemes or "syllables" in the tape generate corresponding pulses that are registered, as appropriate, in various registers assigned by appropriate plugboard wiring between the output terminals of FIGURE 6B and the inputs of the registers. The test current which is applied to such registers either continually or, for relationships involving logical differences, at the end of a given code semanteme or "syllable" is used to activate other registers each of which is assigned to record detection of a code semanteme or "syllable." At the end of each code semanteme or "syllable," the registers assigned to detect individual symbols in the code semantemes or "syllables" are all returned to the de-activated condition, but the registers assigned to record the detected "syllables" remain activated until the "word" end. Thus, one or more successive code semantemes or "syllables" as appropriate to a given search or searches can be detected in terms of their component symbols and a plurality of "syllables" within a given "word" may be registered and detection of a given logical relationship among the code semantemes or "syllables" within a given "word" may be accomplished by a test current continuously applied, or when a logical difference is involved in the specified relationship among the code semantemes or "syllables," by a test pulse at the end of a "word." This test current or pulse may then activate a register assigned to registering the detection of a "word" specified in terms of component code semantemes or "syllables." All registers that are assigned to registering "syllables" and that are activated by detection of prescribed "syllables" during the reading of a given "word" remain energized throughout the reading of each "word" and until the test current or, for relationships involving a logical difference, the test pulse has been used to activate registers each of which is assigned to record detection of a "word" characterized in terms of code semantemes or "syllables." Thereafter, and prior to reading the next "word" punched in the tape, the registers used to register code semantemes or "syllables" are returned to the de-activated condition. In the same way registers are assigned to register "words" within "phrases" and a test current or test pulse is used to detect logically defined combinations of "words" and to register such detection by activating a register assigned for a "phrase." In the same way successively higher level combinations are detected, that is to say, "sentences" are detected as containing a logically defined combination of "phrases," "paragraphs" are detected as containing a logically defined combination of "sentences" and "messages" are detected as containing a logically defined combination of "paragraphs."

In theory, the detection of a single symbol within an encoded abstract or "message" could be caused to operate the readout circuits shown in FIGURES 25A, 25B, 25C and such operation of the readout circuits would mean that the scope of search was satisfied by detection of a single symbol. A search of such scope would occur rarely, if ever, in practice. As a rule a practical search requirement will involve at least one or more logically defined relationships of the types described above. The highest level combination that is specified will depend on the scope of the search, that is to say, the range of subject contents of encoded abstracts that are of pertinent interest. The detection of such highest level combination results in a test current or pulse being provided as an output from two or more registers and this output is used to activate appropriate relays in the read-out circuits as shown in FIGURES 25A, 25B, and 25C. In defining certain searches, a "sentence" may be specified as containing a certain combination of "words" but without specification as to whether said "words" occur in the same or different phrases or a "paragraph" may be specified as containing a certain "phrase" and also a certain "sentence," as illustrated in the discussion of FIGURE 17. In general, a higher level, logically defined combination may be specified in terms of any desired components at any desired single lower level or combination of lower levels.

PROGRAMMING OF PRACTICAL SEARCHES

The principles involved in the programming of the equipment of this invention have been previously discussed both in terms of the logical formulation of symbol combinations at various levels ("syllables," "words," etc.) and also in terms of establishing circuits to detect such logically formulated combinations. This previous discussion was, of necessity, somewhat abstract in nature in order to present certain important capabilities of the equipment of this invention.

A principal object of the present invention is to provide electronic equipment which may be programmed to conduct searching and selecting operations by completing external circuits by external means, e.g., by the wiring of plugboards. A particularly important field of application of such equipment is the correlative searching of scientific and technical information that is ordinarily recorded in published scientific and technical papers, patents, laboratory reports, etc.

In order that the equipment of this invention may be used to best advantage to search and to correlate the information contained in a file, its component units (individual papers, patents, reports, etc.) are analyzed and the results of such analysis recorded in appropriate form for machine searching. This preliminary processing may be accomplished by methods, described in a recently published book, J. W. Perry et al. (op. cit.). By way of illustration, reference is made to a paper entitled "The Effect of Silicon on the Kinetics of Tempering," by Walter S. Owen. An abstract of this paper was published in Chemical Abstracts, 47, 11108g (1954), as follows:

The effect of silicon on the kinetics of tempering. Walter S. Owen, (Univ. Liverpool, Engl.) Trans. Am. Soc. Metals, Preprint No. 24, 17 pp. (1953). Magnetic and length measurement studies showed Si (1) requires higher tempering temps. before appreciable third-stage decompn. can be detected and to complete the second and third stages; (2) prevents control by C diffusion in the third stage; and (3) produces a sluggish approach to metastable equil. owing to the slow transfer of Si atoms from the pptd. cementite to the matrix.  W. A. Mudge The first step in the processing and encoding of this paper was to prepare a standardized "telegraphic style" abstract as follows:

| Properties given for | |
|---|---|
| Material processed | Steel |
| Word symbol | |
| Component | Si |
| Word symbol | |
| Component | C |
| Word symbol | |
| Phrase symbol | |
| Process | tempering |
| Word symbol | |
| Process | decomposition |
| Word symbol | |
| Conditions | temperature/higher |
| Word symbol | |
| Conditions | time/stage/2/3 |
| Word symbol | |
| Phrase symbol | |
| Process | diffusion |
| Word symbol | |
| By means of | C |
| Word symbol | |
| Condition | time/stage/3 |
| Word symbol | |
| Phrase symbol | |
| Process | precipitation |
| Word symbol | |
| Process | transfer & atoms/Si |
| Word symbol | |
| Phrase symbol | |
| Property given for | } |
| Material processed | } steel |
| Product | } |
| Word symbol | |
| Component | cementite/precipitated |
| Word symbol | |
| Component | atoms/Si/absent |
| Word symbol | |
| Component | matrix |
| Word symbol | |
| Component | Si |
| Word symbol | |
| Property given | equilibrium/metastable |
| Word symbol | |
| Phrase symbol | |
| Process | testing |
| Word symbol | |
| Process | measurement |
| Word symbol | |
| Phrase symbol | |
| Property determined | magnetic properties |
| Word symbol | |
| Property determined | length |
| Word symbol | |
| Property determined | } characteristics/tempering |
| Property influenced | } |
| Word symbol | |
| Property determined | } decomposition |
| Property influenced | } |
| Word symbol | |
| Property determined | } equilibrium |
| Property influenced | } |
| Word symbol | |
| Influenced by | Si |
| Word symbol | |
| Phrase symbol | |
| Sentence symbol | |
| Paragraph symbol | |

The standardized abstract is presented here in two columns. In the left hand column there are two kinds of entries that indicate respectively (1) the various symbols of the second class, viz. "paragraph symbol," "sentence symbol," "phrase symbol," "word symbol" and "syllable symbol" and (2) various words and phrases—the so-called "role indicators" that indicate the manner of involvement of the entries on the same line in the right hand column. Assignment of symbols of the second class has already been presented. The role indicators are encoded as various three letter codes, all of which begin with the letter "k," e.g. "properties given for" is encoded as "kov." The entries in the right hand column—the so-called "substantive entries" are encoded (with exception of chemical elements and chemical compounds) so as to indicate the relationship of the specific term to certain selected generic concepts as discussed in Perry et al., op. cit. Note that the slant symbol in the right hand column has the significance of "namely" while the symbol @ denotes "pertaining to." Chemical formulas are set off and distinguished from other codes by a preceding and following # symbol, which is recorded on the tape as ⓤⓒ 3 ⓛⓒ.

The encoding of the various words and terms in the telegraphic style abstract thus results in the following encoded abstract which is recorded as a symbol sequence in an appropriate medium, as exemplified by punched paper tape.

, .kov.kej.1a11.metl.rern.1., kuj.#Si#., kuj.#C#., -kam. mwtl.pass.rqht.13., kam.datr.2., kah.tamp.1./rapr.89., kah. tamm.1./rapr.tymm.8./2./3., -kam.daff.1., kqj.#C#., kah. tamm.1./rapr.tymm.8./3., -kam.supr.19., kam.cang.17.@ paph.4./#Si#., -kwj.kej.kov.1all.metl.rern.1., kuj.cerb. rern.1a11.2./sypr.19.kuj.paph.4. / #Si# ./ rapr.231., kuj. rang.17., kuj.#Si#., kwv.pwpr.rapr.3./papr.ryng.2., -kam null.2., kam.masr.4., -kup.papr.1./mygn.2., kup.mapr.51., kup.kap.gapr.8./mwtl.pass.rqht.13., kup.kap.datr.2., kup. kap.pwpr.rapr.3./papr.ryng.2., kal. #Si#., - & ¶.

It should be noted that the encoding of the abstract involves the use of the comma as a symbol in such a way that it precedes and follows each combination of at least one role indicator (encoded as a three letter code starting with the letter "k") with the code for a substantive term as exemplified by datr.2. (decomposition). In these encoded abstracts, therefore, each "word" consists of at least one role indicator prefixed to the code for a substantive term, e.g., kam.datr.2.,. More specifically, the encoding of abstracts employs single three-letter "syllables," each of which begins with the letter "k," to represent relationships that require one or more words in English. Furthermore, the encoding of "substantive entries" in the standardized abstract involves at least one four letter code (representing a semantic factor together with an analytical relationship as denoted by the second of the four letters) and a numeral (to distinguish a given code from other codes otherwise identical insofar as their semantic factors are concerned).

The programming of the equipment of this invention to conduct example searches of encoded abstracts will now be considered. It will be assumed that a file of abstracts relating to metallurgy has been encoded and recorded on tape ready for searching.

For illustrative purposes, two relatively simple information requests will be considered. The first of these is as follows:

"What is the effect of silicon on the tempering of steel?"

As a preliminary to analyzing this question in order to program the searching selector, let us recall to mind that common experience in reference library work makes it advisable to consider carefully the following points:

(a) How carefully has the question been thought out and worded?

(b) How extensive and exhaustive a search would the inquirer prefer? (In some instances, an information requestor will wish to see every paper bearing on his inquiry. The time required to review a large number of papers may be, however, a critical consideration in this connection. Sometimes a few review papers may be preferred to an exhaustive search, and provision has been made in the encoding of abstracts for identifying review papers that are of pertinent interest to broad searches.)

(c) Is information that is related to the information request only indirectly of value to the inquirer? (The usefulness of related information tends to be greater when there is little or no information that bears directly on the inquirer's problem.)

These considerations and related problems often confront reference librarians with difficult problems, particularly in the area of search strategy. To convert such problems into opportunities for achievement and also to provide previously unavailable capabilities for conducting searching and correlating operations have been important goals in the development of the searching selector. In achieving these goals the interpretation and analysis of information requests are of key importance as is discussed below.

The example question chosen permits the more important capabilities of the searching system to be illustrated. In particular, the search strategy may be varied depending on whether it is desired to include among the selected papers those that contain information that is not directly pertinent but of related interest.

First, let us consider the narrow interpretation. The question: "What is the effect of silicon on the tempering of steel?" would then be interpreted and analyzed for searching purposes as follows:

Identify all documents whose encoded abtracts are recorded as having the following characteristics:

I. Steel, only when it is either (a) a material processed, (b) when properties are given for it, or (c) a product.

II. Silicon, only when it either (a) is a component or (b) influences properties.

III. Designation in the encoded abstract that (a) a property is given, or (b) a property is influenced.

IV. Designation in the encoded abstract of the process, tempering.

This formulation of the search requirement (to be designated hereafter as search $A_5$) may be rewritten in a telegraphic style to correspond with the standardized abstract, and each element in the requirement when so formulated may be denoted by a lower case letter:

$a=$Properties given for (role indicator)
$b=$Material processed (role indicator)
$c=$Product (role indicator)
$d=$Steel
$e=$Components (role indicator)
$f=$Influenced by (role indicator)
$g=$Silicon
$h=$Properties given (role indicator)
$i=$Properties influenced (role indicator)
$j=$Process (role indicator)
$k=$Tempering Symbolically, our search requirement might then be represented by $$[<(a+b+c)\cdot d>][<(e+f)\cdot g>][h+i][<j\cdot k>]$$

This symbolic formulation of the example search must be altered when the telegraphic style question is encoded in the same way as the abstracts that are to be searched:

| Search requirement element | Code | "Syllable" symbol |
|---|---|---|
| $a=$Properties given for (role indicator). | kov | $A_1$ |
| $b=$Material processed (role indicator). | kej | $B_1$ |
| $c=$Product (role indicator) | kaj | $C_1$ |
| $d=$Steel | la11.me11.rem.1 | $D_1,E_1,F_1,G_1$ |
| $e=$Component (role indicator) | kuj | $H_1$ |
| $f=$Influenced by (role indicator) | kal | $I_1$ |
| $g=$Silicon | #Si# | $J_1$ |
| $h=$Properties given (role indicator). | kwv | $K_1$ |
| $i=$ Properties influenced (role indicator). | kap | $L_1$ |
| $j=$Process (role indicator) | kam | $M_1$ |
| $k=$Tempering | mwtl.pass.rqht.13 | $N_1,O_1,P_1,R_1$ |

Using the above indicated symbols $A_1$, $B_1$, $C_1$, etc. to designate code "syllables" (or "semantemes"), the search requirement may now be symbolized as:

$$[<(A_1+B_1+C_1)\cdot(D_1\cdot E_1\cdot F_1\cdot G_1)>][<(H_1+I_1)J_1>]$$
$$[K_1+L_1][<M_1\cdot(N_1\cdot O_1\cdot P_1\cdot R_1)>]$$

In this formulation each set of square brackets indicates those "words" whose presence in an encoded abstract must be detected if the abstract is to be selected as probably of pertinent interest. Specifically these "words" are specified as follows:

$$A_2=[<(A_1+B_1+C_1)\cdot(D_1\cdot E_1\cdot F_1\cdot G_1)>]$$
$$B_2=[<(H_1+I_1)\cdot J_1>]$$
$$C_2=[K_1+L_1]$$
$$D_2=[<M_1\cdot(N_1\cdot O_1\cdot P_1\cdot R_1)>]$$

(Here, as well as subsequently, the equality sign denotes "contains" or "comprises" rather than equality in the usual algebraic or arithmetical sense.) A detailed analysis of the example information requirement on a strictly logical basis would involve the formulation of "phrases" as the next programming step. Experience shows, however, that sufficient discriminating can be expected in the example search if the further programming is limited to requiring that $A_2$ and $D_2$ are both in the same sentence, namely $A_4$, and that $A_4$, $B_2$ and $C_2$ are in the same paragraph, $A_5$. These additional programming specifications may be symbolized as follows:

$$A_4=A_2\cdot D_2$$
$$A_5=A_4\cdot B_2\cdot C_2$$

The wiring of the individual panels for this search as analyzed and formulated above is shown in FIGURES 16–17.

FIGURE 16 shows panels wired to detect the various "syllables" that are recorded as more than one symbol, in this case, all but the single symbol "syllable" $G_1$. Each "syllable" is wired so as to be detected as an ordered sequence of symbols, in this case, the sequence-specified logical product of its component symbols.

Referring to FIG. 16, the several "1" terminals of the plug-board panels have connections leading from the corresponding output terminals of the symbol detector (FIGS. 6A and 6B).

The first three columns of the first plugboard 70 are wired up to detect the sequence-specified logical product $<k\cdot o\cdot v>$, in accordance with the principles already explained in the description of FIG. 8. Thus, these three plugboard columns constitute a detector for a higher combinational level or stage than the symbol stage, in this case, the "syllable" stage. When the successive symbols that constitute this logical product are read from the tape by the scanning unit and are detected by the symbol detector (FIGS. 6A and 6B), and passed to the "1" terminals in the first three columns of plugboard 70, test current applied to the "8" terminal of the first column is passed through the plugboard connections between these first three columns to the "9" terminal of the third column. This is the $<k\cdot o\cdot v>$, or $A_1$ output.

41

The same principles apply for the other "syllables" to be detected by the panels in FIG. 16. The individual symbols which make up each "syllable" are fed into the plugboards by means of wires leading from the corresponding symbol output terminals of the symbol detector (FIGS. 6A and 6B) to the "1" terminals on the FIG. 16 panels.

In detecting $J_1$, i.e. the symbol sequence #S$i$#, the wiring takes into account the fact that # is recorded as UC (upper case symbol) 3 LC (lower case symbol) and the capital letter S (in S$i$) is recorded as UC $s$ LC.

The "syllable," $D_1$, namely, *lall*, requires a special precaution in detecting the final double letter for the following reasons. If in FIGURE 8, the leads 26$a$ and 26$b$ were both connected to the output for the letter L in FIGURE 6B, then reading a single $l$ would cause the relays in the "A" register to operate and the resultant establishment of an electrical circuit between contacts 5 and 6 in the "A" register would result in establishing an electrical circuit between contacts 3 and 4 in the "B" register. The time to establish these circuits would be about 30 milliseconds, which is the time of response of the relays in the "A" register. Since, as noted, in describing the operation of the circuits of FIGURES 6A and 6B, the output terminals at the right of FIGURE 6B remain activated for about 80–100 milliseconds on detecting a given letter, there would be ample time for a single reading of the letter $l$ to act further to activate the relays of the "B" register. To avoid a single letter being mistaken for a double letter in this fashion, it is specified by the wiring in FIGURE 16 that an 8-channel pulse must be registered before detecting the final $l$. If detection of the 8-channel pulse is not registered as a condition to detecting the second symbol in a pair such as $ll$, then both relays wired for the two symbols will be energized in rapid succession when the tape scanning unit reads only one symbol, e.g. a single $l$ in our example.

The same provision is made for detecting the "syllable" $O_1$, which also has a double letter.

The registers shown in FIGURE 16 are used to register individual letters, numerals, symbols and signal pulses as described in detail above. The wiring of the input contact of the plugboards with the output terminals of the symbol detector whose circuits are shown in FIGURES 6A and 6B causes the registers of FIGURE 16 to register, in selective fashion, those sequences of symbols that corresponds to the code semantemes or "syllables" that are used to specify the scope of the search to be performed. The test current is applied continuously to the lead marked "test current input." As a consequence, as soon as detection of any one of the sequences of symbols, as specified by the wiring, has activated the corresponding set of registers, the input test current will be provided with an electrical circuit through the said set of registers to an output lead which is marked both by the symbol sequence that characterizes a given code semanteme or "syllable" and also by a capital letter with 1 as a subscript, e.g., *kej*—output $C_1$. These outputs in FIGURE 16 are connected to register inputs with corresponding designations in FIGURE 17 and consequently the appearance of electrical current in an output in FIGURE 16 will cause, immediately thereafter, activation of a corresponding register in FIGURE 17.

The holding circuits for all five panels shown in FIGURE 16 are interrupted when the tape scanning unit detects a period (.) which immediately precedes and follows each code "syllable" or "semanteme." As a consequence of this, all relays in these panels which were activated by detection of component symbols in one code "semanteme" are deactivated before the detection of symbols in the next "semanteme" is begun by the tape scanning unit. When the relays are deactivated, there is no electrical circuit between contacts 8 and 9 nor between contacts 5 and 6 in each of the vertical columns of contact plugs in FIGURE 16. In this way, there is no possibility that one or more symbols in one "syllable" or code "semanteme" may interact with one or more symbols in another "syllable" or code "semanteme" to generate a false combination or phantom "syllable."

With inclusion of the 8-channel pulse, all individual symbol inputs shown in FIGURE 16 are wired by panel plugging to the individual symbol outputs shown in FIGURE 6B.

FIGURE 17 shows panels wired to detect the higher order combinations in the example search. The respective inputs to the "1" terminals in the FIG. 17 panels are the output lines from the correspondingly labelled output terminals in FIG. 16, except for the single-symbol "syllable" $G_1$, which is designated by the numeral "1" and is detected directly at the symbol detector (FIGS. 6A and 6B).

At the first panel 75 in FIG. 17 a test current output will appear at the $A_2$ output line only if the logical relationship $<(A_1+B_1+C_1)\cdot(D_1\cdot E_1\cdot F_1\cdot G_1)>$ is detected. It will be apparent that the first seven columns of panel 75 are wired in accordance with the previously explained principles to detect this logical relationship. Thus, these columns of panel 75 constitute a detector in the combinational level next above the stage of $A_1$, $B_1$, etc.

Similarly, output current will appear in the $B_2$, $C_2$ and $D_2$ output lines only if the specified logical relationships of their component symbols are detected. Thus, the columns of panels 75 and 76 which provide these outputs constitute detectors in this higher order combinational stage.

The $A_2$ and $D_2$ outputs are fed into the "1" terminals at panel 77, which is wired to detect $A_4$, which is $A_2 \cdot D_2$.

The $A_4$ output and the $B_2$ and $D_2$ outputs from panel 75 are fed into the "1" terminals at panel 78, which is wired to detect $A_5$, which is $A_4 \cdot B_2 \cdot C_2$.

The $A_5$ output is connected to the input of the readout panel shown in FIGS. 25A–C and described in detail hereinafter.

The holding current to the first two panels 75 and 76 in FIG. 17 is interrupted when the tape scanning unit detects a comma (,) at the beginning and end of each word. Similarly, the holding current to the third panel 77 in FIG. 17 is interrupted when the tape scanning unit detects an ampersand (&) at the beginning and end of each sentence. The holding current to the fourth panel 78 in FIG. 17 is interrupted when the tape scanning unit detects a paragraph symbol (¶) at the beginning and end of each paragraph. In this way assurance is provided that the various higher order combinations, $A_2$, $B_2$, $C_2$, $D_2$, $A_4$ and $A_5$ will be detected in conformance with requirements stated when defining these combinations.

As noted at the start of the discussion of this example information request it may be interpreted during analysis more or less narrowly or broadly. A somewhat broader interpretation may result in selection of additional information which, though not pertinent on the basis of a stricter interpretation, may nevertheless be of sufficient related interest to warrant review on the part of the person who originated the information request. Such a broadened search requirement might be stated as follows.

Identify all documents whose encoded abstracts are recorded as having the following characteristics:

I. Steel, only when it is either (*a*) a starting material or (*b*) a material processed, or (*c*) when properties are given for it.

II. Silicon, only when either it (*a*) is a component or (*b*) influences properties.

III. One or more of the following processes: tempering, annealing, spheroidizing, stress relief, stabilizing anneal, graphitizing, malleabilizing, normalizing, austempering.

Each of the additional terms denoting processes is selected by consulting "tempering" in the "reverse" code dictionary, which brings together synonyms, near synonyms, and related terminology. Specifically the terms for our broadened example search were obtained by consulting that portion of the semantic code dictionary which deals with "heat treatment." Actually, two of the terms, graphitizing and malleabilizing refer to heat treatment of cast iron and not to steel, but their inclusion can scarcely lead to serious difficulty since the search requirement specifies that steel shall be involved as a starting material or a material processed or a material for which properties are given.

The search in its broadened form (to be designated hereafter as search $B_5$) is analyzed in the same way as before into the following elements, whose codes are also given below together with corresponding "syllable" symbols, $A_1$, $B_1$, $C_1$, etc.

| Search requirement element | Code | "Syllable" symbol |
|---|---|---|
| a = Properties given for (role indicator). | kov | $A_1$ |
| b = Material processed (role indicator). | kej | $B_1$ |
| c = Starting material (role indicator). | kaj | $C_1$ |
| d = Steel | 1a11.mctl.rern.1 | $D_1 \cdot E_1 \cdot F_1 \cdot G_1$ |
| e = Component (role indicator). | kuj | $H_1$ |
| f = Properties influenced by (role indicator). | kal | $I_1$ |
| g = Silicon | #Si# | $J_1$ |
| j = Process (role indicator). | kam | $M_1$ |
| k = Tempering | mwtl.pass.rqht.13 | $N_1 \cdot O_1 \cdot P_1 \cdot R_1$ |
| l = Annealing | mwtl.pass.rqht.16 | $N_1 \cdot O_1 \cdot P_1 \cdot S_1$ |
| m = Spheroidizing | cwrb.mwtl.pass.rqht.2 | $T_1 \cdot N_1 \cdot O_1 \cdot P_1 \cdot U_1$ |
| n = Stress-relief | mwtl.pass.rqht.14 | $N_1 \cdot O_1 \cdot P_1 \cdot V_1$ |
| o = Stabilizing anneal | cwrb.mwtl.pass.rqht.3 | $T_1 \cdot N_1 \cdot O_1 \cdot P_1 \cdot W_1$ |
| p = Graphitizing | cwrb.mwtl.pass.rqht.4 | $T_1 \cdot N_1 \cdot O_1 \cdot P_1 \cdot X_1$ |
| q = Malleabilizing | cwrb.mwtl.pass.rqht.1 | $T_1 \cdot N_1 \cdot O_1 \cdot P_1 \cdot G_1$ |
| r = Normalizing | mwtl.pass.rqht.15 | $N_1 \cdot O_1 \cdot P_1 \cdot Y_1$ |
| s = Austempering | mwtl.pass.rqht.17 | $N_1 \cdot O_1 \cdot P_1 \cdot Z_1$ |

In terms of unencoded search requirement elements, the broadened interpretation of the search may be symbolically formulated as:

$$[<(a+b+c) \cdot d>] \; [<(e+f) \cdot g>]$$
$$[<j \cdot (k+l+m+n+o+p+q+r+s)>]$$

In code semantemes we next replace $$[<(a+b+c) \cdot d>]$$

by $[<(A_1+B_1+C_1) \cdot (D_1 \cdot B_1 \cdot G_1)>] = A_2$ and we replace $$[<(e+f) \cdot g>]$$

by $[<(H_1+I_1) \cdot J_1>] = E_2$

The corresponding further formulation in terms of code semantemes can be considerably simplified by noting that the codes for tempering, annealing, spheroidizing, stress-relief, stabilizing anneal, graphitizing, malleabilizing, normalizing, and austempering have in common three code "semantemes" namely *mwtl*, *pass* and *rqht* (denoted by $N_1$, $O_1$, and $P_1$ respectively). This makes it possible to replace—without any risk of failure to detect information of interest—the formulation $$[<j \cdot (k+l+m+n+o+p+q+r+s)>]$$

by $[<M_1 \cdot (N_1 \cdot O_1 \cdot P_1)>] = B_2$

Comparison of the newly formulated "word" requirement, $E_2$, with the previous corresponding "word" requirement, $D_2$, shows that $E_2$ is much broader than $D_2$ in semantic scope as it includes a considerable number of near-synonyms for tempering. Symbolically formulated, however, $E_2$ differs from $D_2$ only by omission of the "semanteme" $R_1$ whose inclusion in $D_2$ ensures that tempering is distinguished from related near-synonyms.

Further formulation of higher level combinations for the more broadly defined search is based on two additional requirements, corresponding to those already discussed. Specifically, it is required that $A_2$ and $E_2$ are in the same sentence, denoted by $B_4$, and that $B_4$ and $B_2$ are in the same paragraph, denoted by $B_5$, or symbolically:

$$B_4 = A_2 \cdot E_2$$

$$B_5 = B_4 \cdot B_2$$

The wiring of panels to detect code "syllables" or "semantemes" for the broadened search is shown in FIGURE 18. The similarities with FIGURE 16 are, perhaps, obvious and these play an important role in working out the programming for simultaneously conducted searches as discussed subsequently. The holding current to the panels in FIGURE 18 is interrupted when the tape reading unit detects the period (.) and this prevents undesired interaction between symbols in different "syllables" or code "semantemes" as discussed in conjunction with FIGURE 16.

FIGURE 19 shows panel wiring for the higher order combinations $A_2$, $B_2$, $E_2$, $B_4$ and $B_5$. The holding current to the panels used to detect the combinations $A_2$, $B_2$, and $E_2$ is interrupted when the tape reading unit detects the comma (,) and the holding current to the panels used to detect $B_4$ and $B_5$ is interrupted when the tape reading unit detects, respectively, the ampersand (&) and the paragraph symbol (¶). This arrangement corresponds to that discussed in connection with FIGURE 17.

To enable the programming of simultaneously conducted searches to be better illustrated, a second information request not closely related will be analyzed and its programming diagrammed in terms of plugboard wiring. This second information request is:

"How is dissolved hydrogen removed from titanium ingots?"

For reasons previously discussed, two variations of this information request will be considered. The first variation to be designated hereafter as search $C_5$ will require identification of all documents whose encoded abstracts are recorded as having the following characteristics:

I. Ingots only when mentioned as (*a*) a product or (*b*) a material processed or (*c*) a starting material and (*d*) associated with titanium but only when the latter is a component.

II. Hydrogen only when it is (*a*) a material processed and also (*b*) designated as dissolved.

III. Removal (and synonyms) only when designated as a process.

This search requirement, prior to encoding, may be symbolically formulated, with regard to its component elements, as follows:

$$[(<(a^1+b+c) \cdot t>)] \; [(<e \cdot u>)]$$
$$[(<b \cdot v>) \cdot w] \; [<j \cdot x>]$$

Here individual letters, as before denote search requirement elements as listed below:

| Search requirement element | Code | "Syllable" symbol |
|---|---|---|
| $a^1$ = Product (role indicator) | kwj | $A_1^1$ |
| b = Material processed (role indicator) | kej | $B_1$ |
| c = Starting material (role indicator) | kaj | $C_1$ |
| e = Component (role indicator) | kuj | $H_1$ |
| j = Process (role indicator) | kam | $M_1$ |
| t = Ingot | mapr. mytl. 3 | $B_1^1 \cdot C_1^1 \cdot W_1$ |
| u = Titanium | #Ti# | $D_1^1$ |
| v = Hydrogen | #H# | $E_1^1$ |
| w = Dissolved | fqld. pwss. 2 | $F_1^1 \cdot G_1^1 \cdot U_1$ |
| x = Removal (and synonyms) | ram 1 | $H_1^1$ |

The codes for the search elements and the accompanying "syllable" symbols provide the basis for reformulating this search as follows:

$$[(<(A_1+B_1+C_1) \cdot (B_1^1 \cdot C_1^1 \cdot W_1)>)] \; [(<H_1 \cdot D_1^1>)]$$

$$[(<B_1 \cdot E_1^1>) \cdot F_1^1 \cdot G_1^1 \cdot U_1] \; [<M_1 \cdot H_1^1>]$$

For this search, "words" are formulated as follows:

$F_2 = [<(A_1^1 + B_1 + C_1) \cdot (B_1^1 \cdot C_1^1 \cdot W_1)>]$ $G_2 = [<H_1 \cdot D_1^1>]$ $H_2 = [(<B_1 \cdot E_1^1>) \cdot F_1^1 \cdot G_1^1 \cdot U]$ $I_2 = [<M_1 \cdot H_1^1>]$ Since the ingots involved are to contain titanium as a components, a "phrase," $A_3$ will be defined as follows:

$$A_3 = F_2 \cdot G_2$$

Further, since dissolved hydrogen is to be removed, $H_2$ and $I_2$ will be required to be found in the same "sentence," $C_4$, defined as follows:

$$C_4 = H_2 \cdot I_2$$

Finally, it will be required that both $A_3$ and $C_4$ shall be found in the same paragraph $C_5$ $$C_5 = A_3 \cdot C_4$$

Plugboards wired to detect the "syllables" involved in this search are shown in FIGURE 20. The higher order combinations, $F_2$, $G_2$, $H_2$, $I_2$, $A_3$, $C_4$ and $C_5$ are detected by plugboards wired as shown in FIGURE 21. The holding current to these panels used to detect higher order combinations is interrupted when the tape scanning unit detects various symbols as follows:

| Panel detects: | Symbol interrupting holding current |
|---|---|
| $F_2$, $G_2$, $H_2$, $I_2$ | Comma (,) |
| $A_3$ | Dash (–) |
| $C_4$ | Ampersand (&) |
| $C_5$ | Paragraph symbol (¶) |

The above programmed information requirement will next be considered in somewhat broader interpretation as follows:

"How is hydrogen removed from titanium?"

This broader interpretation—referred to hereafter as search $D_5$—will require identification of all documents whose encoded abstracts are recorded as having the following characteristics:

I. Titanium only when mentioned as (a) a product or (b) a material processed or (c) a starting material or (d) a component.

II. Hydrogen only when it is a material processed.

III. Removal (and synonyms) only when designated as a process.

This search requirement prior to encoding may be symbolically formulated with regard to its component elements as follows:

$$[<(a^1 + b + c) \cdot u>][<b \cdot v>][<j \cdot x>]$$

When the previously listed codes for these elements in our search requirement are taken into account, the following reformulation is the next step in deriving the program for the selector:

$$[<(A_1^1 + B_1 + C_1) \cdot D_1^1>][<B_1 \cdot E_1^1>][<M_1 \cdot H_1^1>]$$

The "words" in this formulation are as follows:

$J_2 = [<(A_1^1 + B_1 + C_1) \cdot D_1^1>]$ $K_2 = [<B_1 \cdot E_1^1>]$ $I_2 = [<M_1 \cdot H_1^1>]$ Since hydrogen is to be removed, $K_2$ and $I_2$ will be required to be found in the same sentence $D_4$ defined as follows:

$$D_4 = K_2 \cdot I_2$$

and, furthermore, both $J_2$ and $D_4$ will be required to be found in the same paragraph, $D_5$, defined as follows:

$$D_5 = J_2 \cdot D_4$$

The "syllables" involved in this search ($D_5$) are included among those used to define and formulate an earlier search ($C_5$). See FIGURE 19.

The plugging of boards for the higher order combinations $J_2$, $K_2$, $I_2$, $D_4$ and $D_5$ is shown in FIGURE 22. The various inputs to the "1" terminals in the first panel in FIG. 22 are from the correspondingly labelled outputs in FIG. 20. The holding current to the panels in FIGURE 22 is interrupted when the tape scanning unit detects various symbols as follows:

| Panel detects: | Symbol interrupting holding current |
|---|---|
| $J_2$, $K_2$, $I_2$ | Comma (,) |
| $D_4$ | Ampersand (&) |
| $D_5$ | Paragraph symbol (¶) |

It is an object of the present invention to provide equipment that may be programmed to conduct a plurality of independent or interrelated searches simultaneously. The greater the extent that different searchers have elements in common at various levels, the greater the reduction in plugboard wiring—and plugboard capacity—that is needed to perform the searches simultaneously. This becomes apparent when considering plugboards wired to conduct simultaneously the four example searches $A_5$, $B_5$, $C_5$, $D_5$ that have previously been discussed independently. FIGURE 23 shows plugboards wired to detect the "syllables" or code "semantemes" used to define and to formulate the four searches. As successive "syllables" or code "semantemes" are read by the tape scanning unit, their component, letters, and other symbols generate pulses of 80–100 millisecond duration at the contacts at the right of FIGURE 6B. Certain of these contacts are connected by plugboard wiring to the inputs of the registers of FIGURE 23, i.e., to the contacts numbered "1" at the top of the panels as shown. When the symbol sequence for a code "semantemes," e.g., kam, is read by the tape scanning unit, the registers in panel 71 whose inputs are labelled k, a, m are activated one after another and the test current will appear at the output $M_1$, and, by plugboard wiring, both of the registers in FIGURE 24 whose inputs are marked $M_1$ will be activated. Reading the period symbol following each code "semanteme" will result in deactivating all relays shown in FIGURE 23, but reading the period does not deactivate any of the relays in FIGURE 24 which shows plugboards wired to detect the higher level combinations for the four searches under consideration. It will be noted that a single detection of kaj, as shown in FIGURE 23, suffices for it to be used in establishing the logical combinations corresponding to the outputs $A_2$ and $F_2$. Similarly a single detection of kej, kuj and kam serves for each of these to serve as elements in two or more different logically defined combinations of syllables. It will also be noted that the logical combination defining $E_2$ differs from the combination defining $D_2$ only by the latter including the additional element $R_1$. As a consequence, four registers, each of which consists of a pair of relays as shown in FIGURE 7, are used to register the elements $M_1$, $N_1$, $O_1$ and $P_1$, serve for detecting both $D_2$ and $E_2$. These examples may serve to illustrate how simultaneous programming of searches enables plugboard capacity to be conserved.

A further advantage of simultaneously conducting a plurality of searches is the ability to conserve time. It may be said that the effective searching speed is increased by a factor equal to the number of searches being conducted simultaneously.

The preceding discussion has shown how the subject contents of documents may be expressed in terms of important characteristics organized into a telegraphic-style abstract, which is then encoded and the encoded abstract recorded as a series of symbols in an appropriate search medium, e.g. by punching paper tape. A multiplicity of such abstracts are recorded in sequence on the recording medium and each abstract is followed by a supplementary sequence of special symbols recorded in the same fashion, e.g. by punching the paper tape. Each such supplementary sequence of special symbols has the function of causing the automatic typewriter to operate and to list those abstracts that are detected as pertinent as a result of the scanning and selecting operations which have been described above and which may be summarized as follows. (1) Succesive symbols in the recording medium, e.g. the punched paper tape, are read by the scanning unit to generate electrical pulses. (2) These electrical pulses act on various sets of relays which, by means of fixed wiring supplemented by plugboard wiring, are coupled together so that certain combinations of symbols will result in corresponding relays being closed to provide circuits whose establishment corresponds to the detection of certain code "semantemes" or "syllables." Detection of each such "syllable" corresponds to an output current in a plugboard wiring lead and these outputs are made to act on other relays whose activation-optionally in combination with other relays activated by single symbols-provides circuits that correspond to the detection of "words." In similar fashion, successively higher order combinations—previously referred to as "phrases," "sentences" and "paragraphs"—may be built up from lower order combinations. As shown in previous examples, it may be specified as a condition for selecting a given abstract, that it shall contain at least one or more "phrases" each of which may be specified in terms of a logically defined combination of "words." Furthermore, it may be simultaneously specified that an abstract shall be selected only if it contains one or more "sentences" each of which is specified in terms of a logically defined combination whose elements may be "phrases" or "words" or "both." The previously discussed examples have also shown that a further condition for selection of an abstract may be the detection of at least one "paragraph" that is specified in terms of a logically defined combination of lower order combinations, in particular "words," "phrases" and "sentences." (3) When the scanning of an abstract results in the activation of a set of relays corresponding to satisfaction of all the logically defined search requirements as programmed by means of plugboard wiring, a test current appears in an output wire which corresponds to the highest order logical combination as specified to define the search. In FIGURE 24, four outputs, labelled $A_5$, $B_5$, $C_5$, $D_5$ each correspond to a specified search requirement whose highest order requirement is a logically defined "paragraph" combination. In order that the appearance of a test current in such an output circuit will result in automatic listing of the abstract that satisfies a specified set of search requirements, a special set of circuits is provided as is shown in FIGURES 25A, 25B and 25C. The circuits shown in these figures are actuated by the following symbol sequence which is recorded in the searching medium, e.g. by punching paper tape, immediately following each encoded abstract.

This symbol sequence acting in conjunction with the circuits of FIGURES 25A–25C controls the operation of the automatic typewriter so as to generate listings of those abstracts for a single search or for any number of simultaneously conducted searches up to ten. The programs of such searches as wired in the plugboards may or may not have in common various meaningful elements, that is to say "syllables," "words," "phrases," "sentences" and "paragraphs."

Previous description of example searches has shown how electrical impulses generated by reading recorded symbols act on various relays to detect logically defined combinations as formulated to designate various search requirements. The satisfaction of a search requirement is signalled by appearance of a test current in an output as exemplified by $A_5$, $B_5$, $C_5$ and $D_5$ in FIGURES 17, 19, 21, 22, 24. Such search outputs are individually plugged into the contacts numbered 301 through 310 in FIGURE 25A. A search output plugged into contact 301 makes that search become, by virtue of such plugging, Search 1. A search output plugged into contact 302 makes that search become Search 2 and a corresponding relationship holds between plugging into contacts 303, 304, 305, 306, 307, 308, 309 and 310 and Search 3, Search 4, Search 5, Search 6, Search 7, Search 8, Search 9 and Search 10.

As soon as test current flows in any one or more of the search outputs plugged into contacts 301—310, one or more of the relays numbered I—X in FIGURE 25A are activated. Thus a test current into contact 301 activates relay I while relays II—X are activated, respectively, by test currents applied to the input contacts 302—310. Once activated the holding circuits provided for relays I—X will result in their remaining in the activated condition until the tape scanning unit reads the final symbol, ⊟, in the sequence given in Table I. Consequently, reading the first four symbols (namely . , — &) in the Table I sequence is without effect on relays I—X in FIGURE 25A.

Certain of the more important circuit components in FIGS. 25A–25C and the functions which they perform are as follows:

Terminals 1—7 and [8] at the upper left of FIG. 25A are connected to the output lines $L_1$—$L_8$ from the tape scanning unit through the correspondingly labelled terminals at the right of FIG. 15.

Terminals 624, 617, 380, 615 and 610 at the lower left of FIG. 25A are power supply terminals and they are connected electrically by cable, respectively to terminals 624★, 617★, 380★, 615★ and 610★ in FIGURE 15.

Terminals 1'—9' and 0' at the left of FIG. 25A are connected to the output terminals 1—9 and 0, respectively, of the symbol detector shown in FIGS. 6A and 6B. These connections are made by two cables, one cable connecting terminals 1'—9' and 0' at the left of FIG. 25A to the correspondingly numbered terminals at the right

TABLE I

*Symbol Sequence at End of Each Encoded Abstract*

| | | | | | | | Abstract | | | | |
|---|---|---|---|---|---|---|---|---|---|---|---|
| . | , | — | .& | xqz. | (PR) | (PR) | /Serial Number | (SP) | (SP) | (NP) | (NP)′ , |
| 1 | (PR) | (PR) | 1 | (SP) | (SP) | (NP) | (NP) , | 2 | (PR) | (PR) | 2 (SP) (SP) (NP) (NP) , |
| 3 | (PR) | (PR) | 3 | (SP) | (SP) | (NP) | (NP) , | 4 | (PR) | (PR) | 4 (SP) (SP) (NP) (NP) , |
| 5 | (PR) | (PR) | 5 | (SP) | (SP) | (NP) | (NP) , | 6 | (PR) | (PR) | 6 (SP) (SP) (NP) (NP) , |
| 7 | (PR) | (PR) | 7 | (SP) | (SP) | (NP) | (NP) , | 8 | (PR) | (PR) | 8 (SP) (SP) (NP) (NP) , |
| 9 | (PR) | (PR) | 9 | (SP) | (SP) | (NP) | (NP) , | 0 | (PR) | (PR) | 10 (SP) (SP) (NP) (NP) , |
| (CR) | (PR) | (PR) | (CR) | (NP) | (NP) , | — | (PR) | (PR) | (SP) | (SP) | Bibliographic citation |
| (CR) | (NP) | (NP) | . | , | — | & | ⊟ | | | | | of FIGURE 15 and a second cable connecting correspondingly numbered terminals at the left of FIGURE 15 to the output terminals numbered 1—9 and zero at the right of FIGURE 6B.

Relays 301'—310' in FIG. 25A are connected to terminals 1'—9' and 0' respectively, to be energized when these terminals carry current.

Relay 317 in FIG. 25B, when energized, connects the automatic typewriter to the tape scanning unit so as to type out the Serial Number of an encoded abstract which satisfies a logically formulated search requirement as exemplified by $A_5$, $B_5$, $C_5$, $D_5$ in FIGURES 17, 19, 21, 22, 24. Relays 318 and 319 are closely associated with relay 317.

Relay 324 in FIG. 25B, when energized, connects the automatic typewriter to the tape scanning unit so as (1) to type out the number or numbers of the searches whose requirements are satisfied by the encoded abstract, (2) to return the typewriter carriage, and (3) to type out the bibliographic reference corresponding to the encoded abstract and (4) at the end of a roll of tape to shut down the tape reading unit. Relays 325 and 326 are closely associated with relay 324.

Relays 313, 314 and 315 in FIG. 25B control the energization of relays 317 and 324, such that only one or the other of the latter can be energized at a time.

Relays R1' and R1", R2' and R2", R3' and R3", R4' and R4", R5', R6' and R7' in FIG. 25 are connected respectively to the input terminals 1—7 in FIG. 25A, so as to be energized in response to the reading by the tape scanning unit of holes punched in the correspondingly numbered channels of the record tape.

As is evident from Table I, the symbol sequence given there contains a multiplicity of pairs of (PR)—"print restore"—signals. These symbol pairs are of essential importance in the functioning of the circuits of FIGURES 25A–25C. Each (PR) symbol is recorded in the paper tape by punches in the 3, 4 and 6 channels. A 40 millisecond pulse appears in each of these three channels when the tape scanning unit reads the first of a pair of (PR) symbols punched in the tape and relays R6', R4' and R3' are activated thus permitting a test current to flow to wiring lead 335 from input terminal 380 (FIG. 25A) through line 381, the $ii$ contacts of deenergized relay R7', the now closed $iii$ contacts of energized relay R6', the $iii$ contacts of de-energized relay R5', the now closed $iii$ contacts of energized relay R4', line 382, the now-closed $iii$ contacts of energized relay R3', the $iii$ contacts of de-energized relays R2' and R1', and line 383 to line 335. The contacts of relays 317 and 324 (FIG. 25B) are so wired that a continuous electrical circuit is maintained between terminals 360 and 361 of FIGURE 25A as long as neither relay 317 or 324 is activated. This circuit is from terminal 360 through line 384, the $iv$ contacts of relay 317, the $iv$ contacts of relay 324 and line 385 to terminal 361. Terminals 360 and 361 of FIGURE 25A are connected by cable to contacts 360* and 361* of FIGURE 15 and these in turn are connected by the wiring shown in FIGURE 15 to contacts 360' and 361'. Thus a continuous circuit is provided between contact 360' and contact 361' of FIGURE 15 as long as neither relay 317 nor 324 is activated. Through this continuous circuit a current flows which maintains in an energized condition certain control relays within the automatic typewriter. These control relays when energized cause the pulses generated by the tape reading unit to flow into the leads, $L_1$—$L_8$, associated with the input contacts 360' and 361' of FIGURE 15. When, however, these control relays are deenergized the pulses generated by the tape scanning unit flow into the internal circuits of the automatic typewriter. Thus as long as both relays 317 and 324 remain in the deactivated state the pulses generated by scanning the tape cannot actuate the typewriter and it remains inactive.

If, however, as described subsequently, the first of a given pair of (PR) symbols actuates either relay 317 or 324, then the circuit between contacts 360' and 361' in FIGURE 15 is interrupted. As a consequence the pulses generated by the tape scanning unit are switched into the internal circuits of the automatic typewriter as a consequence of deenergizing certain control relays as described above. When this happens on reading the first of a pair of (PR) symbols, the pulses corresponding to the second (PR) symbol act on the internal circuits of the automatic typewriter and the typewriter is turned on and it then proceeds to type or to respond to carriage conrol symbols until a (NP) symbol is read by the tape scanning unit. The pulses generated by the (NP) symbol act on the internal circuits of the automatic typewriter to turn off the typewriter and to energize the above menioned control relays so that pulses generated by reading subsequent symbols by the tape scanning unit are switched to the input leads $L_1$—$L_8$ of FIGURE 15. Such switching of pulses is maintained until a pair of (PR) symbols, by first actuating either relay 317 or 324 and then switching on the typewriter causes it to type or otherwise to respond to the symbols punched in the tape.

Relays 317 and 324 thus play a key role in the automatic control of the automatic typewriter to provide the desired listings of pertinent documents when encoded abstracts are scanned by the tape reading unit. In the circuits of FIGURE 25, relay 317 is closely linked with relays 318 and 319 and relay 324 is closely linked with relays 325 and 326. To describe in detail the action of these relays to accomplish operation of the automatic typewriter, it will be assumed that an encoded abstract has been scanned and, as a result of detection that the abstract satisfies Search 1, that relay I in FIGURE 25A has been activated.

OPERATION—1ST (PR) SYMBOL

Turning now to the operation of the circuit of FIGS. 25A–25C, with particular reference to the symbol sequence of Table I, relay 317 is energized in response to the first (PR) symbol in this sequence. As described, this first (PR) symbol causes relays R6', R4' and R3' in FIG. 25C to become energized, and the energization of these three relays completes a circuit from terminal 380 (FIG. 25A) to line 335 (FIG. 25C). This current in line 335 flows to one side of the coil of relay 317 through the $iii$ contacts of de-energized relay 313, lines 365 and 366 to the now-closed $ii$ contacts of the previously energized relay I, line 367, the $i$ contacts of de-energized relay 314 and line 368. The opposite side of the coil of relay 317 is connected through line 369 to the + terminal at the left of FIG. 25A.

The initial energization of relay 317 completes a holding circuit for it through its $i$ contacts by way of line 370, the contacts of energized relay 318, and lines 371 and 381 to terminal 380. Relay 318 normally is energized from the power line as follows: from the + terminal at the left of FIG. 25A through line 369, the $ii$ contacts of de-energized relay 319, line 372 to one side of the coil of relay 318, and from the other side of this coil through line 373, the $i$ contacts of de-energized relay 319, and lines 371 and 381 to terminal 380. However, when relay 319 is energized its $i$ and $ii$ contacts break this energization circuit for relay 318.

The *iii* contacts of relay 317, when the latter is energized, break the circuit between the terminals labelled 8 and 8th at the left of FIG. 25A. This circuit extended from terminal 8 through lines 375 and 376, the *iii* contacts of relay 317, line 377, the *iii* contacts of de-energized relay 324, and line 378 to the "8th" terminal. The terminal 8 is connected to the line L₈ leading from the eighth channel in the tape scanning unit. The "8th" terminal is connected to one side of the coil of the interrupter relay K₁, already referred to in the description of FIG. 5. Thus, the interrupter relay K₁ is disconnected from the tape scanning unit's output line L₈ from channel 8 in response to the energization of relay 317.

The *ii* contacts of relay 317, when the latter is energized, connect the "8th" terminal (and interrupter relay K₁) directly to the power supply as follows: from power supply terminal 380 through lines 381 and 371, the contacts of energized relay 318, line 370, the *ii* contacts of relay 317, line 377, the *iii* contacts of de-energized relay 324 and line 378 to the "8th" terminal. The coil of relay 334 is energized through the same circuit, one end of this coil being connected to line 378 and the other end being connected through lines 379 and 369 to the + terminal at the left of FIG. 25A. Line 378 is connected by cable through terminals marked 8th in FIGURE 15 to the coil of relay K₁ in FIGURE 6A. These connections to relay K₁ are shown in schematic form at the left of FIGURE 25A. As a consequence of these connections relay K₁ in FIGURE 6 and relay 334 in FIGURE 25C are activated simultaneously and by the same current.

Such energization of relay 334 breaks the holding circuit for each of relays R1', R1'', R2', R2'', R3', R3'', R4', R4'', R5', R6' and R7'. Otherwise, each of these relays R1'–R7' has such a holding circuit through its *i* contacts from line 390, the contacts of de-energized relay 334, and line 381 from the power supply terminal 380.

The *iv* contacts of energized relay 317 break the circuit between terminals 360 and 361 at the left of FIG. 25A. This circuit was from terminal 360 through line 384, the *iv* contacts of de-energized relay 317, line 392, the *iv* contacts of de-energiezd relay 324 and line 385 to terminal 361. As already explained, such disconnection of the terminals 360 and 361 results in pulses from the tape scanning unit being routed to the internal circuits of the automatic typewriter rather than to the output lines L₁—L₇.

SECOND (PR) SYMBOL

Then, the second (PR) symbol of the first pair in the Table I sequence conditions the internal circuits of the automatic typewriter so that it types out the immediately following symbols, which constitute the serial number of the immediately preceding abstract.

In order for the energization of relay 317 to be effective in switching on the automatic typewriter as above described, it is necessary to maintain this relay energized until the second in the pair of (PR) symbols has been read by the tape scanning unit. After this has happened, it is essential that relay 317 be deactivated in order that reading of a (NP) signal by the tape scanning unit shall result in switching to the symbol detector of FIGS. 6A and 6B the pulse patterns generated by reading subsequent signals. This means that relay 317 must be kept activated for about 0.2 to 0.3 second after being energized by the first (PR) signals in the first pair of them. This is accomplished by relays 318 and 319 together with capacitors 337 and 339 in the following way. Relays 317 and 319 are connected in parallel, so that power supplied to the coil of relay 317 simultaneously energizes relay 319. When relay 319 is energized, the source of energy for keeping relay 318 energized is no longer the 380 and + terminal at the left of FIG. 25A but the 30 mfd. capacitor 339. Discharging the charge on this capacitor through the coil of relay 318 continues to keep it activated for 0.2 to 0.3 second and during this time the coil of relay 317 continues to receive energy from the 200 mfd. capacitor 337. At the end of 0.2 to 0.3 second, relay 318 is no longer activated and this causes the holding circuit through line 370 to relay 317 to be broken and this in turn causes relay 317 to become inactivated. Relay 317 then remains inactivated until such time, after reading a subsequent encoded abstract, that it may become possible for a test current in line 335 to find a circuit through relays I—X when one or more has or have been activated as the result of detecting that the abstract satisfies one or more searches.

FIRST (SP) SYMBOLS

Following the typing out of the serial number of the abstract, the first pair of (SP) symbols in the sequence of Table I causes the typewriter to space twice.

FIRST (NP) SYMBOL

The first of the following (NP) symbols causes the internal circuits in the automatic typewriter to turn it off and to connect the output lines from the tape scanning unit to the symbol detector input (FIGS. 6A and 6B). This involves lines L₁—L₈, the wiring of FIG. 15 and a cable connecting the circuits of FIG. 15 and FIGS. 6A–6B through correspondingly labelled terminals in these figures.

SECOND (NP) SYMBOL

The second of these (NP) symbols, which is constituted by holes punched in channels 3, 4 and 5 on the record tape, causes current to be applied to the input terminals 3, 4 and 5 at the left of FIG. 25A. These terminals are connected through lines 603, 604 and 605, respectively, to one side of each of the coils of R3', R3'', R4', R4'' and R5'. The opposite sides of these relay coils are connected through lines 600, 379, 395 and 369 to the + terminal at the left of FIG. 25A. Relays R3', R3'', R4', R4'' and R5' become energized through these circuits.

As a consequence, relays 313 and 314 are energized as follows: from terminal 610 at the left of FIG. 25A through line 611, the *iii* contacts of de-energized relay R7', the *iv* contacts of de-energized relay R6', the *iv* contacts of energized relay R5', the *i* contacts of energized relay R4'', the *i* contacts of energized relay R3'', the *i* contacts of de-energized relay R2'', the *i* contacts of de-energized relay R1'', line 612, the contacts of de-energized relay 315 and line 613 to one side of the respective coils of relays 313 and 314 and from the opposite side of these relay coils through lines 622 and 623 to the terminal 624 at the left of FIG. 25A. Such initial energization of relays 313 and 314 has the following results:

(*a*) The *i* contacts of relay 313 set up a holding circuit for relays 313 and 314 which maintains these relays energized (independent of relay 315) until the ⊟ symbol is read at the end of the symbol sequence of Table I. This holding circuit extends from terminal 615 at the left of FIG. 25A through line 616 and the *i* contacts of relay 313 to one side of the coil of each relay 313 and 314, the opposite side each of these relay coils extending through lines 622 and 623 to terminal 624 at the left of FIG. 25A.

(*b*) The *ii* contacts of relay 314 set up a circuit through which relay 311 can be energized in response to the reading by the tape scanning unit of a dash symbol in the symbol sequence of Table I. This circuit extends from the "dash" terminal at the left of FIG. 25A through line 620, the *ii* contacts of relay 314, and line 621 to one side of the coil of relay 311, and from the opposite side of this relay coil through lines 622 and 623 to terminal 624 at the left of FIG. 25A.

(c) The *iii* contacts of relay 314 set up a holding circuit for relays 311 and 312, so that relay 311, following its energization in response to the dash symbol (which occurs toward the end of the symbol sequence of Table I), will remain energized until the holding circuit is broken. This same holding circuit is wired to relay 312 so that, following its energization in response to the first (CR) symbol in the symbol sequence of Table I, it will remain energized until the holding circuit is broken. This same holding circuit is wired to relays 301'—310' so that they will remain energized until the holding circuit is broken. This holding circuit extends from the *iii* contacts of relay 314 through line 618 to terminal 617 at the left of FIG. 25A. Terminal 617 is connected by cable to terminal 617* of FIGURE 15 and as a consequence this holding circuit to relays 301'—310' and also 311 and 312 is interrupted when relay 121 in FIGURE 15 is activated when the circuits of FIGS. 6A–6B detect a comma punched in the tape. The *i* contacts of both relays 311 and 312 are connected through line 619 to the *iii* contacts of relay 314 to provide holding circuits for relays 311 and 312.

(d) The *i* contacts of relay 314 break the previously described energization circuit for relay 317 by disconnecting lines 367 and 368.

(e) The *ii* contacts of relay 313 complete an energization circuit for relay 315 as follows: from terminal 615 at the left of FIG. 25A through line 616, the *ii* contacts of energized relay 313, line 661, through the coil of relay 315, and lines 622 and 623 to terminal 624 in FIG. 25A. Such energization of relay 315 breaks the initial energization circuit for relays 313 and 314, the latter remaining energized through the holding circuit described in subparagraph (a) above.

(f) The *iii* contacts of relay 313 complete a circuit through which relay 324 may be energized. Such energization of relay 324 occurs when one of the relays 301'—310' is energized in response to the reading by the tape scanning unit of one of the numbers 1–10 in the Table I sequence which corresponds to one of the Roman numeral I–X previously energized by the corresponding search-requirement output signal. For example, when search 1 has been satisfied by the abstract just "read," relay I will have been energized prior to the reading of the Table I sequence at the end of that abstract. Then when the first symbol "1" in the Table I sequence is read by the tape scanning unit, relay 324 will become energized, as described in detail later.

FIRST COMMA SYMBOL

As noted above, reading each comma symbol in the sequence of Table I interrupts the holding current which is otherwise available to relays 301'—310', and also 311, 312, provided relay 314 has been energized.

FIRST "1" SYMBOL

Assuming that the requirements of search 1 were satisfied by this abstract, relay I will have been energized through the circuit which extends from terminal 301 at the upper left of FIG. 25A through the coil of relay I and lines 630, 634 and 623 to terminal 624 at the lower left of FIG. 25A.

When the first "1" symbol in the Table I sequence is read, relay 301' is energized as follows: from terminal 1' at the left of FIG. 25A (which is connected to the "1" output terminal of the symbol detector of FIGS. 6A and 6B), through line 632, through the coil of relay 301', and lines 633, 634 and 623 to terminal 624.

This connects line 346 (input line to relay 324) to line 335, as follows: from line 346 through the *ii* contacts of energized relay 301', the *iii* contacts of energized relay I, lines 635 and 397, and the *iii* contacts of energized relay 313 to line 335.

THIRD (PR) SYMBOL

The first PR symbol immediately following the first symbol "1" in the Table I sequence is read by the tape scanning unit, and the relays R3', R4', and R6' in FIG. 25C are energized, as previously described, to connect line 335 to terminal 380. Thus, line 346 and relay 324 are connected (through line 335) to terminal 380. Accordingly, relay 324 is energized as follows: from the + terminal at the left of FIG. 25A through line 369 to one side of the coil of relay 324, and from the other side of this coil to terminal 380, as described.

A holding circuit is provided for relay 324 through its *i* contacts.

Relays 325 and 326 are associated with relay 324 and operate respectively in the same fashion as relays 318 and 319 are associated with relay 317. The same holds true for resistor 340, capacitor 341, resistor 342 and capacitor 343, which correspond in function respectively to the circuit elements 336—339 associated with relay 317.

Upon being so energized, relay 324 operates to direct the following output signals from the tape scanning unit to the automatic typewriter, in the same manner as the operation of relay 317, as already described. Therefore, a detailed description of such operation by relay 324 and its circuit connections will not be necessary.

FOURTH (PR) SYMBOL

The fourth (PR) symbol in the Table I sequences causes the automatic typewriter to be conditioned to type out the following symbol.

SECOND "1" SYMBOL

The second "1" symbol in the Table I sequence is read by the tape scanning unit, which causes the automatic typewriter to type out the symbol "1." This indicates that the abstract whose serial number had previously been typed out in response to the energization of relay 317, as described, satisfies the requirements of search 1. Thereafter the subsequent (CR) and (NP) symbols function as described before.

SUCCESSIVE SEARCH NUMBERS NEXT FOLLLOWING

It will be apparent that the symbol sequence of Table I follows a repetitive cycle, so that the searches numbered 2–10 may be regarded as automatically subjected to inquiry as the tape scanning unit reads through this symbol sequence. Therefore, if any of these searches is satisfied by the immediately preceding abstract, the corresponding search number 2–10 will be typed out in the same manner as just described in detail for search 1. In the case of search 10, there is a slight difference from the other search numbers in that reading the zero in symbol sequence 0 (PR) (PR) 10 in Table I will activate relay 310' and then will cause 10 to be printed provided relay X has been previously activated by scanning of the preceding encoded abstract.

SYMBOLS PRECEDING BIBLIOGRAPHIC CITATION

After the search numbers and accompanying symbols, as listed in Table I, have been read by the tape scanning unit, the first (CR) symbol is read by the tape scanning unit as a combination of holes in channels 2, 3 and 4. Corresponding activation of relays R2", R3" and R4" result in current flowing from contact 610 through line 611, various relay contacts of R7′, R6′, R5′, R4″, R3″, R2″ R1″, and line 698 to activate 312. If any one or more of the relays I—X have been activated, then a circuit is provided through that relay (or relays) and through relays 312, 313, 314 for a pulse in line 335 to line 346, which is the input to relay 324. Its activation, followed by the action of the second of the immediately following (PR) symbols on the automatic typewriter, causes reading of the second (CR) symbol to accomplish the carriage return function on the part of the typewriter. This occurs only after the typewriter has been caused to type both the abstract serial number and also the number (or numbers) that indicate which search (or searches) has (have) had its (their) requirements fulfilled. Similarly the reading of the dash symbol in the sequence shown in Table I will cause the bibliographic reference to be automatically typed, provided one (or more) of the searches has (have) had its (their) requirements fulfilled.

CONCLUDING SYMBOLS

To conclude this discussion of the read-out operation, it should be pointed out that the final symbols in the sequence of Table I, (namely, the period, comma, dash, ampersand and ⊟) interrupt the holding circuits (i) to relays I—X, 301′–310′ and 311–315 in FIGURES 25A–25C and (ii) to all relays in panels (as exemplified by FIGURES 16–24) that are devoted to registering symbols and combinations.

The read-out panel, whose circuit diagram is given in FIGURES 25A–25C, includes a number of relays, whose functions have not been pointed out and to which attention will now be directed.

The discriminating unit operates with two power sources, one of which is built into the automatic typewriter. Most of these relays operated by this power source are shown in FIGURES 6A and 6B and they respond to pulses generated by the tape scanning unit. This power source also activates various relays in the read-out panel, in particular the relays numbered 316—320 and 322—334. All the other relays shown in FIGURES 25A–25C are actuated by power from an auxiliary source. For certain purposes, especially for unambiguous detection of double letters in various codes (see FIGURE 16, for example, and related discussion), it is important that an eighth channel pulse, as provided by the tape scanning unit, shall be transformed into a pulse not in typewriter current but in the auxiliary power source current. Such conversion of the eighth channel pulse into auxiliary power source current involves the interaction of a number of relays. An eighth channel pulse in typewriter current causes relay 320 in FIGURE 25B to respond, if both relays 316 and 323 are not activated. The energization circuit for relay 320 extends from the + terminal at the left of FIG. 25A through line 369, through the coil of relay 320, line 640, the *i* contacts of de-energized relay 323, the *i* contacts of de-energized relay 316, the contacts of de-energized relay 321 and line 375 to the terminal [S] at the left of FIG. 25A. (One or another of the relays 316, 323 is activated only when either relay 317 or 324 is activated by a (PR) pulse during the initial stage of a read-out cycle as above described.) Once activated relay 320 provides holding current to its own coil through its *i* contacts. This holding current is interrupted whenever relay 322 is activated in response to a pulse in any of the code channels 1–7 detected by relays R1′–R7′. The coil of relay 322 is connected by a common line 650 and individual lines 651–657 to contacts of each of the relays R1′–R7′, so that energization of any one of relays R1′–R7′ will complete an energization circuit for relay 322. The reading of any symbol will thus cause relay 322 to be activated. (Note also that the holding current to relay 320 is also interrupted when either relay 316 or relay 323 is activated.) The *ii* contacts of relay 320 provide output current as long as this relay is activated, i.e. from the time of an input pulse in the eight channel until the reading of the next symbol in the tape activates relay 322. This output current from the *ii* contacts of relay 320 is carried by line 375b through the normally closed contacts *iv* of relay R7′ and contacts *v* of relays R6′ and R5′ to line 375a and thence to terminals ⑧ and 533 at the right of FIGURE 25a. Thus this output of relay 320 constitutes a pulse of approximately 60–80 milliseconds duration and this pulse is interrupted by activation of any one of several of the relays R7′, R6 and R5′. Note also that this output of relay 320 also activates relay 321 in order to prevent holding current from the coil of relay 320 feeding back into the input line (numbered 375 in the diagram) for the eighth channel pulse generated by the tape scanning unit.

Two cables connect the circuits of FIG. 15 and the circuits of FIGS. 25A, 25B, 25C. One cable connects terminals 699, 624, 617, 380, 615 and 610 in FIG. 25A with terminals 699★, 624★, 617★, 380★, 615★ and 610★ of FIG. 15. Another set of 27 terminals (including those numbered 5, 6, 7, 2, 3, 4, 8th, [S] 1 etc.) in FIG. 25A is connected by cable to correspondingly numbered terminals in FIG. 15. Terminals 7, 6, 5, 4, 3, 2, 1, 8th and ⑧ in FIG. 15 are connected by cable to correspondingly labelled terminals in FIG. 6A. Leads from the symbol outputs in FIG. 6B are connected to two sets of terminals which are not shown in FIG. 6B. These two sets of terminals are connected to two sets of terminals which are located at the right of FIG. 15 and which carry corresponding labels. In both FIGS. 6B and 15, the use of capital letters in labelling terminals will be understood to also designate the corresponding lower case letters, which are used in constructing all codes with exception of symbols for chemical elements and their compounds.

These cable connections are required to distribute power from the sources shown in FIG. 15 to the circuits of FIGS. 6A–6B and FIGS. 25A, 25B, 25C. The cable connections also transmit various pulses corresponding to detection of holes by the tape scanning unit and to the detection of certain symbols by the circuits of FIGS. 6A–6B. A further function of these cable connections is to ensure that activation of relay 320 will provide current from terminal 109 of FIG. 15 through its terminal 610★ by cable to terminal 610 of FIG. 25A, by line 611 to the *ii* contacts of 320, and when the latter is activated by line 375 through certain normally closed contacts of relays R7′, R6′, R5′ and line 375a to terminal ⑧ of FIG. 25A, by cable to terminal ⑧ in the 27 terminal set at the right of FIG. 15. Terminal ⑧ in this set is connected to terminal ⑧ in the set of 12 terminals at the right of FIG. 15 and this latter terminal is connected by cable to terminal ⑧ in FIG. 6A which terminal in turn is connected by line 100 to the 8ch. output at the right of FIG. 6B. This output is attached by jumper wires to the inputs labelled "8–CH pulse" in FIGS. 16, 18, 20 and 23. The function of this "8–CH pulse" in detecting symbol groups containing double letter has already been discussed.

Other functions performed by the cables interconnecting the circuits of FIGS. 6A–6B, 15 and 25A, 25B, 25C have either been discussed previously or are obvious from the wiring diagrams.

Independently of the above described conversion of the eighth channel pulse, it is also important that, at the end of the read-out cycle as described above, current shall be supplied to the relay $K_i$ in FIG. 6A and to relay 334 in FIG. 25C that interrupt the holding current to the relays that detect pulses in code channels 1–7. Such activation of this interrupter relay is necessary to ensure that none of the pulse detecting relays are in the activated condition at the moment that reading a (PR) symbol activates the typewriter to print out the abstract serial number, the search number, etc. The required activation of the interrupter relay for the holding current in FIGURES 6A–6B is accomplished by relay tongues *ii* and *iii* of relays 317 and 323. When either of these relays is operated, current from the typewriter power source (and either capacitor 336 or 340) is switched to activate the holding current interrupter relay $K_1$ in FIGURE 6A and relay 334 in FIG. 25C.

Relays 348–354 in FIGURE 32 serve the special purpose of stopping the machine at the end of a reel of tape. These relays respond to the following special sequence of symbols.

TABLE II
*Symbol Sequence at End of Reel of Tape to Shut Down the Machine*

. stp — . (PR) (PR) (ST)

In this sequence, reading the symbol, *s*, by the tape scanning unit causes relay 348 to operate and thereby (*i*) establish a holding circuit to its own coil (*ii*) operate relay 349 to disconnect its coil from the input lead 355 and (*iii*) provide a circuit so that reading the symbol, *t*, will activate relay 350 which functions similarly, with relay 351 disconnecting the coil of relay 350 from input lead 356 and a circuit being also established so that reading of the symbol, *p*, will activate relay 352. Its activation—in addition to establishing a holding circuit and activating relay 353 to break the circuit to lead 357—causes relay 354 to be activated. A holding circuit is thereby established and also a circuit closed between lead 335 and relay 324. This latter circuit, once established, will cause the reading of the first (PR) in the symbol sequence now being considered to activate relay 324. The second (PR) switches the pulses generated by the tape scanning unit to the control circuits built into the typewriter. The ST code then stops the scanning unit and effectively shuts down the machine. It should be noted that the holding circuit for relay 354 is interrupted when the tape scanning unit reads a comma, as at the end of each "phrase" or at the end of an encoded abstract. The holding circuits for relays 348, 350, 352 (and also for relays 349, 351 and 353) are interrupted when the machine reads a period at the end of each syllable. Provision of such control of the holding circuits for relays 348–354 ensures that they will operate as desired to stop the machine at the end of a reel of tape without causing interference with the normal functioning of the read-out panel when the machine is searching encoded abstracts.

ORGANIZATION OF SYMBOL SEQUENCES ON REELS OF PUNCHED TAPE OR OTHER RECORDING MEDIUM

Previous discussion has presented various symbol sequences corresponding to an example encoded abstract. Other symbol sequences had the purpose of controlling various machine functions. To supplement and to summarize this discussion it is now pointed out that on each reel of the recording medium, as exemplified by punched paper tape records, the following symbol sequences occur.

(1) At the start of the tape, the symbol sequence as shown in Table III is recorded.

TABLE III
*Symbol Sequence at Start of First Encoded Abstract on a Reel of Tape*

(NP) ⊟ . , — & ¶ ⊟

(Here the initial NP symbol energizes control relays built into the typewriter so that the pulses that are generated on reading subsequent symbols are switched to the input leads of FIGURE 15. The rest of the symbols in Table III operate various relays that interrupt holding circuits and thus clear the panels used to detect code "semantemes" (or "syllables"), "words", "phrases", "sentences", "paragraphs" as well as ensure de-activation of various relays included in the circuits of FIGURES 25A, B, C.)

(2) Next an encoded abstract, such as shown in a previously presented example is recorded.

(3) The symbol sequence of Table I is recorded next.

(4) Thereafter, encoded abstracts are recorded with each of them followed by the symbol sequence of Table I.

(5) At the end of the reel the symbol sequence of Table II is recorded to cause the machine to stop automatically at the end of the reel as already described.

Encoded abstracts are recorded, as a rule, in lower case symbols. Exceptional symbols in upper case, e.g. the first letter in Si to indicate the chemical element, are preceded and followed by the (UC) (upper case) and (LC) (lower case) code. Thus, for example, the first letter in Si is recorded as (UC) s (LC).

DETECTION OF INCOMPLETE LOGICAL PRODUCTS

Previous discussion, both of abstractly formulated capabilities and of examples of programming practical information requirements, has shown that logical products are often of importance both in defining the scope of a search and in programming the selecting equipment of this invention. As searches have been formulated and programmed in previous discussion, the equipment would identify as pertinent only those items, e.g. encoded abstracts, that are recorded on the search medium, e.g. punched paper tape, as having all of the characteristics that might be specified as component elements in one or more logical product involved in programming the equipment. On occasion, however, an item, e.g. an encoded abstract, may be of interest even if its characteristics do not include all those characteristics that specify one or more logical products in the search requirement as analyzed, formulated and programmed by the wiring of plug boards. It is, consequently, frequently desirable to detect those items, e.g., encoded abstracts, that are recorded in the search medium as possessing several, though not all, of the characteristics of a set specified by a logical product. Furthermore, it is advantageous to be able to discriminate between items, e.g. encoded abstracts, that differ as to the degree to which their recorded characteristics satisfy one or more sets of characteristics as specified by one or more logical products that define the search requirement.

To provide the capabilities and advantages of basic selection of items on more or less incomplete satisfaction of logical products, circuits as shown in FIGURES 26A, B and C are provided as part of the equipment of the present invention. The circuit as shown in FIGURES 26A, B and C is designed to work with logical products of ten members as might be exemplified by:

$$A_2 \cdot B_2 \cdot C_2 \cdot D_2 \cdot E_2 \cdot F_2 \cdot G_2 \cdot H_2 \cdot I_2 \cdot J_2$$

Output test current from one or more other panels as illustrated in FIGURES 16–24 are plugged into contacts 401, 402, 403, 404, 405, 406, 407, 408, 409, 410. If the logical product involves less than ten members, then the higher number input contacts in the series 401–410 would remain unplugged and the wiring would also be altered in a fashion to be discussed subsequently. For a ten number logical product, however, each of the plugs 401–410 would be wired to receive the output test current corresponding to detection of individual characteristics among the set of ten that composes the logical product. It will be observed that each of the ten input contacts is wired to two or more relays as follows. Thus input contact 401 is wired to relays $401_1$ and $401_2$ in such a way that a current flowing into contact 401 will cause relay $401_2$ to become activated. A source of holding current, controlled and interrupted by relay 420, will cause relay $401_2$ to lock up and it will also cause relay $401_1$ to be activated and thus interrupt contact between contact 401 and the coil of relay $401_2$ and as a consequence the holding current which locks up relay $401_2$ has no circuit to contact 401. When relay $401_2$ is in the de-energized condition, there is an electrical circuit, through the relay contacts, between contact 401a and 401b. This circuit is broken and a circuit is established between contacts 401a and contacts 401c and 401d. (Note that contacts 401c and 401d are electrically connected at all times by permanent wiring.) This shift of electrical circuits between contact 401a, on the one hand, and contacts 401b, 401c and 401d on the other hand as a result of energizing relay $401_2$ is a typical example of the shift of circuits between similar sets of four contacts when any one (or more) of the contacts 401–410 receives electrical current. The number of sets of four contacts affected by an input current increases from one set for contact 401 to two sets for contact 402, three for contact 403, and 4, 5, 6, 7, 8, 9, 10 respectively for contacts 404, 405, 406, 407, 408, 409, 410. Thus, to consider another example, current entering through contact 404 energizes both relays $404_2$ and $404_3$ and as a result the previously existing circuit between 404a and 404b is broken and a circuit established, through the contacts of relay $404_2$, between contact 404a, on the one hand, and contacts 404c and 404d, on the other hand. Other simultaneously occurring circuit changes may be summarized as follows:

| Circuit broken between— | Circuit established between— |
|---|---|
| 404e and 404f | 404e and 404g—404h |
| 404i and 404j | 404i and 404k—404l |
| 404m and 404n | 404m and 404o—404p |

Note also that, when relay $404_3$ is energized the holding current, controlled and interrupted by relay 420, is provided, through a set of contacts of relay $404_3$, a circuit to maintain energized both relays $404_3$ and $404_2$ and, through another set of contacts, a circuit to energize relay $404_1$. Once energized the relays $404_1$, $404_2$, and $404_3$ will remain energized until the holding current is interrupted by energizing relay 420.

There are four sets of contacts that undergo a shift in electrical circuits as described above when current to contact 404 energizes relays $404_2$ and $404_3$. These sets of contacts are as follows:

First set_____ 404a, 404b, 404c, 404d
Second set_____ 404e, 404f, 404g, 404h
Third set_____ 404i, 404j, 404k, 404l
Fourth set_____ 404m, 404n, 404o, 404p It is particularly important to note that the above described circuit changes among these four sets of contacts occur simultaneously when current to contact 404 activates relays $404_2$ and $404_3$. Such simultaneous shifting of electrical circuits between a plurality of sets of contacts occurs when input current to contacts 402, 403, 404, 405, 406, 407, 408, 409, or 410 activates respectively, relays $402_1$, $402_2$ (contact 402), relays $403_1$, $403_2$, $403_3$ (contact 403), relays $404_1$, $404_2$, $404_3$ (contact 404), relays $405_1$, $405_2$, $405_3$ (contact 405) relays $406_1$, $406_2$, $406_3$ (contact 406), relays $407_1$, $407_2$, $407_3$, $407_4$ (contact 407), relays $408_1$, $408_2$, $408_3$, $408_4$ (contact 408), relays $409_1$, $409_2$, $409_3$, $409_4$ (contact 409), relays $410_1$, $410_2$, $410_3$, $410_4$ (contact 410).

It will be obvious from a consideration of FIGURES 26A, B and C that when all of these relays—and also relays $401_1$ and $401_2$—are in the inactivated condition, there is an electrical circuit between contact 401a and contact 500 at the lower left of the circuit of FIGURE 26C. If now an input current to any one of the contacts 401–410 activates its corresponding set of relays, then the electrical connection between contact 401a and contact 500 is broken and an electrical connection is established between contact 401a and contact 501. When input current is supplied to any two of the contacts 401–410, either simultaneously or sequentially without intermediate activation of relay 420, then there is an electrical connection between contact 401a and contact 502, but not between 401a and any of the following contacts: 500, 501, 503, 504, 505, 506, 507, 508, 509, 510. Similarly, current applied to varying numbers of the contacts 401–410 will result in an electrical circuit between contact 401a and some one contact from the group consisting of 500–510 as follows:

| Number of contacts energized in the group consisting of 401–410 | Electrical connection exists between contact 401a and contact as noted |
|---|---|
| None | 500 |
| 1 | 501 |
| 2 | 502 |
| 3 | 503 |
| 4 | 504 |
| 5 | 505 |
| 6 | 506 |
| 7 | 507 |
| 8 | 508 |
| 9 | 509 |
| 10 | 510 |

The circuit elements numbered 441–450 in FIGURES 25A, 26B, 26C represent small electrical lamps that are lit when corresponding relays $401_1$, $402_1$, $403_1$ etc. are energized. These lamps serve only the purpose of convenience in following the action of the circuits as shown.

From a logical point of view, supplying current to a specified number, e.g., 8 of the contacts 401–410 is the equivalent of detecting the same number, e.g., 8, among a set of 10 characteristics constituting a logical product as exemplified by:

$$A_2 \cdot B_2 \cdot C_2 \cdot D_2 \cdot E_2 \cdot F_2 \cdot G_2 \cdot H_2 \cdot I_2 \cdot J_2$$

In FIGURES 26A, B and C, part of the wiring as indicated by the lighter lines is permanent and soldered. Another part of the wiring as indicated by the heavier lines is provided by plugging a switchboard. The switchboard wiring of FIGURES 26A, B and C, insofar as it involves contacts whose circuits are controlled by current to contacts 401–410, is shown in FIGURE 27.

This switchboard arrangement has the advantage that its appropriate alteration makes it possible to deal with logical products containing a lesser number of terms than ten. Thus FIGURE 28 shows how the switchboard wiring of FIGURE 27 would be altered in dealing with a logical product consisting of seven terms as exemplified by:

$$A_2 \cdot B_2 \cdot C_2 \cdot D_2 \cdot E_2 \cdot F_2 \cdot G_2$$

Here the output leads, from one or more panels devoted to detecting the seven specified terms in the seven-term logical product, would be connected to the contacts 401–407. Current applied to varying numbers of the contacts 401–407 will then result in an electrical circuit between contact 401a and some one contact from the group consisting of 700–710 as follows:

| Number of contacts energized in the group consisting of 401–407 | Electrical connection exists between contact 401a and contact as noted |
|---|---|
| None | 700 |
| 1 | 701 |
| 2 | 702 |
| 3 | 703 |
| 4 | 704 |
| 5 | 705 |
| 6 | 706 |
| 7 | 707 |

To deal with other logical products consisting of a number of terms less than ten, plugboard wiring similar to that shown in FIGURE 28 will be required.

To deal with logical products consisting of a number of terms larger than ten, it would be necessary to extend the circuits in a fashion that it will be obvious by considering the circuits and accompanying relays as selected by the plugboard wiring for dealing with a seven term logical product as shown in FIGURE 28 and noting that from this point of view FIGURE 27 may be considered as an extension of FIGURE 28 to deal with a ten term logical product rather than with a seven term logical product.

The ability to detect incomplete logical products, as illustrated by FIGURES 26A, B and C, 27, 28 and accompanying discussion, may be applied in various ways when conducting searching and identifying operations. To understand a particularly important example of the application of this capability consider a search requirement which is directed to encoded abstracts and whose highest order combination $A_n$, which would correspond to $A_5$, $B_5$, $C_5$ and $D_5$ in FIGURES 17, 19, 21, 22, 23 and 24, is expressed in terms of a logical product of a multiplicity of terms as might be exemplified by:

$$A_n = A_j \cdot B_k \cdot C_l \cdot E_k \cdot L_m \cdot M_m \cdot N_j$$

where, as before, one or more of the component elements may be defined by another simple or complex combination of subelements and where the equality sign means the $A_n$ will be completely satisfied only by those abstracts that contain all the elements $A_j$, $B_k$, $C_l$, $E_k$, $L_m$, $M_m$ and $N_j$. This is a seven term logical product and detection of an incomplete number of its component terms would require that the plugboard for the circuits shown in FIGURE 27 must be wired as shown in FIGURE 28. Note further that the subscripts $j$, $k$, $l$, and $m$ are all of lower order than subscript $n$. Thus if $n$ is the "paragraph" level, $j$, $k$, $l$ and $m$ might represent, respectively, the "syllable," "word," "phrase" and "sentence" levels. In a less general case, $j$, $k$, $l$ and $m$ might not be different. Thus, we might have a related special case with $A_n$ being a seven term logical product as follows:

$$A_n = A_k \cdot B_k \cdot C_k \cdot E_k \cdot L_k \cdot M_k \cdot N_k$$

Such variations in the subscripts are without effect as far as the connections made to the terminals 401–407 are concerned. Each output from other circuits, as exemplified in FIGURES 16–24, that corresponds to detection of a given element in the logical product is connected to one of the terminals 401–407. It is also necessary to link the output terminals that correspond to partial detection of a logical product as discussed for FIGURES 26A, 26B, 26C, 27, 28 to the one or more of the input terminals 301–310 of FIGURE 25A. Such linking may be effected in various ways of which the following is a particularly important example.

When it is desired to detect all items, that satisfy to any degree whatever, the above mentioned seven term logical product then terminal 701 of FIGURE 28 will be electrically connected to terminal 301 of FIGURE 25A, and corresponding connections will be established between the following terminal pairs, 702 to 302, 703 to 303, 704 to 304, 705 to 305, 706 to 306 and 707 to 307. Such a scheme for interconnecting the circuits of FIGURES 28 and FIGURES 25A, 25B and 25C makes it possible to have the combined circuits control the automatic typewriter so that after the abstract serial number there will be typed an additional number which corresponds to the search number in previous discussion and which in the present instance indicates how many of the seven elements in the logical product are present in a given encoded abstract.

To achieve this result, a specially controlled test current must be applied to contact 401a in FIGURE 28 at the end of reading of each encoded abstract by the tape scanning unit. It is obvious that successive detection of various elements in the logical product under consideration will cause an electrical circuit to be established between contacts 401a and 701, 702, 703, etc. respectively, when the first, second, third, etc. such element is detected. Any encoded abstract will contain either none of the elements or some one number of the elements of the logical product under consideration. If this number of elements is zero, scanning such an encoded abstract by the tape reading device will not cause the automatic typewriter to be activated by the symbols of Table I that follow the encoded abstract. If, on the other hand, a certain number of elements of the specified logical product are detected within an encoded abstract, then it is desirable that a single numeral following the abstract serial number shall indicate how many such elements have been detected within the abstract. To this end, the test current is applied to contact 401a in FIGURE 28 at the end of the encoded abstract. This application of test current is effected by the symbols $xqz$, present at the start of the Table I sequence, acting on the circuits of FIGURE 29 to provide an output current at terminal 520 which is electrically connected by jumper wire to terminal 401a of FIGURE 28.

Referring to FIG. 29, the coil of relay $K_x$ is connected through the contacts of de-energized relay $X_1$ to the "X" output terminal of the symbol detector (FIG. 6B). Therefore, relay $K_x$ is initially energized in response to the reading of the symbol "x" in the Table I sequence. Such initial energization of relay $K_x$ accomplishes the following:

(1) It completes a holding circuit for relay $K_x$ through its $i$ contacts from the holding current source connected to terminal 521;

(2) Through its $ii$ contacts, it completes an energization circuit for relay $X_1$ from this same holding current source, and such energization of relay $X_1$ breaks the circuit through which relay $K_x$ was energized initially; and (3) Through its $iii$ contacts, it completes a circuit for the subsequent energization of relay $K_q$.

When the "q" symbol in the Table I sequence is read, relay $K_q$ is initially energized through the contacts of de-energized relay $Q_1$ and the $iii$ contacts of energized relay $K_x$. Such energization of relay $K_q$ accomplishes the following:

(1) Through its $i$ contacts it completes a holding circuit for relay $K_q$ from the same holding current source as for relay $K_x$;

(2) Through its $ii$ contacts it completes an energization circuit for relay $Q_1$ from this same holding current source, and such energization of relay $Q_1$ breaks the initial energization circuit for relay $K_q$; and (3) Through its $iii$ contacts it completes a circuit through which relay $K_z$ may be energized subsequently.

When the "z" symbol in the Table I sequence is read, relay $K_z$ is next energized initially through the contacts of de-energized relay $Z_1$ and the $iii$ contacts of energized relay $K_q$. Such initial energization of relay $K_z$ does the following:

(1) Through its $i$ contacts it completes a holding circuit for $K_z$ from the same holding current source;

(2) Through its $ii$ contacts it completes an energization circuit for relay $Z_1$ from the same holding current source, and such energization of relay $Z_1$ breaks the circuit through which relay $K_z$ was energized initially.

(3) Through its $iii$ contacts it connects terminal 520 to the negative terminal of the auxiliary power source.

Accordingly, in response to the reading of the successive symbols "$xqz$" in the Table I sequence, the circuit of FIG. 29 functions to connect the auxiliary power source to the input terminal 401a of the panel shown in FIG. 28.

The period symbol which immediately follows "$xqz$" in the Table I sequence breaks the holding circuits to the several relays in FIGURE 29.

This output current at terminal 520 in FIGURE 29 is therefore the test current applied to terminal 401a. This test current flows through the circuits of FIGURE 28 to one of the contacts 707–701 if one or more elements of the logical product have been detected in the encoded abstract. The contact in the group consisting of 707—701 to which the test current flow corresponds to the number of such elements that have been detected as present in the encoded abstract. The test current from one of the contacts 707—701 flows to the electrically connected corresponding contact within the group consisting of contacts 307—301. Thereafter, the reading by the tape scanning unit of the subsequent symbols in Table I results, in case the encoded abstract contains one or more elements of the logical product, in automatically typing (1) the abstract serial number (2) a number indicating how many elements of the logical product were detected in the encoded abstract and (3) the bibliographic reference. The functioning of the circuits of FIGURES 25A, 25B, 25C in accomplishing such typing has already been described.

When the circuits of FIGURES 26A, 26B, 26C and FIGURE 28 are applied in this way, the automatically typed number, indicating how many elements of the logical product have been detected within a given encoded abstract, is, as a rule, an effective index of the probable degree of interest of the subject contents of the abstract or of the corresponding original document.

A variation of the above applications of the circuits of FIGURE 28 arises when it is desired to list only those abstracts that contain a certain number (or a certain set of numbers) of the elements of the logical product. As a rule, insufficient interest to warrant selection attaches to those abstracts that contain less than a certain predetermined number of elements of the logical product. For example, when conducting a search based on the above discussed seven term logical product it might be decided that encoded abstracts must contain more than three elements in the logical product if the abstracts are to be of sufficient interest to warrant their identification and listing. In this case, electrical connections between FIGURES 28 and 25A would be set up, prior to initiating the search, between the contact pairs as follows, 707—307, 706—306, 705—305, 704—304, but not between the contact pairs, 703—303, 702—302, 701—301.

When the circuits of FIGURES 25A, 25B, 25C and FIGURES 26A, 26B, 26C or 28 are connected and operated as described above, the contact 421 which is connected to the coil of relay 420, is connected to the 🅔 symbol which is detected by the circuits of FIGURES 6A and 6B at the end of the symbol sequence shown in Table I. Thus reading the 🅔 symbol activities relay 420 and interrupts the holding circuits to the other relays in FIGURES 26A and 26B and in this way they are returned to the deactivated condition at the start of the reading of each encoded abstract.

If, for some special reason, it should be desired to identify and to list encoded abstracts containing any one or any set of numbers of elements within the seven member logical product under consideration, this can readily be accomplished by establishing corresponding connections between the terminals 701—707 of FIGURE 28 and the terminals 301—307 of FIGURE 25A.

The previous discussion of a seven term logical product has been presented as an example of the application of the circuits of FIGURES 26A, 26B, 26C and FIGURE 28. The number of terms in the logical product may be varied from 2 to 10 by appropriate alteration in the wiring of the plugboard as shown in FIGURES 27 and 28 and by establishing the corresponding electrical connections between contacts 301–310 of FIGURE 25A and appropriate contacts in FIGURES 27 and 28.

The preceding discussion has been directed to the application of the circuits of FIGURES 26A, B and C when dealing with a logical product that corresponds to the highest combination in the formulation of a search requirement. As previous discussion, both abstract and relating to practical searches, has pointed out, logical products may be involved in formulating combinations at an intermediate level as, for example, in specifying a certain combination of "words" in a "phase" or in a "sentence." The elements that compose such a logical product at an intermediate level may, in turn, be simple or complex combination of their subelements. To make such application of the circuits of FIGURES 26A, B and C at an intermediate level more readily understandable, consider a certain "phrase" which defines a search only in conjunction with certain aditional specified "phrases." Let us assume that this "phrase" corresponds to a seven-member logical product and that three elements are "syllables" and four elements are "words." Specification of such a phrase may be symbolized as follows:

$$A_3 = A_1 \cdot B_1 \cdot C_1 \cdot A_2 \cdot B_2 \cdot C_2 \cdot D_2$$

The outputs from other circuits that detect the elements $A_1$, $B_1$, $C_1$, $A_2$, $B_2$, $C_2$, $D_2$ (for examples of detection of such elements, see FIGURES 16–24) are connected one each to the terminals 401, 402, 403, 404, 405, 406, 407 of FIGURE 28. When test current is applied at terminal 401a as described below, a current will appear at one of the terminals 707—701, provided one or more elements in the logical product under consideration has or have been detected. Leads from each of the terminals 701—707 will carry test current corresponding to more or less complete detection of the elements in the "phrase" $A_3$. Leads from the terminals 701—707 may be regarded respectively as outputs for partial "phrases" that may be symbolized as $A_{3_1}$, $A_{3_2}$, $A_{3_3}$, $A_{3_4}$, $A_{3_5}$, $A_{3_6}$ and $A_{3_7}$ which, in turn would represent "phrases" containing respectively 1, 2, 3, 4, 5, 6, 7 of the specified elements in the logical product. These partial "phrases" may be made the elements in logically defined combinations in the same way as already described in the formulation of a search requirement preparatory to plugging the switchboard of the machine as shown in FIGURES 17, 19, 21, 22, 24, before conducting a search. Thus electrical leads from terminals 701—707 would be, in effect, output leads at the phrase level. Whether a logically defined combination contains a certain partial phrase, e.g., $A_{3_5}$, may be made its characteristic feature or one of its characteristic features.

In line with previous reasoning, when detecting incomplete logical products at intermediate levels in a search formulation as exemplified by the above mentioned $A_{3_1}$, $A_{3_2}$, $A_{3_3}$, etc. the test current is applied to terminal 401a at the end of each phrase, that is to say whenever the dash is read. In this case, the terminal in FIGURE 6B that carries current when the dash is read is connected by jumper wires both (a) to terminal 422 of FIGURE 26A and (b) to terminal 522 in FIGURE 31. Furthermore, terminal 533 to the left of FIG. 25A is connected by jumper wire to terminal 428 in FIG. 31. Thus, reading of the dash by the tape scanning unit results both in test current being applied to terminal 401a and also in the activation of relay 423 (FIG. 31) which establishes a holding circuit for itself through its i contacts. Activation of relay 423 also establishes a current through its ii contacts to activate relay 424. Through its iii contacts, relay 423 when activated, establishes a circuit so that the next following 8th channel pulse at terminal 428 will activate relay 425 in FIGURE 31 and also relay 429 whose activation interrupts the holding current to relays used to detect logical differences (FIGS. 10, 11) and complex logical relationships involving logical differences (FIGS. 12, 13, 14.) Terminal 531 of FIG. 31 is connected to terminal 421 of FIGURE 26A so that activation of relay 425 in FIG. 31 results in activation of relay 420 in FIG. 26A. As a consequence, in our example of detecting partial phrases, such as $A_{3_1}$, $A_{3_2}$, etc., reading a dash at the end of a phrase provides test current to terminal 401a, the immediately following 8-channel pulse results in actuating relay 420 in FIG. 26A and any activated relays in FIGURES 26A and 26B are inactivated by interrupting the holding current to these relays. After this 8-channel pulse, reading the next following symbol by the tape scanning unit results in current appearing at terminal 532 at the right of FIGURE 25C. This terminal is connected by jumper wire to terminal marked "Pulse From Reading Any Symbol" of FIGURE 31 through the *iii* contacts of activated relay 425 to the coil of relay 427 whose activation interrupts the holding current to relays 423—425 in FIGURE 31, and thus returns these relays to the deactivated state.

In the preceding discussion two different modes for applying the capabilities of the circuits of FIGURES 26A, 26B, 26C have been discussed. It is noted that the use of a panel wired for such circuits in conducting one or more searches does not exclude simultaneous use of additional panels at the intermediate levels which panels are also wired to provide the circuits of FIGURES 26A, 26B, 26C. In other words the programming of the equipment of this invention may involve the use of a multiplicity of panels that provide the circuits of FIGURES 26A, 26B, 26C either at different combinational levels or, perhaps less probably, at the same level.

In preceding discussion, the circuits of FIGURES 26A, 26B, 26C have been presented for detection of incomplete sets of the component elements in a logical product. It should be pointed out that the panels and circuits as presented in FIGURES 16–24 may be set up in such a way that certain elements in a logical product are required to be present while at the same time the circuits of FIGURES 26A, 26B, 26C are used for detection of partial sets of the remaining elements in the logical products. For example, in the seven term logical product as follows:

$$A_k = E_h \cdot M_j \cdot R_i \cdot P_h \cdot M_j \cdot N_j \cdot S_l$$

the wiring of a portion of the panel of FIGURE 27 and a panel as illustrated in FIGURE 32 will permit detection of partial logical products, which consist of $E_h$ and $M_j$ together with either (*a*) three of the remaining component elements which may be symbolized by $$A_{k_a} = E_h \cdot M_j [R_i \cdot P_h \cdot M_j \cdot N_j \cdot S_l]^3{}_5$$

component elements, or (*b*) four of the remaining component elements which may be symbolized by $$A_{k_b} = E_h \cdot M_j [R_i \cdot P_h \cdot M_j \cdot N_j \cdot S_l]^4{}_5$$

Note also that provision is made at the same time for detection of the complete logical product, $A_k$. Here the outputs $A_k$, $A_{k_a}$ and $A_{k_b}$ may correspond to the highest combination in different searches in which case these outputs will be connected to appropriate terminals selecting from the group consisting of terminals 301—310 in FIGURE 26A. Alternatively, the outputs $A_k$, $A_{k_a}$ and $A_{k_b}$ may correspond to intermediate order combinations that are combined in logically defined relationships to formulate higher order combinations.

It should be noted that the panel number 530 in FIGURE 32 will be operated by the same holding current as its companion panel used to detect the partial set of elements in the logical product. In our example, this holding current would be interrupted by reading the ⊟ symbol, if the corresponding outputs, $A_k$, $A_{k_a}$ and $A_{k_b}$, are connected to terminals among the group 301—310 of FIGURE 26A. If, on the other hand, $A_k$, $A_{k_a}$ and $A_{k_b}$ correspond to intermediate order combinations, then the holding circuit will be interrupted —as shown in FIGURE 31—by the 8-channel pulse which immediately follows the reading of the symbol of the second type that corresponds to the "*k*'th" level. Thus, if the "*k*'th" level is a phrase, then the 8-channel pulse immediately following the dash will activate relay 427 in FIGURE 31 and thus interrupt the holding current in question.

In the preceding discussion of various example applications of the circuits of FIGURES 26A, B and C, each of the terminals of the group consisting of 401—410 has been so wired that it corresponds uniquely to some one term of a logical product. This unique correspondence was achieved by attaching to some one of the terminals, 401—410, a lead which will carry current when one or more panels of the type shown in FIGURES 16–24 have detected the logically defined combination which is the specified term in the logical product. The circuits of FIGURES 26A–26C then function, in accord with previous discussion, in such a way that the output terminals, e.g., terminals 501—510 in FIGURE 27 or terminals 701—707 in FIGURE 28, will provide output test current when a given block of recorded information has been read. If this block of information is a complete encoded abstract, then the test current applied to terminal 491a is controlled by the circuits shown in FIGURE 29. If the logical product in question pertains to a less extensive block of information, e.g. a "phrase" or "sentence," then the test current applied to terminal 401a is controlled by the circuits of FIGURE 31. In these various previously described cases, the degree to which a given logical product is detected as more or less incompletely fulfilled is signalled by appearance of the test current at an appropriate output terminal, e.g., one of the terminals 501—510 in FIGURE 27 or one of the terminals 701—710 in FIGURE 28. Thus, as already noted, test current at terminal 706 will denote that 6 terms in a 7-term logical product have been detected while test current at terminal 705 will denote that 5 terms in a 7-term logical product have been detected. In general the higher the terminal number that carries current in a set of terminals as exemplified by terminals 701—707 or 501—510, the greater the degree to which the logical product has been satisfied.

In general, and especially when scanning encoded abstracts, the greater the degree to which one or more specified logical products have been detected in corresponding blocks of information, the greater the probability that the block of information (i.e., the corresponding encoded abstract) will be of pertinent interest. Thus, the application of circuits as shown in FIGURES 26A, B, C, to scanning a more or less extensive set of encoded abstracts will permit them to be differentiated as to the degree to which they satisfy one or more logical products involved in the definition of one or more search requirements and this degree of satisfaction of such logical products can be expected to indicate the probable degree of pertinent interest. This permits attention to be directed first to those items that are most pertinent, with corresponding saving in time and effort in evaluating rapidly —and perhaps discarding—those items of lesser interest.

The fractionation of items of information, along the lines above indicated, works well if the various component terms of each logical product involved in one or more searches are approximately equally important from the point of view of effecting selection of items from the files. This condition of equal importance of component terms in logical products is not always fulfilled, however. FIGURE 33 shows how the circuits of FIGURE 26 may be applied to deal with a combination of two circumstances, each of which may, of course, occur separately. Let us assume that a search requirement involves the logical product:

$$B_n = (S_j + T_j + U_j)(J_e \cdot M_k \cdot R_k \cdot V_j)$$

where, as before different order combinations are involved if *l*, *k*, *m* and *j* have different values while all the terms in the logical product would be of the same order if $l = k = m = j$ and where, in any case, *l*, *k*, *m* and *j* are all less then *n*. When a logical product is so formulated, it may be implied that the terms grouped together as a logical sum, in this example S*j*, T*j* and U*j*, are equally important in the sense that if any on of these is detected within one of the blocks of information, e.g., an encoded abstract, the further detection of one or both of the other terms within a given block indicates that its pertinent interest is greater, to, at most, a negligible degree. This consideration can then be taken into account by attaching to a single terminal among 401—410 all three leads that carry current when S*j*, T*j* and U*j* are detected by one or more panels as shown in FIGURES 16–24. Thus, in effect, the detection of more than one term in the group S*j*, T*j* and U*j*, functions as detection of one term in the logical product in line with the assumption that if any one of the three elements S*j*, T*j* and U*j* is detected, the detection of additional elements in this group of three is of little or no importance.

Let us assume, as a further condition, that approximately twice as much interest attaches to the detection of $M_k$ than to detection of other terms in the logical product (with S*j*, T*j* and U*j* being considered and treated as noted above, substantially as a single term as far as establishing degree of pertinent interest is concerned). In this case the lead that carries current when $M_k$ is detected by panels as exemplified in FIGURES 16–24 will be attached, as shown in FIGURE 33, to two terminals in the group consisting of 401—410 in FIGURE 26. Depending on the nature of the block of information among whose component elements terms of the example logical product B*n* are to be found the test current applied to terminal 401*a* will be controlled by circuits as shown in FIGURES 29 and 31 and as discussed in connection with FIGURES 27, 28 and 32. The holding current to the circuits of FIGURE 33 will be correspondingly controlled depending on how the test current is applied to terminal 401*a*. Appearance of test current in one of the output leads 801—806 of FIGURE 33 will indicate more or less complete detection of the example logical product B*n*. The higher the number of the output terminal in the group consisting of the more likely is the corresponding item, e.g., an encoded abstract, to be of pertinent interest.

AUXILIARY PANEL FOR DETECTING THREE-LETTER CODES FOR ROLE INDICATORS

Previous discussion of plugboard wiring as set up to accomplish actual searching operations has shown the detection of role indicators along with the other items in a search requirement by means of panels such as shown in FIGURE 16.

It should be noted that the codes for role indicators have been set up so that they have the following characteristics:

(*i*) They are all three letter codes, with the letters always in lower case.

(*ii*) The first letter in these codes is always *k*. (This lower case letter is not used in other codes for words or terms in the semantic code dictionary for encoding abstracts.)

(*iii*) The second letter is selected from the group consisting of *a*, *e*, *i*, *o*, *q*, *u*, *w*, and *x*.

Furthermore, forty-six of these three letter codes appear to be more than enough to provide for the role indicators required to encode a wide range of abstracts—at least those written to summarize papers in the field of metallurgy.

Because of these features of the codes for role indicators, a separate, relatively simple panel can be wired to detect these codes directly. That is to say, this panel functions in such a way that one set of plugs is energized when the tape scanning unit reads a certain role indicator code. The plugboard provides forty-six sets of output terminals—with one set of interconnected terminals for each of the forty-six role indicator codes. In wiring the various panels for conducting a search, the outputs from this role indicator panel are wired into the panels for detecting higher order combinations in the fashion shown in FIGURES 17, 19, 21, 22, 23 and 24.

The internal functioning of the role indicator panel may be summarized as follows by referring to FIGURE 30. Reading of the letter, *k*, by the tape scanning unit and its detection by the symbol detector circuit (FIGURES 6A and 6B) causes a pulse of 80–100 milliseconds duration to be applied from the "*k*" output terminal of the symbol detector to the "*k*" input terminal in FIGURE 30. This pulse is fed through line 200 and the normally-closed contacts 214 of relay 210 in FIGURE 30 to the coil of relay $R_k$, energizing the latter.

Such energization of relay $R_k$ completes a holding circuit for that relay through its contacts 201, line 202, the normally closed contacts of relay 203 and line 204 from the positive power supply terminal 205. The return from the coil of relay $R_k$ is through lines 206 and 208 to the other power supply terminal 209.

The energization of relay $R_k$ causes relay 210 to be energized as follows: from power supply terminal 205, line 204, the normally closed contacts of relay 203, line 202, the now-closed contacts of 211 of relay $R_k$, line 212, through the coil of relay 210 and lines 206 and 208 to terminal 209. Such energization of relay 210 causes its movable contact 214 to open line 200, from which relay $R_k$ received its initial energization.

The energization of relay $R_k$ causes relay 215 to be energized as follows: from power supply terminal 205, line 204, line 216, the now-closed contacts 217 of relay $R_k$, line 218, through the coil of relay 215, and through line 208 to terminal 209.

At the same time relay 220 is energized as follows: from terminal 205, and lines 218 and 221 to the coil of relay 220 and then through lines 229, 206 and 208 to terminal 209.

The energization of relay 215 completes the circuits from the "*a*," "*e*," "*i*" and "*o*" terminals at the input cable connection in FIGURE 30, to the coils of respective relays $R_a$, $R_e$, $R_i$ and $R_o$. Thus input terminal "*a*" is now connected through line 225 and the now-closed "*a*" contacts of relay 215 to the coil of relay $R_a$, input terminal "*e*" is connected through line 226 and the now-closed "*e*" contacts of relay 215 to the coil of relay $R_e$, input terminal "*i*" is connected through line 227 and the now-closed "*i*" contacts of relay 215 to the coil of relay $R_i$ and the input terminal "*o*" is connected through line 228 and the now closed "*o*" contacts of relay 25 to the coil of relay $R_o$.

In like manner, the energization of relay 220 completes the circuits from the "*q*," "*u*," "*w*" and "*x*" terminals at the input panel to the coils of relays $R_q$, $R_u$, $R_w$, and $R_x$. Input terminal "*q*" is now connected through line 230, the now-closed "*q*" contacts of relay 220, and line 231 to the coil of relay $R_q$. Input terminal "*u*" is connected through line 232, the now-closed "*u*" contacts of relay 220, and line 233 to the coil of relay $R_u$. Input terminal "*w*" is connected through line 234, the now-closed "*w*" contacts of relay 220, and line 235 to the coil of relay $R_w$. Input terminal "*x*" is connected through line 236, the now-closed "*x*" contacts of relay 220, and line 237 to the coil of relay $R_u$.

With this arrangement, detection of the letter *k*, which is always the first letter in the three letter code for a particular role indicator, conditions the relays $R_a$, $R_e$, $R_i$, $R_o$, $R_q$, $R_u$, $R_w$ and $R_x$ to be energized in response to the detection of the corresponding second letter of the code.

Thus, for example, if the letter "*a*" is detected immediately following the letter "*k*," relay $R_a$ will be energized through the circuit just described.

When this happens the $a_1$ contacts of relay $R_a$ complete a holding circuit for this relay as follows: from power supply terminal 205, through lines 204, 240 and 241, and the now-closed $a_1$ contacts of relay $R_a$ to the coil of $R_a$. This holding circuit keeps relay $R_a$ energized.

until the period symbol is read at the end of the three-letter role indicator code.

A similar holding circuit is provided at each of the other second letter relays.

A second set of contacts, designated $a_2$, at relay $R_a$ is connected through lines 241, 240 and 204 to power supply terminal 205. When relay $R_a$ is energized these $a_2$ contacts connect this power supply terminal through lines 242 and 243 to the coil of each of relays 244, 245, 246 and 247, these relay coils being connected in parallel.

Each of the other second letter relays, $R_e$, $R_i$, $R_o$, $R_q$, $R_u$, $R_w$ and $R_x$, has a second set of contacts similarly connected to relays 244—247.

Accordingly, if any one of these second letters is detected immediately following "$k$," the relays 244—247 will become energized. The function of these relays is to connect the third letter input terminals, $b$, $c$, $d$, $f$, $g$, $h$, $j$, $l$, $m$, $n$, $p$, $r$, $s$, $t$, and $v$ at the input panel to the correspondingly subscribed relays in FIGURE 30.

Thus, relay 244 has its "$b$," "$c$" and "$d$" contacts connected to the coils of relays $R_b$ and $R_b'$, $R_c$ and $R_d$ respectively. Relay 245 has its "$f$," "$g$," "$h$" and "$j$" contacts connected to the coils of relays $R_f$, $R_g$, $R_h$ and $R_j$ and $R_{j'}$, respectively. Relay 246 has its "$l$," "$m$," "$n$" and "$p$" contacts connected to the coils of relay $R_l$, $R_m$, $R_n$ and $R_p$, respectively. Relay 247 has its "$r$," "$s$," "$t$" and "$v$" contacts connected to the coils of relays $R_r$, $R_s$, $R_t$ and $R_v$, respectively.

With this arrangement, if one of the designated third letters of the three-letter code is read from the tape immediately following the first letter "$k$" and one of the designated second letters, corresponding relay $R_b$ and $R_b'$, $R_c$, $R_d$, $R_f$, $R_g$, $R_h$, $R_j$ and $R_{j'}$, $R_l$, $R_m$, $R_n$, $R_p$, $R_r$, $R_s$, $R_t$, or $R_v$ and $R_{v'}$ will become energized.

Relay 244 also functions to de-energize the relays $R_k$ 210, 215 and 220. Thus, when relay 244 becomes energized it completes an energization circuit for relay 203 as follows: from power supply terminal 205 through lines 204, 240, 250 and 251 through the "$i$" contacts of relay 244, line 252, through the coil of relay 203 and lines 206 and 208 to the terminal 209. Accordingly, relay 203 becomes energized, opening the line 204 through which relays $R_k$, 210, 215 and 220 have been energized.

Accordingly, therefore, the detection of any one of the second letters automatically resets the relays which were energized in response to the detection of the first letter "$k$."

Relay $R_a$ also has a third set of contacts $a_3$. When relay $R_a$ is energized the contacts $a_3$ connect the power supply terminal 205 through line 248 to one set of contacts at each of the relays $R_b$, $R_c$, $R_f$, $R_g$, $R_h$, $R_j$, $R_l$, $R_m$, $R_n$, $R_p$, $R_r$, $R_s$, $R_t$ and $R_v$. Therefore, if one of these third-letter relays is energized as just described, in response to the reading of the corresponding letter from the tape, an output signal will appear at one of its sets of contacts. Thus, for example, if relay $R_a$ is energized and relay $R_b$ is also energized, the closing of the first set of contacts at relay $R_b$ will connect its $kab$ output terminal to the power supply input terminal 205. The resultant output signal at the $kab$ output terminal indicates that the letters "$k$," "$a$" and "$b$" have been read from the tape in that order.

Each of the other second-letter relays $R_e$, $R_i$, $R_o$, $R_q$, $R_u$, $R_w$ and $R_x$ has a third set of contacts similarly connected to sets of contacts at one or more of the third-letter relays for the same purpose.

With the illustrated arrangement, 46 output terminals are provided at the third-letter relays. Accordingly, the circuit is capable of detecting each of 46 three-letter codes which designate role indicators. Obviously, the circuit is not limited to this number of three-letter codes, but may be extended to handle a greater number of role indicator three-letter codes, if desired, by the provision of more relay coils and contacts, particularly at the third letter relays.

The functioning of the FIGURE 30 panel as described up to this point may be summarized as follows:

(i) Detection of the letter, $k$, conditions the panel to detect the second letter in the three letter code.

(ii) Detection of the second letter results in its being registered by closing a specifically assigned relay and also in conditioning the circuits so that detection of the third letter will result in operation of a correspondingly assigned relay (or relays).

(iii) Detection of each of the first two letters is followed by automatic disconnection of the correspondingly activated relays from the input leads for these letters. (This forestalls the possibility of undesirable back circuits which might cause spurious and undesirable effects in the various panels.)

(iv) The detection of the third letter in a role indicator code operates the correspondingly subscribed relay shown in FIGURE 30. Thus, for example, the output terminal labelled $kwv$ will provide a pulse of about 60–80 milliseconds duration when the final letter in that combination is read by the tape scanning unit. This pulse may then be used to activate one of the higher combinational level registering units in a panel of the type shown in FIGURES 17, 19, 21, 22, 24.

By way of summary, it may be said that the panel wired as shown in FIGURE 30 serves the dual purpose of decreasing the number of relays in the searching selector and also of simplifying its programming as accomplished by wiring its plugboards.

Two multiconductor cables connect the circuits of FIG. 15 and FIG. 30. One cable connects the 27 terminals which are shown at the left of FIG. 30 and which are labelled by capital letters and Ⓢ to the 27 terminals indicated at the left of FIG. 15 as connected to FIG. 30. The second cable links terminal 209 of FIG. 30 to a terminal bearing a 1 subscript (e.g. $113_1$) at the right of FIG. 15. This second cable also links terminal 205 to a terminal bearing a 2 subscript (e.g. $113_2$) at the right of FIG. 15. This latter linking involving terminal 205 has a result that the current to this terminal—and hence to the circuits of FIG. 30—is interrupted when relay 120 in FIG. 15 is activated whenever the tape scanning unit reads the code combination for a period (.) in the tape. Thus the reading of the period returns any and all activated relays (especially relays 203, $R_a$, $R_e$, $R_i$, $R_o$, $R_q$, $R_w$, $R_x$, 244, 245, 246, 247) in FIG. 30 to the deactivated state as shown in FIG. 30.

In the preceding description, a seven channel tape was used to record individual symbols. With tapes or similar recording media having a sufficiently large number of channels, individual code semantemes may be recorded by appropriately assigned code combinations. If, in a given code, it were desired to record 240 semantic factors, 46 role indicators and 30 special symbols, a nine channel recording medium would enable a distinctive code combination to be assigned to each code semanteme or special symbol. Detection of such code combinations would be accomplished by circuits similar to those of FIGS. 6A and 6B whose output would then correspond to code semantemes or special symbols. Such an arrangement, by permitting more information to be recorded per unit length of recording medium, would permit a considerable increase in searching speeds to be attained.

From the foregoing it will be apparent that the logical circuitry embodied in the illustrated arrangement is particularly well suited for the accomplishment of the stated objects of the present invention. However, it is to be understood that, while relay circuits have been illustrated, the present invention may also be embodied in circuits which employ transistors, vacuum tubes, or other binary circuit elements, rather than relays. With such faster acting circuit elements, it is possible to achieve much more rapid rates for conducting searching and selecting operations as previously described. In realizing such possibilities, it may be advantageous to use magnetic tape or similar recording media rather than punched paper tape. With higher searching speeds, the rate of readout is correspondingly increased when an item is identified as fulfilling one or more search requirements. With higher readout rates, the operating speed of an automatic typewriter may be exceeded. In such a case, it may be advisable not to attempt to operate a typewriter directly by the readout symbols as generated in the above described readout cycle. One possibility is to use a faster responding recording device than an automatic typewriter. Alternately, it may be advisable to record the readout symbols in an intermediate storage, e.g. a magnetic drum, that can accept and record symbol sequences at a high rate of speed. Known techniques may then be used to cause such symbols to operate an automatic typewriter or other recording means. In this way, it is possible to avoid having the overall operating speed being impaired by inability of the readout recording means to respond to rapid readout rates.

Searching and selecting equipment as provided by this invention permits the recording medium to be scanned at a constant rate which is determined by the response time of the various circuit elements, especially the binary decision elements as exemplified by relays, vacuum tubes, transistors or the like. The scanning of the recording medium may be conducted, as far as the discriminating operations are concerned, in a continuous uninterrupted fashion as the required comparison operations at successive stages are conducted simultaneously. This is in contrast to so-called general purpose computers which use a single arithmetic unit to conduct in sequence required comparisons at a given level as might be exemplified by detection of a code semanteme or "syllable" as being recorded by a certain succession of letters or by a certain number. By avoiding the necessity of stopping the scanning operation, the speed of the selecting equipment of this invention is increased over that which would otherwise be possible with a given type of binary decision element.

Furthermore, various other modifications, omissions and refinements which depart from the disclosed embodiments of the logical circuits in the present invention may be adopted without departing from the spirit and scope of this invention.

I claim:

1. A searching selector system comprising a record medium having recorded thereon information data arranged in groups at successively higher combinational levels, each higher level group of recorded data being composed of a plurality of lower level groups of data arranged in accordance with logical relationships, means for reading the information data from the record medium, a discriminator having a plurality of units arranged to be activated only in response to the reading from the record medium of data which correspond to different specified search requirements, means for selectively interconnecting said units in groups at successively higher levels in accordance with predetermined logical relationships specified by the search requirements, each unit at each successively higher level of the discriminator corresponding to a logical combination of a group of lower level units which satisfy different search requirements, and means for simultaneously testing all of the groups of units at any level, immediately after reading each group of data from the record medium at that level, to determine whether or not said group of data satisfies any of said predetermined logical relationship specified for the search requirements at the same level.

2. The system of claim 1 wherein there are provided means operable after said simultaneous testing of said units for restoring all of the activated units to their condition prior to being activated.

3. The system of claim 2 wherein said reading means reads the information data from the record medium uninterrupted by the operation of the discriminator.

4. A searching selector for use with a record medium which has recorded thereon information data and a plurality of different level control symbols which separate the information data into groups at successively higher combinational levels, said searching selector comprising a discriminator made up of a plurality of units which corresponds to different specified search requirements and which are arranged at successively higher combinational levels, means for applying activating signals to the units at the lowest combinational level of the discriminator in response to the reading from the record medium of information data which correspond to specified search requirements, means for selectively interconnecting the lowest level units in groups in accordance with predetermined logical relationships among said specified search requirements at that level, means responsive to the reading of each lowest level control symbol from the record medium for applying to each group of lowest level units a test signal which passes therethrough only if the units in that group have been activated in accordance with the predetermined logical relationship established by said interconnecting means, means operable after the receipt of a test signal by each lowest level unit for restoring said unit to the condition it had prior to receiving an activating signal, means for selectively interconnecting the higher level units in groups in accordance with predetermined logical relationships which satisfy search requirements at those levels, means for selectively interconnecting each higher level unit to a group of lower level groups of units to receive as an activating signal from the latter a test signal passed through the latter, means responsive to the reading of higher level control symbols from the record medium for applying to each group of units of the discriminator at the same level a test signal which passes therethrough only if the units of that group have been activated in accordance with the corresponding predetermined logical relationships at those levels, and means in each higher level unit operable after the receipt of a test signal by said unit for restoring said unit to the condition it had prior to receiving an activating signal.

5. A searching selector system comprising a record medium which has recorded thereon information symbols and a plurality of different level control symbols which separate the different information symbols into groups at successively higher combinational levels, means for reading said information symbols and control symbols from the record medium, a symbol detector coupled to said reading means and having a plurality of individual output terminals corresponding respectively to different information and control symbols, means in said symbol detector operable in response to the reading of a symbol from the record medium for producing an activating signal at the corresponding output terminal, a discriminator made up of a plurality of units at the lowest combinational level and a pluraltity of units at higher combinational levels, said units at each combinational level having input terminals for receiving activating signals and test signals and output terminals for passing said test signals, means in each unit at each combinational level for establishing a circuit therein between said test signal input and output terminals in response to the receipt or non-receipt of an activating signal by said unit, means for selectively connecting certain of the output terminals of the symbol detector individually to input terminals of selected units in the lowest combinational level of the discriminator so as to pass to said selected units activating signals from said output terminals of the symbol detector, means for selectively interconnecting the test signal input and output terminals of various groups of units in the lowest combinational level of the discriminator so that each said group of lowest level units passes a test signal only if the information symbols read from the record medium satisfy at that level a predetermined logical relationship specified in the search requirements, means for connecting the output terminal of the symbol detector for the lowest level control symbol to each of the groups of interconnected lowest level units in the discriminator so as to apply simultaneously to all of said groups of lowest level units a test signal in response to the reading of said lowest level control symbol, which test signal is passed through any of said groups of lowest level units only if the units therein have been activated in accordance with one of said predetermined logical relationships specified in the search requirements, means operative after each said lowest level test signal to restore the previously-activated lowest level units to their condition prior to being activated, the units in the higher combinational levels of the discriminator having input terminals for receiving activating and test signals and output terminals for passing said test signals from said units, means for selectively interconnecting each unit at a higher combinational level in the discriminator to a group of lower level units so as to receive as an activating signal the test signal passed by said lower level group of units, means for selectively interconnecting the test signal input and output terminals of various groups of the higher level units in the discriminator so that each said higher level group of units passes a test signal only if the activating signals received thereby satisfy at the same higher level a predetermined logical relationship specified in the search requirements, means for connecting the symbol detector output terminal for the control symbol at each higher level to each of the groups of interconnected units at the same level so as to apply simultaneously to all of said last-mentioned groups of units a test signal in response to the reading of said last mentioned control symbol, and means operative after each last-mentioned test signal to restore previously-activated units at that level to their condition prior to being activated.

6. The searching selector system of claim 5 wherein said record medium has recorded thereon, at the end of each highest level group of the information symbols, symbols identifying the document which contains the corresponding information, and wherein there is provided means operative to record said document-identifying symbols in the event that the test signal applied to said highest level units has been passed thereby.

7. The searching selector system of claim 6 wherein there are provided means for selectively interconnecting the units of the discriminator in accordance with the requirements of a plurality of different search questions, and means operative after the recording of each document-identifying symbol to record the identity of each search question satisfied by the corresponding document.

8. The searching selector system of claim 7 wherein there are provided means providing connections from a group of units at a lower level in the discriminator to a plurality of different higher level units, so as to enable the simultaneous conducting of different searches which have a common search requirement at said lower level.

9. The searching selector system of claim 6 wherein there is provided means for recording, for each identified document, the number of search requirements which are satisfied by said document.

10. The searching selector of claim 9 wherein there are provided means for connection in the discriminator to selectively impart different degrees of importance to different search requirements.

11. A searching selector for use with a record medium having information data recorded thereon in groups, said searching selector comprising a discriminator having a plurality of different units corresponding individually to different specified search requirements, means for selectively connecting said units to be activated only in response to data read from the record medium which correspond respectively to said search requirements, said units being arranged in several different groups, means for selectively interconnecting the units in each group to pass a test signal through said group only if the units therein are inter-connected in accordance with preselected logical relationships among the specified search requirements, means operative after the reading of each group of information data from the record medium and before the reading of the next group of information data from the record medium for applying test signals simultaneously to said several groups of units, and means operative after each test signal to restore the previously-activated units to their condition prior to activation.

12. A searching selector for use with a record medium having recorded thereon information data and a plurality of different level control symbols separating the information data into groups at successively higher combinational levels, said searching selector comprising means for reading the information data and control symbols from the record medium, a discriminator having a plurality of units corresponding individually to different specified search requirements, means for selectively connecting certain of said units of the discriminator to said reading means for activation of said units only in response to the reading of information data from the record medium which correspond respectively to said specified search requirements, said last-mentioned units being arranged in different groups at successively higher combinational levels, means responsive to the reading of each control symbol from the record medium for applying test signals simultaneously to all of the groups of units in the discriminator at the same combinational level as said last-mentioned control symbol, means for selectively interconnecting the units in each of said groups such that the test signal is passed through said group only if said units therein are interconnected in accordance with preselected logical relationships among the specified search requirements, and means operative after said test signals to restore the previously-activated units to their condition prior to being activated.

References Cited in the file of this patent

UNITED STATES PATENTS

| | | |
|---|---|---|
| 2,604,262 | Phelps et al. | July 22, 1952 |
| 2,623,694 | Peterson | Dec. 30, 1952 |
| 2,783,454 | North | Feb. 26, 1957 |
| 2,785,388 | McWhirter | Mar. 12, 1957 |
| 2,819,841 | Blashfield | Jan. 14, 1958 |
| 2,830,759 | Hudes et al. | Apr. 15, 1958 |
| 2,905,927 | Reed | Sept. 22, 1959 |
| 2,918,659 | Gaddis | Dec. 22, 1959 |
| 2,940,065 | Formby | June 7, 1960 |

OTHER REFERENCES

Journal of Patent Society, vol. 35, No. 8, August 1953, pp. 566–587, pp. 573 thru 577 particularly relied on.

Perry et al.: Machine Literature Searching, Western Reserve Univ. Press, Interscience Pub., New York, copyright 1956, pp. 50 to 58.